US012654957B2

(12) United States Patent
Smith

(10) Patent No.: US 12,654,957 B2
(45) Date of Patent: Jun. 16, 2026

(54) SOLAR PANEL DISPENSING SYSTEM FOR FACILITATING INSTALLATION OF SOLAR PANELS

(71) Applicant: Palladyne Corp., Salt Lake City, UT (US)

(72) Inventor: Fraser M. Smith, Salt Lake City, UT (US)

(73) Assignee: Palladyne Corp., Salt Lake City, UT (US)

( * ) Notice: Subject to any disclaimer, the term of this patent is extended or adjusted under 35 U.S.C. 154(b) by 0 days.

(21) Appl. No.: 18/094,888

(22) Filed: Jan. 9, 2023

(65) Prior Publication Data

US 2024/0228195 A1     Jul. 11, 2024

(51) Int. Cl.
  *B65G 61/00*     (2006.01)
  *B25J 15/06*     (2006.01)
  *B60P 1/54*     (2006.01)
  *H02S 30/10*     (2014.01)

(52) U.S. Cl.
  CPC ............... *B65G 61/00* (2013.01); *B60P 1/54* (2013.01); *B25J 15/0616* (2013.01); *H02S 30/10* (2014.12)

(58) Field of Classification Search
  CPC .. B65G 61/00; B60P 1/54; H02S 30/10; B25J 15/0616
  See application file for complete search history.

(56) References Cited

U.S. PATENT DOCUMENTS

| | | | |
|---|---|---|---|
| 3,893,647 A | 7/1975 | Kennedy | |
| 4,611,090 A * | 9/1986 | Catella | F24S 25/20 136/258 |
| 6,325,749 B1 | 12/2001 | Inokuchi et al. | |
| 7,447,605 B2 | 11/2008 | Kuehnrich | |

(Continued)

FOREIGN PATENT DOCUMENTS

| | | |
|---|---|---|
| AU | 2018369820 B2 | 3/2023 |
| CN | 205901664 U | 1/2017 |

(Continued)

OTHER PUBLICATIONS

Enphase Energy, Installation and Operations Manual Enphase Micro-Inverter Models M190-72-208 and M190-72-240, https://s3.amazonaws.com/RealGoods/products/documentation/m190usermanual0-42680.pdf, 2009, 27 pages, Petaluma, California.

(Continued)

*Primary Examiner* — Saul Rodriguez
*Assistant Examiner* — Ashley K Romano
(74) *Attorney, Agent, or Firm* — Thorpe North & Western, LLP

(57)     ABSTRACT

A solar panel dispensing device comprising a hopper, a guide arm, and an actuator. The hopper includes a frame defining an interior volume and an exit and is configured to contain a plurality of solar panels therein. The guide arm includes a support surface coupled to the hopper at a position adjacent to the exit of the hopper. The guide arm can extend away from the exit at a position to guide the plurality of solar panels from the hopper to an installation position. The actuator can include a contact interface operable to interface with and displace a lead solar panel of the plurality of contained solar panels through the exit, and to present the lead solar panel to the guide arm.

44 Claims, 35 Drawing Sheets

(56) References Cited

U.S. PATENT DOCUMENTS

| | | | |
|---|---|---|---|
| 8,522,490 B1 * | 9/2013 | Stancel | H02S 20/00 |
| | | | 403/114 |
| 8,567,134 B1 | 10/2013 | Grushkowitz et al. | |
| 9,733,646 B1 | 8/2017 | Nusser et al. | |
| 10,696,451 B2 | 6/2020 | Britcher et al. | |
| 10,801,755 B1 | 10/2020 | Nemat et al. | |
| 11,331,799 B1 | 5/2022 | Shafer | |
| 11,502,638 B2 | 11/2022 | Watson et al. | |
| 11,979,107 B2 | 5/2024 | Watson et al. | |
| 2007/0102038 A1 | 5/2007 | Kirschning | |
| 2008/0149170 A1 | 6/2008 | Hanoka | |
| 2009/0320389 A1 | 12/2009 | White | |
| 2010/0096073 A1 * | 4/2010 | Adriani | H01L 31/048 |
| | | | 156/160 |
| 2011/0000544 A1 * | 1/2011 | West | F24S 25/16 |
| | | | 136/252 |
| 2011/0005581 A1 * | 1/2011 | Kanbara | H02S 20/24 |
| | | | 136/251 |
| 2011/0073733 A1 * | 3/2011 | Hartelius | F24S 25/12 |
| | | | 248/316.7 |
| 2011/0162639 A1 * | 7/2011 | Jeandeaud | F24S 25/40 |
| | | | 126/634 |
| 2011/0303262 A1 * | 12/2011 | Wolter | F24S 25/11 |
| | | | 136/251 |
| 2012/0027550 A1 | 2/2012 | Bellacicco et al. | |
| 2012/0048345 A1 | 3/2012 | Wood et al. | |
| 2012/0142221 A1 | 6/2012 | Naskali | |
| 2013/0019925 A1 | 1/2013 | Britcher et al. | |
| 2015/0093190 A1 * | 4/2015 | Header | F24S 25/615 |
| | | | 403/374.3 |
| 2015/0200621 A1 | 7/2015 | Reed et al. | |
| 2016/0190976 A1 | 6/2016 | Corio et al. | |
| 2016/0344330 A1 | 11/2016 | Gillis | |
| 2017/0229998 A1 | 8/2017 | Molina et al. | |
| 2017/0250648 A1 | 8/2017 | Haas et al. | |
| 2017/0359017 A1 | 12/2017 | Corio | |
| 2018/0072168 A1 | 3/2018 | Heinen et al. | |
| 2018/0212558 A1 | 7/2018 | Meller et al. | |
| 2019/0074792 A1 | 3/2019 | Hakenberg | |
| 2019/0341878 A1 | 11/2019 | Watson et al. | |
| 2020/0274480 A1 | 8/2020 | Lutian | |
| 2020/0331737 A1 | 10/2020 | Reischauer et al. | |
| 2020/0350850 A1 | 11/2020 | Di Stefano et al. | |
| 2021/0180832 A1 | 6/2021 | Schuknecht et al. | |
| 2021/0189747 A1 | 6/2021 | Pearson, Jr. | |
| 2021/0205995 A1 | 7/2021 | Vu et al. | |
| 2021/0206003 A1 | 7/2021 | Zhou et al. | |
| 2021/0305933 A1 | 9/2021 | Escobedo | |
| 2021/0379757 A1 | 12/2021 | Schneider et al. | |
| 2021/0395011 A1 | 12/2021 | Crawford, Jr. et al. | |
| 2022/0035379 A1 | 2/2022 | Xu et al. | |
| 2022/0049805 A1 | 2/2022 | Hinton | |
| 2022/0069770 A1 | 3/2022 | Shelton et al. | |
| 2022/0103122 A1 | 3/2022 | Carter | |
| 2022/0193927 A1 | 6/2022 | Mazzetti, Jr. et al. | |
| 2022/0271707 A1 | 8/2022 | Reynolds et al. | |
| 2022/0345076 A1 | 10/2022 | Nickerson | |
| 2022/0411245 A1 | 12/2022 | Bailey | |
| 2023/0066547 A1 | 3/2023 | Campbell et al. | |
| 2023/0188086 A1 | 6/2023 | Garza et al. | |
| 2023/0246589 A1 | 8/2023 | Morankar et al. | |
| 2023/0361715 A1 | 11/2023 | Mouniandy et al. | |
| 2024/0001836 A1 | 1/2024 | Di Stefano | |
| 2024/0030863 A1 * | 1/2024 | Brulo | F24S 80/00 |
| 2024/0051152 A1 | 2/2024 | Tadepalli et al. | |
| 2024/0083699 A1 | 3/2024 | Davis et al. | |
| 2024/0190009 A1 * | 6/2024 | Asmari | B25J 15/0616 |
| 2024/0235460 A1 * | 7/2024 | Smith | H02S 30/10 |
| 2024/0235467 A1 * | 7/2024 | Conti | H02S 40/36 |
| 2024/0258958 A1 | 8/2024 | Watson et al. | |
| 2024/0367319 A1 * | 11/2024 | Smith | B25J 5/005 |
| 2024/0424969 A1 | 12/2024 | Hansel et al. | |
| 2024/0424971 A1 | 12/2024 | Hansel | |
| 2025/0164154 A1 | 5/2025 | Morin et al. | |
| 2025/0223118 A1 | 7/2025 | Smith et al. | |
| 2025/0226791 A1 | 7/2025 | Smith et al. | |
| 2025/0226792 A1 | 7/2025 | Smith et al. | |

FOREIGN PATENT DOCUMENTS

| | | |
|---|---|---|
| CN | 109573509 A | 4/2019 |
| CN | 110402683 A | 11/2019 |
| CN | 211700658 U | 10/2020 |
| CN | 111342751 B | 7/2021 |
| DE | 102012105726 A1 | 1/2014 |
| JP | 2020-070584 A | 5/2020 |
| WO | WO 2019/136505 A1 | 7/2019 |
| WO | WO 2021/119559 A1 | 6/2021 |
| WO | WO 2021/229387 A2 | 11/2021 |
| WO | WO 2021/252427 A1 | 12/2021 |

OTHER PUBLICATIONS

SOS Engineering Inc, 11 Advantages of Spring Loaded Contacts, https://www.soseng.com/11-advantages-of-spring-loaded-contacts/, 2019, 5 pages.

* cited by examiner

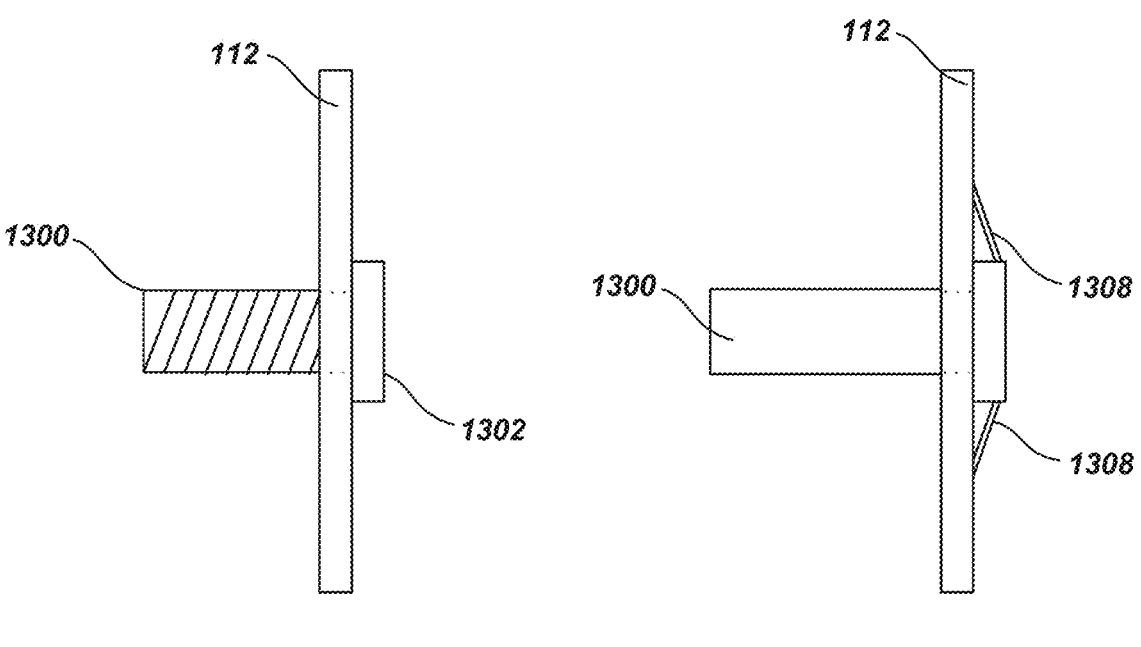
FIG. 13A
FIG. 13C
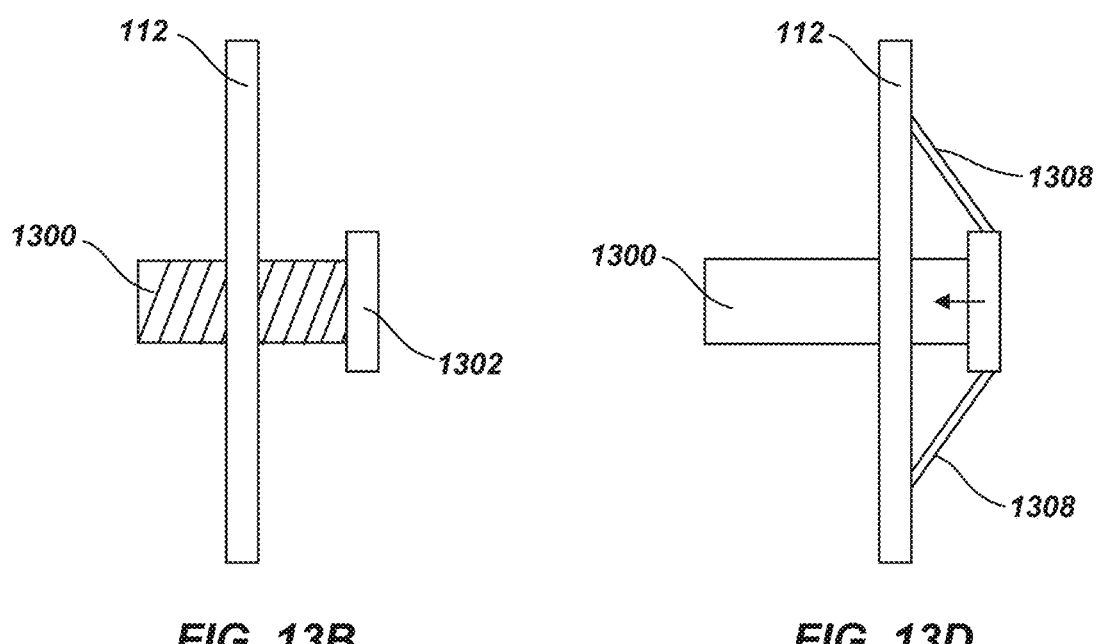
FIG. 13B
FIG. 13D

1700

1702: Inserting a first edge of the solar panel into a first retaining channel configured to receive and retain a first edge of the solar panel in an installed position.

1704: Aligning the solar panel within the first support structure with a panel rest comprising a seating surface configured to receive and support a lower surface of the solar panel in the installed position.

1706: Aligning a second edge of the solar panel with a second support structure positioned offset from the first support structure, and defining, at least in part, a retaining channel configured to receive and retain a second edge of the solar panel in the installed position.

1708: Interfacing the second edge of the solar panel with the second support structure to retain the solar panel in the solar panel mount.

*FIG. 17*

1800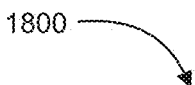

| 1802: Configuring the solar panel mount to comprise a panel rest comprising a seating surface configured to receive and support a lower surface of the solar panel in the installed position. |

| 1804: Configuring the solar panel mount to comprise a first support structure defining, at least in part, a first retaining channel configured to receive and retain a first edge of the solar panel in an installed position. |

| 1806: Configuring the solar panel mount to comprise a second support structure positioned offset from the first support structure, and defining, at least in part, a second retaining channel configured to receive and retain a second edge of the solar panel in the installed position. |

| 1808: Configuring the first retaining channel and the second retaining channel to be spatially positioned and oriented relative to one another to facilitate quick capture of the solar panel, and to secure the solar panel in the installed position. |

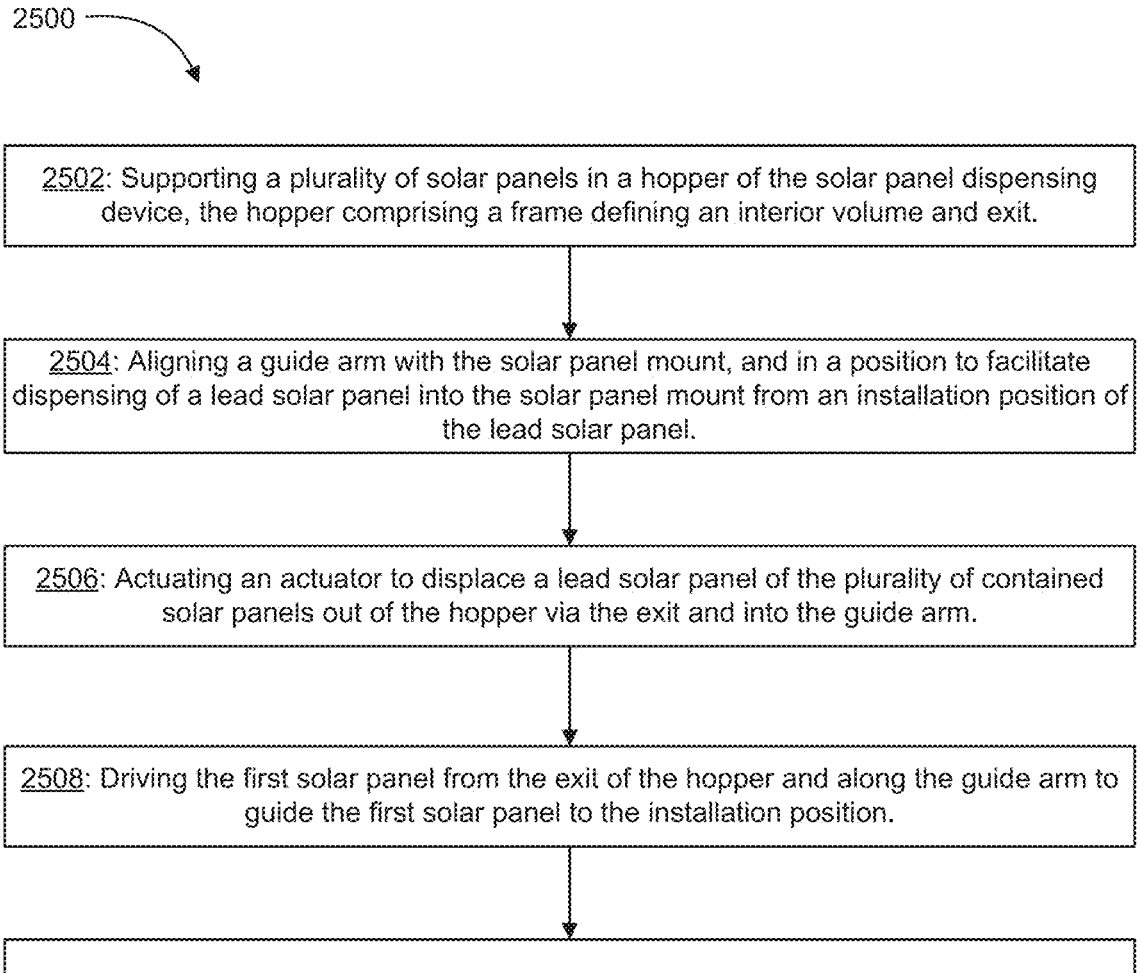

2502: Supporting a plurality of solar panels in a hopper of the solar panel dispensing device, the hopper comprising a frame defining an interior volume and exit.

2504: Aligning a guide arm with the solar panel mount, and in a position to facilitate dispensing of a lead solar panel into the solar panel mount from an installation position of the lead solar panel.

2506: Actuating an actuator to displace a lead solar panel of the plurality of contained solar panels out of the hopper via the exit and into the guide arm.

2508: Driving the first solar panel from the exit of the hopper and along the guide arm to guide the first solar panel to the installation position.

2510: Driving the first solar panel out of the guide arm to the installation position.

*FIG. 25*

2600

| |
| --- |
| 2602: Supporting a plurality of solar panels in a hopper of the solar panel dispensing device, the hopper comprising a frame defining an interior volume and an exit. |

| |
| --- |
| 2604: Aligning a first exit of a guide arm of the solar panel dispensing device with a first solar panel mount in a position to facilitate dispensing of a lead solar panel into the first solar panel mount from a first installation position of the lead solar panel. |

| |
| --- |
| 2606: Aligning a second exit of a guide arm of the solar panel dispensing device with a second solar panel mount in a position to facilitate dispensing of a lead solar panel into the second solar panel mount from a second installation position of the lead solar panel. |

| |
| --- |
| 2608: Actuating an actuator to displace the lead solar panel of the plurality of solar panels out of the hopper via the exit and into the guide arm. |

| |
| --- |
| 2610: Driving the lead solar panel from the exit of the hopper and along the guide arm to guide the lead solar panel to one of a first exit corresponding to the first solar panel mount or a second exit corresponding to the second solar panel mount. |

| |
| --- |
| 2612: Driving the lead solar panel out of the first exit or the second exit of the guide arm to either the first installation position or the second installation position. |

*FIG. 26*

SOLAR PANEL DISPENSING SYSTEM FOR FACILITATING INSTALLATION OF SOLAR PANELS

BACKGROUND

In recent years, electricity generation through the use of solar panels has become much more common and widespread. Solar panels and solar panel arrays are commonly installed on both commercial and residential buildings, as well as other structures. Additionally, large solar panel arrays are commonly installed on racks or mounts in open fields and spaces.

With solar panel arrays and solar panel installation becoming more common in society, quicker and more efficient ways of installing solar panels are needed to help increase rates and decrease costs. For this reason, systems, devices, and methods for installing solar panels continue to be developed. Furthermore, mounts and supports for receiving solar panels that work in conjunction with installation devices continue to be developed in order to facilitate quick and efficient installation and operation of solar panels with installation devices.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 11A-11D illustrate various detailed views of steps of a solar panel being installed in the solar panel mount of FIG. 4 including biasing members.

FIGS. 13A-13D illustrates a front elevation view of locking mechanisms in accordance with an example of the present disclosure.

FIG. 17 illustrates a method in accordance with an example of the present disclosure.

FIG. 18 illustrates a method in accordance with an example of the present disclosure.

FIG. 25 illustrates a method in accordance with an example of the present disclosure.

FIG. 26 illustrates a method in accordance with an example of the present disclosure.

Figure 1:
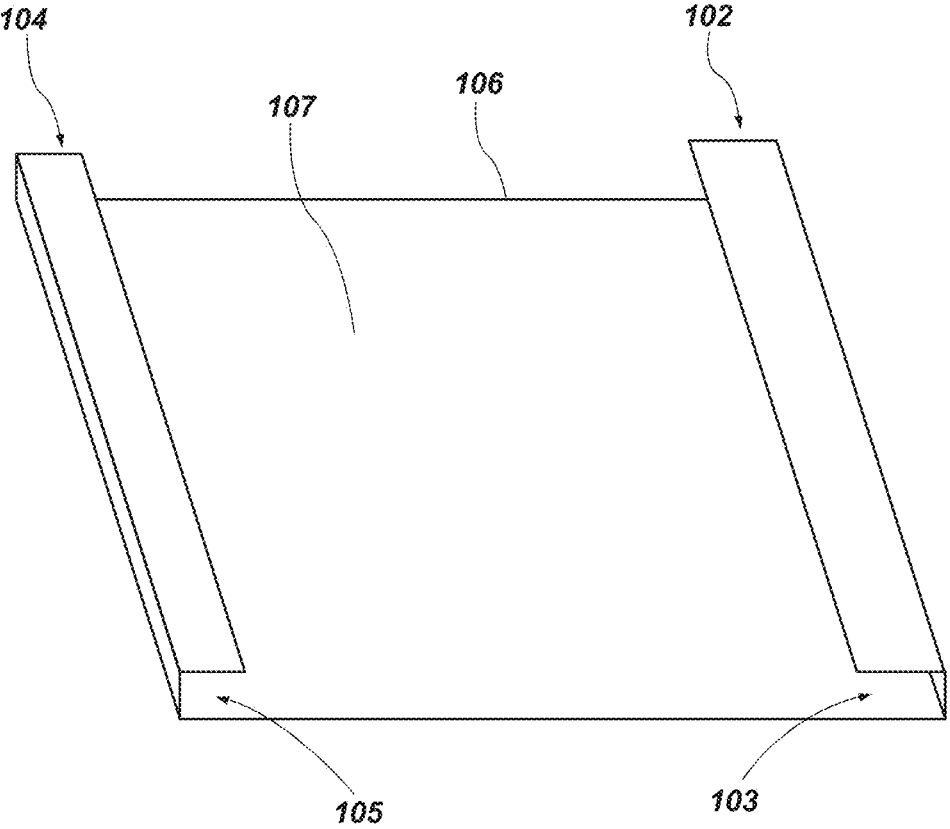
FIG. 1 illustrates a front elevation view of a solar panel mount in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In contexts where elements are recited to be "substantially aligned with" another element recited herein, it is intended that the recited element is still "substantially aligned with" another element when the element is either in perfect alignment with, or out of alignment by +/−10 degrees with the other element. In contexts where elements are recited to be "substantially parallel" to another element recited herein, it is intended that the recited element is still "substantially parallel" to the other element when the element is either perfectly parallel with, or is angled away from parallel with the other element by +/−10 degrees.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

As used herein, the singular forms "a," and, "the" include plural referents unless the context clearly dictates otherwise.

As used herein, the term "installed position" as used herein refers to a final position at which the solar panel is fully installed and resting in a seated position within a solar panel mount, and that corresponds to the operating position of the solar panel for its intended purpose, namely to receive solar energy and facilitate the production or generation of electricity. In other words, in the "installed position" installation of the solar panel into the solar panel mount is complete, meaning that no further movement or manipulation of the solar panel within the solar panel mount is undertaken to position the solar panel within the mount. For example, the installed position can be a position where the solar panel is resting against both a panel rest (e.g., panel rest 106 of panel mount 100 of FIG. 1) and a second support structure (e.g., second support structure 104 of panel mount

100 of FIG. 1). The "installed position" may, but does not need to, include the solar panel engaged by and secured into place with a retention latch, biasing member, or other locking mechanism. Examples of installed positions are illustrated in at least FIGS. 3E, 6D, 7A, 7B, 7D, 8D, 10D, and 15D.

The term "installation position" as used herein refers to a position at which a solar panel is initially inserted into, brought into contact or interfaced with the solar panel mount, or at which the solar panel is aligned to be inserted, brought into contact or interfaced with the solar panel mount, for facilitating subsequent placement of the solar panel into the installed position.

As used herein, the term "installation angle" is intended to refer to an orientation angle at which a solar panel is initially inserted into, brought into contact or interfaced with, or aligned to be inserted, brought into contact with, or interfaced with the solar panel mount, for facilitating subsequent placement of the solar panel into the installed position.

As used herein, the term "hopper" refers to a structure or component of a solar panel dispensing device/system that is shaped to house a plurality of solar panels therein in any configuration, whether stacked vertically, aligned horizontally, or otherwise, and that facilitates the dispensing of the plurality of solar panels from the solar panel dispensing device/system.

As used herein, the term "guide arm" is intended to refer to a structure or component of a solar panel dispensing device/system that extends from the hopper, and that either actively or passively systematically guides solar panels to be dispensed at a desired position and orientation. The guide arm can be a static structure that merely acts as a pathway to guide the solar panels into position/orientation or can be a structure including actuatable or motorized elements configured to drive a solar panel to a desired position and orientation.

As used herein, the term "actuator," refers to a structure or component of a solar panel dispensing device/system that is operable to be actuated and moved in one or more linear and/or rotational degrees of freedom to displace a solar panel from the hopper and to facilitate positioning of the solar panel into the guide arm. Example actuators are described below, and shown in the drawings.

As used herein, the term "panel base," refers to a structure or component of a solar panel dispensing device/system that comprises one or more support surfaces that support a plurality of solar panels in the hopper. In some examples, the panel base can include a pivoting end that pivots about a joint and an adjustable end that raises or lowers to adjust an angle of the panel base.

As used herein, the term "height adjustment actuator," refers to a structure or component of a solar panel dispensing device/system that is actuatable to adjust the height of the adjustable end and, therefore, the angle of the panel base.

As used herein, the term "hopper actuator," refers to a structure or component of a solar panel dispensing device/system that is operable to successively move a plurality of solar panels toward an exit of the hopper as solar panels are dispensed from the hopper.

As used herein, the term "directing member," refers to a structure or component of a solar panel dispensing device/system that applies a force to a solar panel exiting the guide arm to direct the solar panel into a solar panel mount at an appropriate installation angle and installation position.

As used herein, the term "mobile platform" refers to a manned or unmanned vehicle operable to support and to facilitate controlled locomotion of a solar panel dispensing device/system.

As used herein, the term "solar panel mount" refers to a collection of structural supports or support structures (e.g., a frame or frame-like structure, any connections between these, etc.) configured to receive and retain, at least in part, and support one or more solar panels in an operational installed position. A plurality of solar panel mounts can be operable together to provide a solar panel array frame.

As used herein, the term "support structure" refers to a structure or assembly of components of a solar panel mount configured to receive and retain one or more edges of one or more solar panels in an operational installed position As used herein, the term "back stop" refers to a portion of one or more support structures of a solar panel mount configured to receive and provide a positional stop for one or more solar panels.

As used herein, the term "panel rest" refers to a surface of one or more support structures of a solar panel mount configured to provide support, whether directly or indirectly, a surface of the solar panel with the solar panel in the installed position.

As used herein, the term "guide stop" refers to a portion of one or more support structures of a solar panel mount configured to guide a solar panel towards the back stop and/or panel rest during insertion of the solar panel into the solar panel mount.

As used herein, the term "biasing structure" refers to a structure or member, such as a spring, resilient member, or other spring-like structure or member of a solar panel mount configured to bias a solar panel in one or more directions within the solar panel mount in the installed position.

As used herein, the term "retention latch" refers to any structure of a solar panel mount configured to engage with a portion of the solar panel to retain the solar panel in the support structure in the installed position.

An initial overview of the inventive concepts is provided below and then specific examples are described in further detail later. This initial summary is intended to aid readers in understanding the examples more quickly, but is not intended to identify key features.

Disclosed herein is a solar panel dispensing device. The solar panel dispensing device can include a hopper configured to contain a plurality of solar panels therein, the hopper comprising an exit configured to facilitate removal of the plurality of solar panels out of the hopper. The solar panel dispensing device can further include a guide arm positioned adjacent to the exit of the hopper and configured to guide the plurality of solar panels from the hopper to an installation position. The solar panel dispensing device can further include an actuator configured to displace a lead solar panel of the plurality of contained solar panels through the exit, and to present the lead solar panel to the guide arm.

Also disclosed herein is a solar panel dispensing system. The solar panel dispensing system can include a mobile platform configured to move and maneuver about an environment. The solar panel dispensing system can include a solar panel dispensing device supported by the mobile platform. The solar panel dispensing device can include a hopper configured to contain a plurality of solar panels therein, the hopper comprising an exit configured to facilitate removal of the plurality of solar panels out of the hopper. The solar panel dispensing device can further include a guide arm positioned adjacent to the exit of the hopper and configured to guide the plurality of solar panels from the hopper to an installation position. The solar panel dispensing device can further include an actuator configured to displace a lead solar panel of the plurality of contained solar panels through the exit, and to present the lead solar panel to the guide arm.

Also disclosed herein is a method for installing solar panels into a solar panel mount using a solar panel dispensing device. The method can include aligning a guide arm with the solar panel mount, and in a position to facilitate dispensing of a lead solar panel into the solar panel mount from an installation position of the lead solar panel. The method can further include supporting a plurality of solar panels in a hopper of the solar panel dispensing device, the hopper comprising an exit from which the plurality of solar panels are dispensed out of the hopper. The method can further include actuating an actuator configured to move the plurality of solar panels out of the hopper via the exit and into the guide arm to move the first solar panel of the plurality of solar panels out of the hopper through the exit. The method can further include driving the first solar panel from the exit of the hopper and along the guide arm to guide the first solar panel to the installation position. The method can further include driving the first solar panel out of the guide arm to the installation position.

Further disclosed herein is a method for installing solar panels into a solar panel mount using a solar panel dispensing device. The method can include aligning a first exit of a guide arm of the solar panel dispensing device with a first solar panel mount and in a position to facilitate dispensing of a lead solar panel into the first solar panel mount from an installation position of the lead solar panel. The method can further include aligning a second exit of a guide arm of the solar panel dispensing device with a second solar panel mount and in a position to facilitate dispensing of a lead solar panel into the second solar panel mount from an installation position of the lead solar panel. The method can further include supporting the plurality of solar panels in a hopper of the solar panel dispensing device, the hopper comprising an exit from which the plurality of solar panels are dispensed out of the hopper. The method can further include actuating an actuator configured to move the plurality of solar panels out of the hopper via the exit and into the guide arm to move a first solar panel of the plurality of solar panels out of the hopper through the exit. The method can further include driving the first solar panel from the exit of the hopper and along the guide arm to guide the first solar panel to one of a first exit corresponding to the first solar panel mount or a second exit corresponding to the second solar panel mount. The method can further include driving the first solar panel out of the first exit or the second exit of the guide arm to either the first installation position or the second installation position.

Solar Panel Mount

To further describe the present technology, examples are now provided with reference to the figures. FIG. 1 illustrates a front elevation view of a solar panel mount 100 in accordance with an example of the present disclosure. As illustrated the solar panel mount 100 can be configured to hold a solar panel in an installed position in which the solar panel is operable to function as intended, namely to receive solar energy and generate electricity.

As used herein, the term "installed position" is intended to refer to a final installed position at which the solar panel is fully installed and resting at a position within a solar panel mount that corresponds to the operational position of the solar panel at which the panel is seated and allowed to receive solar energy and produce electricity therefrom. In other words, in the "installed position" installation of the solar panel into the solar panel mount is complete, meaning that no further movement or manipulation of the solar panel within the solar panel mount is undertaken to position the solar panel within the mount. For example, the installed position can be a position where the solar panel is resting against both a panel rest (e.g., panel rest 406 of panel mount 400) and a second support structure (e.g., second support structure 404 of panel mount 400). The "installed position" may, but does not need to, include the solar panel engaged by and secured into place with a retention latch, biasing member, or other locking mechanism. Examples of installed positions are illustrated in at least FIGS. 3E, 6D, 7A, 7B, 7D, 8D, 10D, 11D, 15D, and 16.

The solar panel mount 100 can include a first support structure 102 configured to receive and support a first edge of a solar panel in an installed position. The first support structure can comprise and define, at least in part and in one example, a first retaining channel 103 configured to receive and support a first edge of a solar panel in an installed position. The solar panel mount 100 can further include a second support structure 104 disposed at a position that is opposed to and offset from the first support structure 102. The second support structure 104 can comprise and define, at least in part and in one example, a second retaining channel 105 configured to receive and retain a second edge of the solar panel in the installed position to retain and secure the solar panel in the installed position between the first support structure 102 and the second support structure 104. The first and second retaining channels 103 and 105 can be configured as c-channels, or any other channel suitable to receive at least a portion (e.g., an edge portion) of a solar panel. The solar panel mount 100 can further include a panel rest 106 comprising a seating surface 107 configured to receive and support a lower surface of the solar panel in the installed position. The first retaining channel 103 can be disposed at a first end of the panel rest 106 to receive and retain a first edge 302 of a solar panel 300.

The panel rest 106 is illustrated as being a flat panel spanning an entire region between the first support structure 102 and the second support structure 104. The panel rest 106 can be a length D1 that is greater than a length of a solar panel that is to be retained in the solar panel mount 100 in order to fully accommodate a solar panel 300 in the mount 100. In other words, the first and second retaining channels 103 and 105 spaced apart by the panel rest 106 can be spatially positioned apart from, and oriented relative to, one another at a distance D1 greater than a length of the solar panel 300 such that the first retaining channel is positioned to receive the first edge 302 of the solar panel 300 and the second retaining channel is positioned to receive a second edge 304 of the solar panel 300 opposite the first edge to secure the solar panel in the installed position (see FIGS. 3E, 6D, 7A, 7B, 10D).

It will be appreciated by those skilled in the art that the panel rest 106 is not intended to be limited to a continuous plate-like structure spanning or extending between the first and second support structures 102 and 104. As an alternative, one or more struts or beams, or a grid structure may be connected between the first support structure 102 and the second support structure 104. Additionally, the panel rest 106 can have one or more apertures of any size or shape formed therein to allow for additional elements to interface with the solar panel through the one or more apertures. For example, a retention latch, as will be described further later on, could interface with a solar panel through an aperture in the panel rest 106 to hold the solar panel in place within the solar panel mount 100. The panel rest 106 can be integrally formed with at least one of the first support structure 102 or the second support structure 104, or it can be formed separately and attached to the support structures 102 and/or 104. Furthermore, the panel rest 106 can comprise one piece or a plurality of pieces formed or joined into the panel rest 106.

Figure 2A:
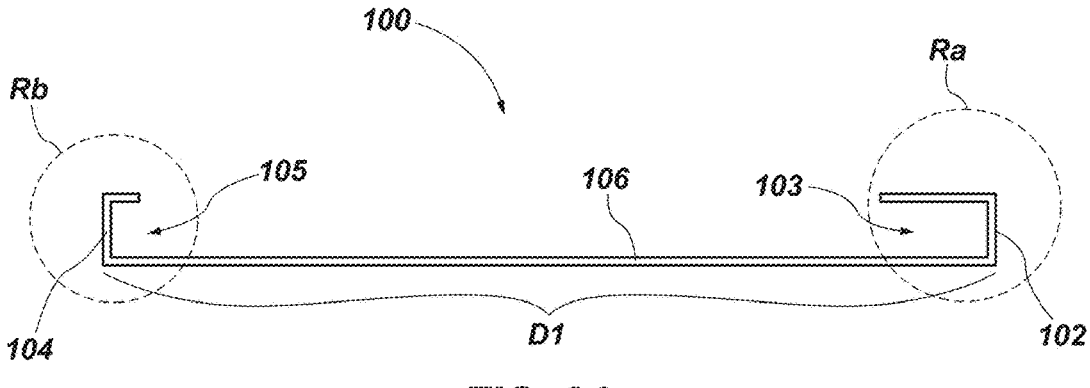
FIG. 2A illustrates a front view of the solar panel mount of FIG. 1.
Figure 2B:
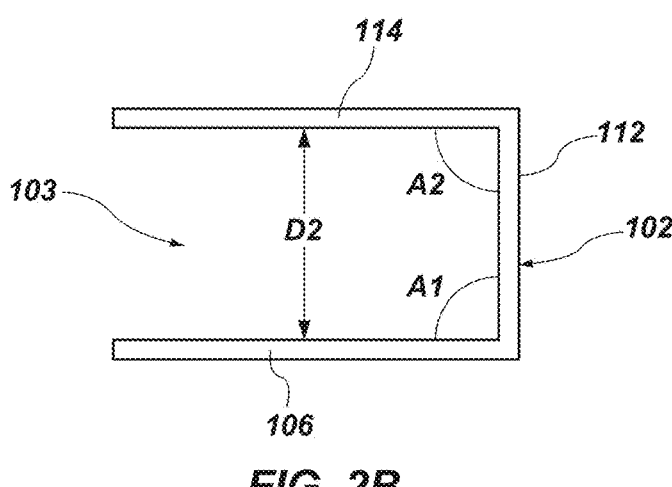
FIG. 2B illustrates a detailed view of a portion of the solar panel mount of FIG. 1 that is shown in region Ra of FIG. 2A.
Figure 2C:
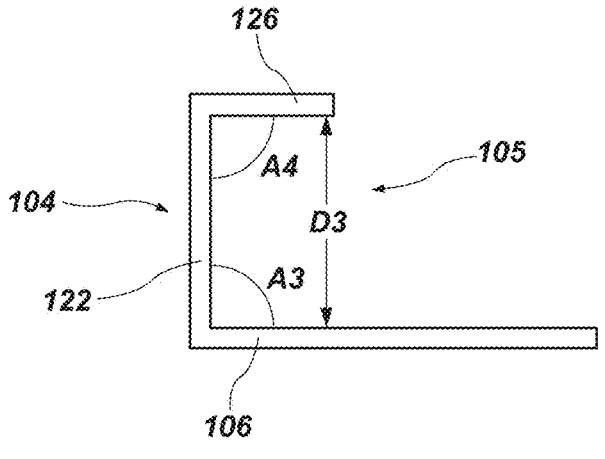
FIG. 2C illustrates a detailed view of a portion of the solar panel mount of FIG. 1 that is shown in region Rb of FIG. 2A.

FIGS. 2A, 2B, and 2C illustrate side and detailed views of solar panel mount 100, the first support structure 102, and the second support structure 104. As illustrated in FIG. 2A, the first support structure 102 of the solar panel mount 100 can be shaped substantially to define the first retaining channel 103 that opens toward the second support structure 104. The second support structure 104 of the solar panel mount 100 can also be shaped substantially to define the second retaining channel 105 that opens toward the first support structure 102. The first support structure 102 and the second support structure 104 can be disposed at opposing positions from each other and can be supported in their respective positions by the panel rest 106 at a distance sufficient to allow a solar panel to be inserted into and secured within and by the solar panel mount 100.

FIG. 2B illustrates a detailed view of the first support structure 102 of region Ra viewed from the side of FIG. 2A. As illustrated, the first support structure 102 can include a back stop 112 extending upward from the panel rest 106 at a first angle A1 and being configured to provide support to the first edge of the solar panel in the solar panel mount 100. The back stop 112 can be configured to have a height D2 that is greater than the first edge 302 of the solar panel 300 so that the first retaining channel 103 can be sized to accommodate the solar panel 300 at the first edge 302. The first support structure 102 can further include an upper guide stop 114 extending from the back stop 112 at a second angle A2 with respect to the back stop 112, and configured to facilitate guidance of the solar panel towards the back stop 112 and within the first retaining channel 103 during installation of the solar panel. Insertion of the solar panel into the first support structure 102 will be described in further detail with reference to other figures.

The back stop 112 can act as a stop for a solar panel being inserted into the solar panel mount 100 to restrict movement of the solar panel within the solar panel mount 100. The back stop 112 can further provide support for other members and structures extending from the back stop structure 112. For example, as shown, the back stop 112 can act as a support for the upper guide stop 114 extending from an upper end of the back stop 112. The back stop 112 can further act as a support for, or be supported by, the panel rest 106 adjoining a lower end of the back stop 112.

The panel rest 106 can extend away from the back stop 112 at an angle A1. As illustrated, the angle A1 can be perpendicular to the back stop 112. However, the disclosure is not intended to limit the angular degree of angle A1 in any way. The upper guide stop 114 can extend away from the back stop 112 at an angle A2. As illustrated, the angle A2 can also be perpendicular to the back stop 112, the same as the angle A1. However, the angle A2 is not intended to be limited in anyway by this disclosure and can be any angle suitable for receiving a solar panel into the solar panel mount 100. Additionally, the angles A1 and A2 can be the same as each other or different.

FIG. 2C shows a side view of the second support structure 104 of region Rb of FIG. 2A in greater detail. As illustrated, the second support structure 104 can include a back stop 122 operable to provide support to a second edge of a solar panel. The back stop 122 can be configured to have a height D3 that is greater than the second edge 304 of the solar panel 300 so that the second retaining channel 105 can be sized to accommodate the solar panel 300 at the second edge 304. The back stop 122 can act as a stop and support for an edge of the solar panel being inserted into and secured within the solar panel mount 100 to restrict movement of the solar panel within the solar panel mount 100. The back stop 122 can further provide support for other members and structures extending from the back stop 122. As shown, the back stop 122 can act as a support for or be supported by the panel rest 106 extending from a lower end of the back stop 122. The back stop 122 can further act as a support for an upper stop 126 extending from an upper end of the back stop 122. As illustrated, the upper stop 126 and the panel rest 106 can face each other to provide opposing surfaces to support faces of the solar panel inserted into the second support structure 104. In other words, the upper stop 126 and the panel rest 106 and the back stop 122 can together form a second retaining channel 105 operable to support a second edge of the solar panel opposite to the first edge of the solar panel supported in the first retaining channel 103 of the first support structure 102.

The upper stop 126 and the panel rest 106 can extend away from the back stop 122 at angles A4 and A3, respectively. As illustrated, the angles A3 and A4 can be perpendicular to the back stop 122. However, the disclosure is not intended to limit the angular degree of angles A3 and A4 in any way. Additionally, the angles A3 and A4 can be the same as each other or different.

The angles A3 and A4 can be selected from any range as long as the distance between the upper stop 126 and the panel rest 106 (whether in a relaxed position or in a flexed position in which the upper stop 126 and the panel rest 106 are flexed apart from each other) is sufficient to receive an edge of the solar panel inserted into the solar panel mount 100. Additionally, the size of the back stop 122 can be of any size adequate to support an edge of a solar panel. Both of the angles A3 and A4 can be sized such that the upper stop 126 and the panel rest 106 are parallel to each other and that the upper stop 126 aligns with the upper guide stop 114 of the first support structure 102. Furthermore, the upper guide stop 114 of the first support structure 102 can be parallel to the panel rest 106.

The angles A3 and A4 of the upper stop 126 and the panel rest 106 with respect to the edge support structure 122 can correspond to an angle at which the solar panel rests when installed into the first support structure 102 and the second support structure 104 of the solar panel mount 100. In other words, the angles A3 and A4 of the upper stop 126 and the panel rest 106 can correspond to an installed angle of the solar panel at which the solar panel rests in the installed position. Accordingly, the angles A3 and A4 can be set such that the upper stop 126 is in alignment with, or parallel to the panel rest 106 of the solar panel mount 100. The upper stop 126 and the panel rest 106 can be angled with respect to the edge support structure 122 to facilitate support of an edge of the solar panel by the edge support structure 122 and support of opposing faces of the solar panel by the upper stop 126 and the panel rest 106 when the solar panel is installed in the second support structure 104 of the solar panel mount 100. Alternative configurations of the second support structure 104 also exist. For example, upper stop 126 can be omitted and still have the second support structure 104 provide adequate support for the solar panel therein. The upper stop 126 can provide a retention surface to support and retain the solar panel in the solar panel mount 100. The back stop 112 and the back stop 122 can each act to provide support for an edge of the solar panel within the solar panel mount 100.

In operation, a solar panel 300 can be inserted into a solar panel mount such as solar panel mount 100, as illustrated with respect to FIGS. 3A-3E. With the example solar panel mount 100 shown, inserting the solar panel 300 can be accomplished by inserting the solar panel 300 into the first support structure 102 and causing the solar panel 300, and particularly different portions of the solar panel 300 (e.g., the first edge 302 of the solar panel), to be captured by first support structure 102 and secured within the first retention channel 103. As illustrated in FIGS. 3A-3E, the first retaining channel 103 and the second retaining channel 105 (and also the first support structure 102 and the second support structure 104) can be spatially positioned and oriented relative to one another to facilitate quick capture of the solar panel 300, and to secure the solar panel in the installed position within the solar panel mount 100.

Figures 3A, 3B, 3C, 3D, 3E:
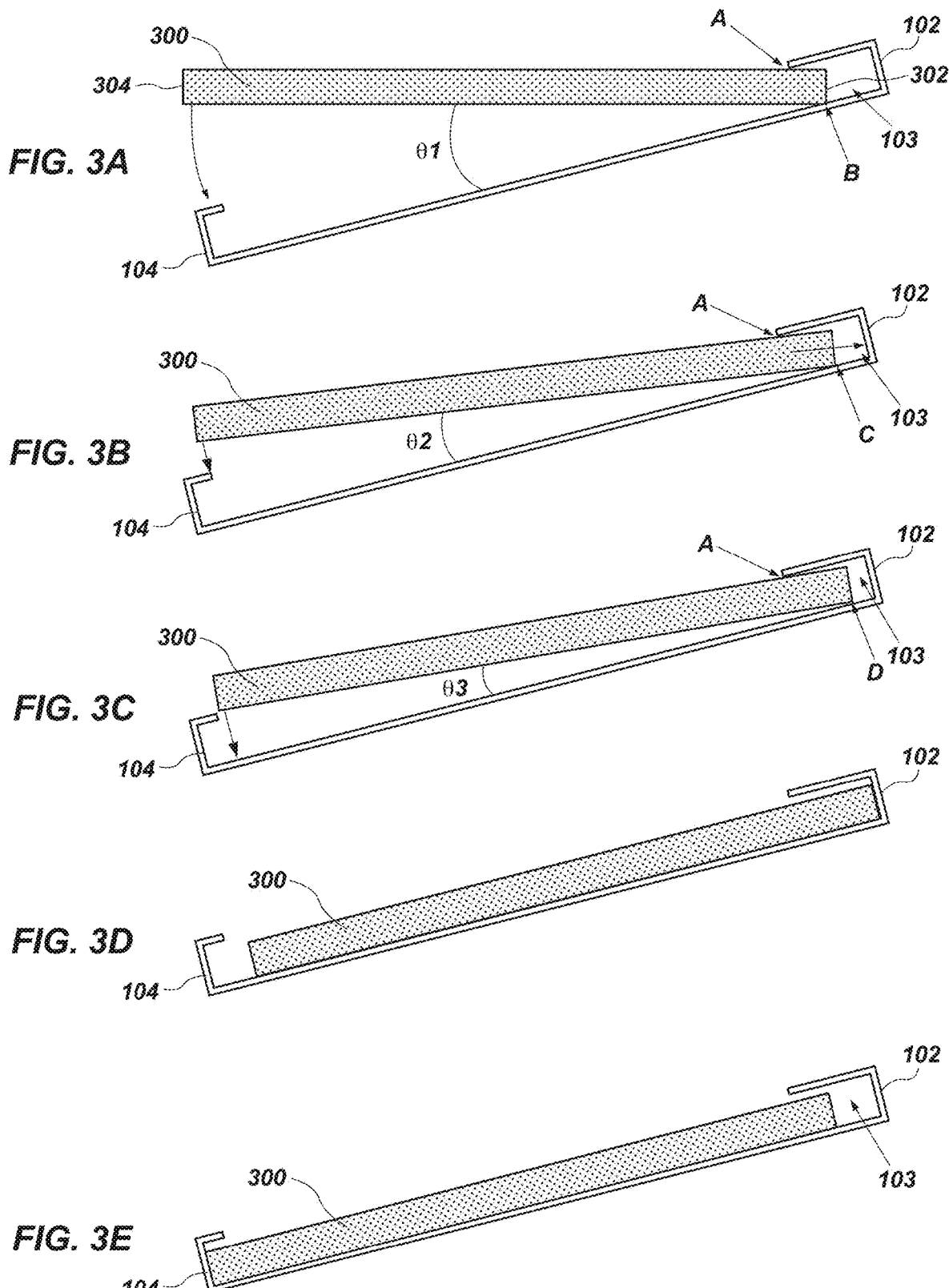
FIGS. 3A-3E illustrate various steps of a solar panel being installed in the solar panel mount of FIG. 1.

For example, the first edge 302 of the solar panel 300 can be inserted and rotated about a lateral axis so that it is oriented on an incline relative to the panel rest 106 when being inserted into the solar panel mount 100. The angle of incline of the solar panel upon an initial insertion of the solar panel 300 into the solar panel mount 100 is referred to herein as an access angle $\theta_1$ shown in FIG. 3A. With the solar panel 300 oriented on an access angle $\theta_1$, the first edge 302, for example, of the solar panel 300 can be initially inserted into the first support structure 102 defining the first retention channel 103 until coming in contact with the first support structure 102. The first edge 302 of the solar panel 300 can be inserted into the first retention channel 103 as far as possible at the access angle $\theta_1$ until the solar panel 300 comes in contact with the first support structure 102 at point A (see FIG. 3A, point A) and the panel rest 106 at point B. With the solar panel 300 in contact with point A and point B as shown in FIG. 3A, the solar panel 300 is bound from entering further into the first retention channel 103 defined by first support structure 102 at the angle $\theta_1$. Once in this position, the solar panel 300 can be inserted further into the first retention channel 103 by being rotated downward toward the panel rest 106, thereby decreasing the access angle to a new access angle $\theta_2$, wherein the first edge 302 of the solar panel 300 is able to be inserted further into the first retention channel 103 until another portion of the solar panel 300 comes in contact with the first support structure 102 at point A (see FIG. 3B, point A) and the panel rest 106 at point C, thus again limiting any further progression.

In this position, the solar panel 300 can be further rotated downward toward the panel rest 106 to further decrease the access angle to a new access angle $\theta_3$, wherein the first edge 302 of the solar panel 300 is able to be inserted even further into the first retention channel 103 until contact of another portion of the solar panel 300 with the solar panel mount 100 reaches point A and the solar panel 300 contacts point D of the panel rest 106 (see FIG. 3C, point D), which is just prior to when the first edge 302 of the solar panel 300 is able to clear the first support structure 102 at point A and the second edge 304 of the solar panel 300 is able to clear the upper stop 126 of the second support structure 104. The respective positions of the solar panel 300 relative to the solar panel mount 100 shown in each of FIGS. 3A, 3B, and 3C can be referred to as an "installation position."

The term "installation position" as used herein is intended to refer to a position and/or an angle at which a solar panel is initially inserted into, brought into contact or interface with, or aligned to be inserted, brought into contact with, or interface with the solar panel mount 100. In other words, an installation position can be any position at which the solar panel 300 can be positioned relative to a solar panel mount 100 to facilitate insertion of the solar panel 300 into the solar panel mount 100, but that is not the final installed position at which the solar panel is retained within the solar panel mount 100. As will be discussed below, the "installation position" is further intended to include, in some examples, a position where the solar panel is able to be inserted far enough into a first support structure (e.g., first support structure 402 of panel mount 400) far enough to allow the solar panel to clear a second support structure (e.g., second support structure 404 of panel mount 400) so that the solar panel can be brought into place against a panel rest (e.g., panel rest 406 of panel mount 400). The "installation position" is further intended to include, in some examples, a position where the solar panel is resting against the panel rest (e.g., panel rest 406 of panel mount 400), but is not yet resting against the second support structure (e.g., second support structure 404 of panel mount 400). Other exemplary installation positions, for example, can be found in FIGS. 3A-3D, 6A-6C, 6E, 7C, 8A-8C, 10A-10C, 11A-11C, and 15A-15C.

From the position shown in FIG. 3C, the solar panel 300 can clear the second support structure 104, be rotated downward into place against the panel rest 106 of the solar panel mount 100 where it can be fully inserted into the first support structure 102, as shown in FIG. 3D. In addition, with the solar panel 300 resting against the panel rest 106, the first edge 302 of the solar panel can slide upward all the way into the first retention channel 103 until contacting or interfacing with the back stop 112 (see FIG. 2B) of the first support structure 102, as shown in FIG. 3D.

Insertion of the solar panel 300 can also be accomplished by initiating insertion of the solar panel 300 into the first support structure 102 at an insertion angle (substantially corresponding to access angle $\theta_3$) by bringing portions of a lower surface of the solar panel 300 into close proximity or contact with the panel rest 106 near the first support structure 102 and the upper stop 126 (see FIG. 2C) of the second support structure 104. Having been brought into contact or close proximity with the panel rest 106 and the upper stop 126, the solar panel 300 can be in an installation position similarly or the same as shown FIG. 3C. At this position, the solar panel 300 can be slid far enough into the first retention channel 103 to allow the solar panel 300 to clear both the first support structure 102 and the second support structure 104 in order to facilitate the solar panel 300 being fully received into the solar panel mount 100 rested against the solar panel rest 106. Accordingly, most of the rotation between access angles $\theta_1$, $\theta_2$, and $\theta_3$ can be avoided or eliminated by simply initially installing the solar panel 300 with the solar panel 300 angled relative to the solar panel mount 100 at or near the access angle $\theta_3$ (hereinafter referred to as an installation angle). Additionally, any combination of the above-described insertion steps can be utilized, as will be appreciated.

As used herein, the term "installation angle" is intended to refer to an angle at which a solar panel is initially inserted into, brought into contact or interface with, or aligned to be inserted, brought into contact with, or interface with the solar panel mount 100. In other words, an installation angle can be any angle at which the solar panel 300 can be in an installation position relative to a solar panel mount 100 that is not the final installed position at which the solar panel is retained within the solar panel mount 100. Other exemplary installation positions, for example, can be found in FIGS. 3A-3D, 6A-6C, 6E, 7C, 8A-8C, 10A-10C, 11A-11C, and 15A-15C.

Once in the position shown in FIG. 3D seated against the panel rest 106, the solar panel 300 can then be slid along the panel rest 106 toward either of the back stop 112 of the first support structure 102 or the back stop 122 of the second support structure 104, thereby capturing the first edge 302 of the solar panel 300 in the first retention channel 103, capturing the second edge 304 of the solar panel 300 in the second retention channel 105, and securing the solar panel 300 within the solar panel mount 100. As shown in FIG. 3E, with the solar panel 300 fully positioned in the solar panel mount 100 and with the second edge 304 resting against the back stop 122 of the second support structure 104, the solar panel 300 is positioned beneath both the upper guide stop 114 of the first support structure 102 and the upper guide stop 126 of the second support structure 104. Therefore, the solar panel 300 is retained in the solar panel mount 100 by both the upper guide stop 114 and the upper stop 126. Thereby, the solar panel mount 100 is configured so as to maintain solar panel 300 within the first retention channel 103, the second retention channel 105, and against the panel rest 106.

As shown, the first retention channel 103 can be sized to be smaller than the second retention channel 105 by configuring the upper guide stop 114 to be larger and overhang the panel rest 106 by a greater distance than the upper guide stop 126, such that the overhang distance of the upper guide stop 126 is less than the overhang distance of the upper guide stop 114. With the solar panel mount 100 thus configured, the solar panel 300 is caused to be removable from the solar panel mount 100 in only one direction. For example, the solar panel 300 can be removed from the solar panel mount 100 by sliding the solar panel 300 within the mount 100 from the position shown in FIG. 3E to the position shown in FIG. 3D such that the solar panel 300 clears the upper guide stop 126 of the second support structure 104. Subsequently, the solar panel 300 can be lifted out of the solar panel mount 100 to at least the position shown in FIG. 3C and can then be backed out of the first retention channel 103 along a lengthwise axis of the solar panel. It is noted that although the above-recited process is described in a step-wise manner, that this is not intended to be limiting, but merely to assist in the understanding of the process. In practice, it is likely that the above-recited processes of inserting or removing the solar panel 300 from the solar panel mount 100 will be carried out in a single motion.

Figure 4:
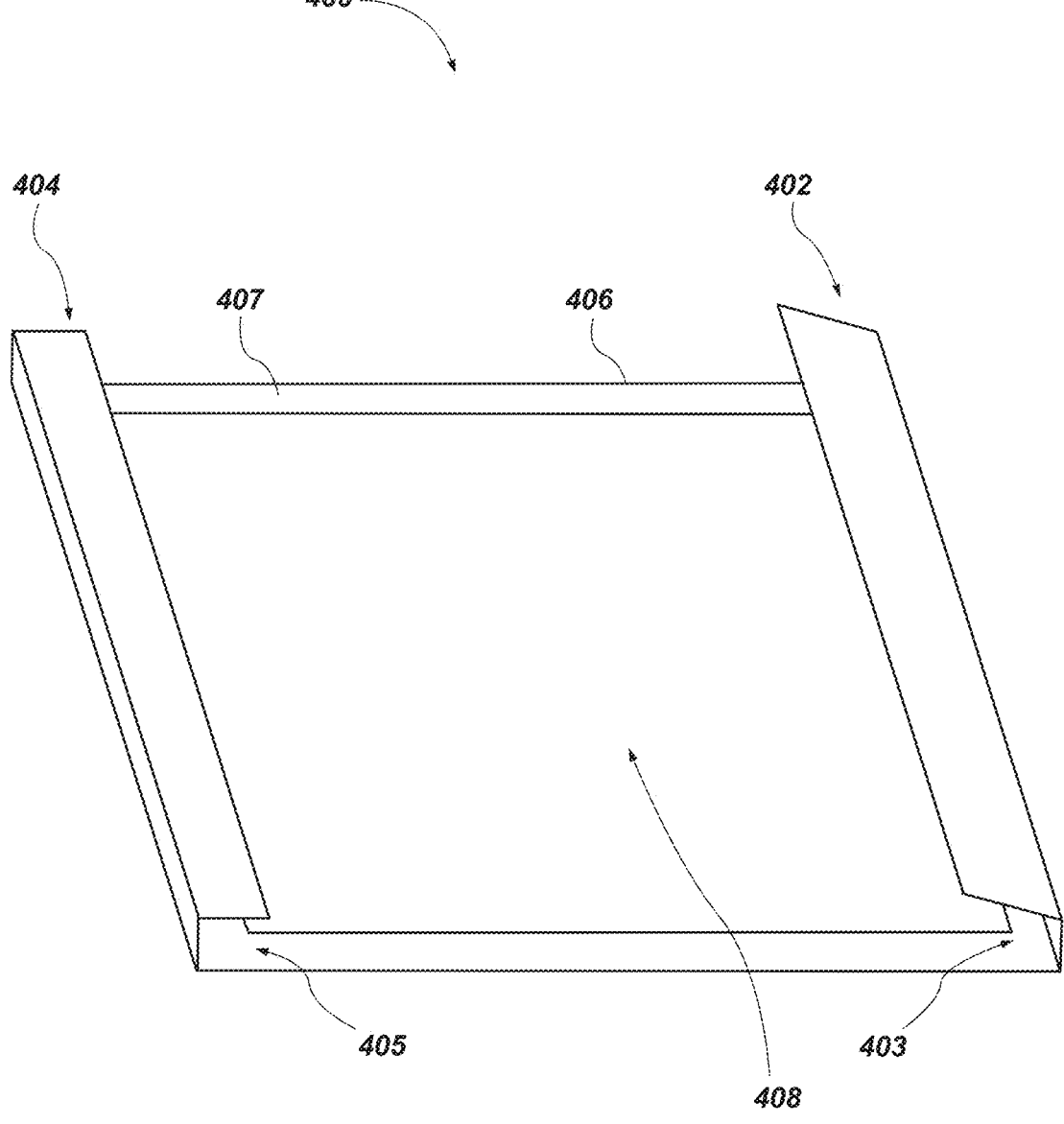
FIG. 4 illustrates a front elevation view of a solar panel mount in accordance with an example of the present disclosure.

Alternative configurations of a solar panel mount are contemplated by and described in this disclosure. As an alternative example, a solar panel mount can be configured as shown in FIG. 4. FIG. 4 illustrates a solar panel mount 400 in accordance with an example of the present disclosure. As illustrated, the solar panel mount 400 can be configured to hold a solar panel in an installed position in which the solar panel is operable to receive solar energy and generate electricity. The solar panel mount 400, which is similar in some respects to the solar panel mount 100, can include a first support structure 402 comprising and defining, at least in part, a first retaining channel 403 configured to receive and support a first edge of a solar panel in an installed position. The solar panel mount 400 can further include a second support structure 404 disposed at a position that is opposed to and offset from the first support structure 402. The second support structure 404 can comprise and define, at least in part, a second retaining channel 405 configured to receive and retain a second edge of the solar panel in the installed position to retain the solar panel in the first support structure 402. The first and second retention channels 403 and 405 can be configured as c-channels, or any other channel suitable to receive a solar panel. The solar panel mount 400 can further include a panel rest 406 comprising configured to receive and support a lower surface of the solar panel in the installed position.

In one example, the panel rest 406 can be configured similar to the panel rest 106 as shown in solar panel mount 100, namely the panel rest 406 can include a support surface 407 configured to support a solar panel. Alternatively, as illustrated, the panel rest 406 can comprise one or more rails that define one or more apertures 408 of any size or shape formed therein to allow for additional elements to interface with the solar panel through the one or more apertures 408. For example, a retention latch, as will be described further later on, could interface with a solar panel through an aperture in the panel rest to hold the solar panel in place within the solar panel mount. The panel rest 406 can be integrally formed with at least one of the first support structure 402 or the second support structure 404 or it can be formed separately and attached to the support structures 402 or 404. Furthermore, the panel rest 406 can comprise one piece (e.g., rail) or a plurality of pieces (e.g., rails) formed or joined into the panel rest 406.

Figure 5A:
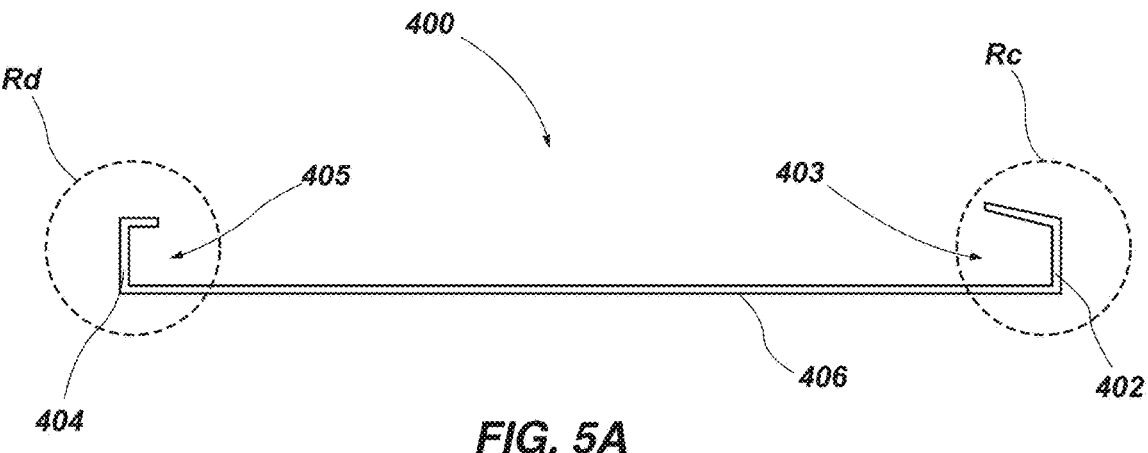
FIG. 5A illustrates a front view of the solar panel mount of FIG. 4.
Figure 5B:
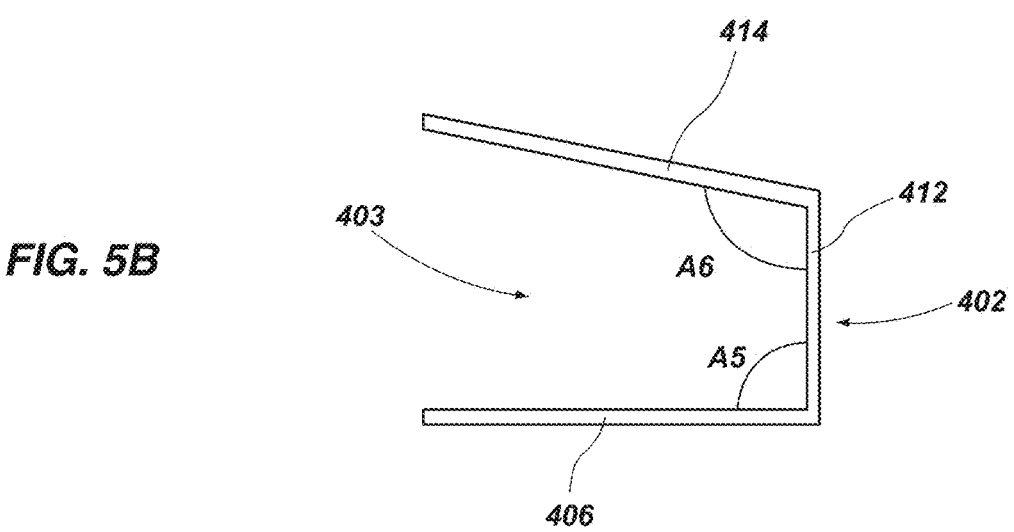
FIG. 5B illustrates a detailed view of a portion of the solar panel mount of FIG. 4 that is shown in region Rc of FIG. 5A.
Figure 5C:
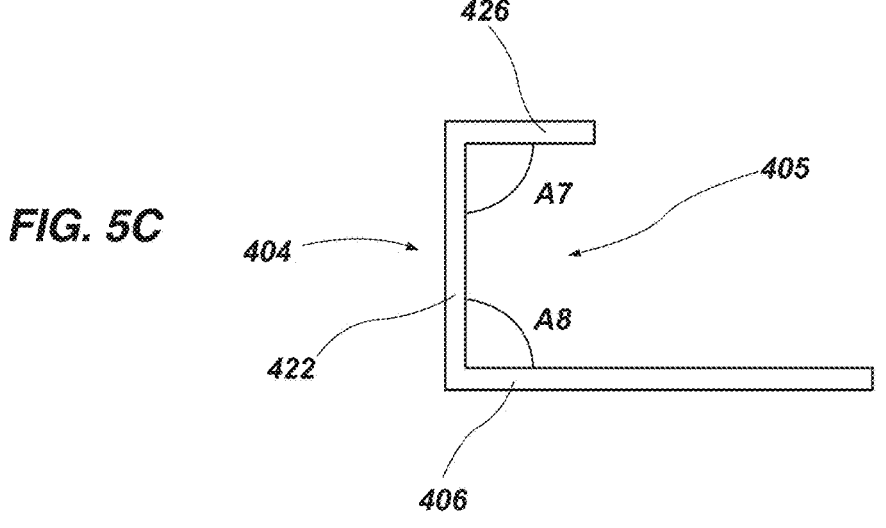
FIG. 5C illustrates a detailed view of a portion of the solar panel mount of FIG. 4 that is shown in region Rd of FIG. 5A.

FIGS. 5A, 5B, and 5C illustrate side and detailed views of solar panel mount 400, the first support structure 402, and the second support structure 404. As illustrated in FIG. 5A, the first support structure 402 of the solar panel mount 400 can be shaped substantially to define the first retaining channel 403 that opens toward the second support structure 404. The second support structure 404 of the solar panel mount 400 can also be shaped substantially to define the second retaining channel 405 that opens toward the first support structure 402. The first support structure 402 and the second support structure 404 can be disposed at opposing positions from each other and can be supported in their respective positions by the panel rest 406 at a distance sufficient to allow a solar panel to be inserted into and secured within and by the solar panel mount 400. The panel rest 406 can be a length that is greater than a length of a solar panel that is to be retained in the solar panel mount 400 in order to fully accommodate a solar panel 300 in the mount 400. In other words, the first and second retaining channels 403 and 405 spaced apart by the panel rest 406 can be spatially positioned apart from, and oriented relative to, one another at a distance greater than a length of the solar panel 300 such that the first retaining channel is positioned to receive the first edge 302 of the solar panel 300 and the second retaining channel is positioned to receive a second edge 304 of the solar panel 300 opposite the first edge to secure the solar panel in the installed position (see FIGS. 3E, 6D, 7A, 7B, 10D).

FIG. 5B illustrates a detailed view of the first support structure 402 viewed from the side of FIG. 5A. As illustrated, the first support structure 402 can include a back stop 412 extending upward from the panel rest 406 at a first angle A5 and being configured to provide support to the first edge of the solar panel in the solar panel mount 400. The back stop 412 can be configured to have a height that is greater than the first edge 302 of the solar panel 300 so that the first retaining channel 403 can be sized to accommodate the solar panel 300 at the first edge 302. The first support structure 402 can further include an upper guide stop 414 extending from the back stop 412 at a second angle A6 with respect to the back stop 412, and configured to facilitate guidance of the solar panel towards the back stop 412 and within the first retaining channel 403 during installation of the solar panel. Insertion of the solar panel into the first support structure 402 will be described in further detail with reference to other figures.

The back stop 412 can act as a stop for a solar panel being inserted into the solar panel mount 400 to restrict movement of the solar panel within the solar panel mount 400. The back stop 412 can further provide support for other members and structures extending from the back stop structure 412. For example, as shown, the back stop 412 can act as a support for the upper guide stop 414 extending from an upper end of the back stop 412. The back stop 412 can further act as a support for, or be supported by, the panel rest 406 adjoining a lower end of the back stop 412.

The panel rest 406 can extend away from the back stop 412 at an angle A5. As illustrated, the angle A5 can be perpendicular to the back stop 412. However, the disclosure is not intended to limit the angular degree of angle A5 in any way. The angle A5 (e.g., the angle of the panel rest) can correspond to an angle at which the solar panel is supported by the panel rest 406 when the solar panel is in the installed position within the solar panel mount 400. The upper guide stop 414 can extend away from the back stop 412 at an angle A6. As illustrated in FIG. 5B, the angle A6 can be offset from perpendicular (e.g., an obtuse angle) with respect to the back stop 412 and angled away from the panel rest 406 to form an angle that is greater than perpendicular with respect to the back stop 412 and to facilitate installing the solar panel into the solar panel mount 400 at a different angle than the final resting angle of the solar panel when finally installed within the solar panel mount 400. As will be described in further detail below, the, different, open (e.g., wider) quality of the angle A6 compared to the other angles (A5, A7, and A8) described herein allows for the solar panel to be easily inserted into the solar panel mount 100 and then moved to the final installed angle and position. The angle of the upper guide stop 414 allows for a wider range of installation angles than the solar panel mount 100. Stated another way, the solar panel being inserted into the first retaining channel 403 can be installed at a wide range of installation angles without binding of the solar panel against the first support structure 402 being as much of a concern as in solar panel mount 100.

The angle A6 of the upper guide stop 414 with respect to the back stop 412 corresponds to an angle having a sufficient size to receive a solar panel at an angle at which the solar panel is inserted in to the first support structure 402, during installation of the solar panel into the solar panel mount 400. In other words, the angle A6 of the guide structure 414 can correspond to an insertion angle of the solar panel. The angle A6 can also be larger than the insertion angle of the solar panel to facilitate insertion of the solar panel into the first support structure 402 during installation. The upper guide stop 414 can be angled toward the back stop 412 to guide an edge of the solar panel toward the back stop 412 to seat the solar panel at the back stop 412.

FIG. 5C shows a side view of the second support structure 404 in greater detail. As illustrated, the second support structure 404 can include a back stop 422 operable to provide support to a second edge of a solar panel. The back stop 422 can be configured to have a height that is greater than the second edge 304 of the solar panel 300 so that the second retaining channel 405 can be sized to accommodate the solar panel 300 at the second edge 304. The back stop 422 can act as a stop and support for an edge of the solar panel being inserted into and secured within the solar panel mount 400 to restrict movement of the solar panel within the solar panel mount 400. The back stop 422 can further provide support for other members and structures extending from the back stop 422. As shown, the back stop 422 can act as a support for or be supported by the panel rest 406 extending from a lower end of the back stop 422. The back stop 422 can further act as a support for an upper stop 426 extending from an upper end of the back stop 422. As illustrated, the upper stop 426 and the panel rest 406 can face each other to provide opposing surfaces to support faces of the solar panel inserted into the second support structure 404. In other words, the upper stop 426 and the panel rest 106 and the back stop 422 can together form a second retaining channel 405 operable to support a second edge of the solar panel opposite to the first edge of the solar panel supported in the first retaining channel 403 of the first support structure 402.

The upper stop 426 and the panel rest 406 can extend away from the back stop 422 at angles A7 and A8, respectively. As illustrated, the angles A7 and A8 can be perpendicular to the back stop 422. However, the disclosure is not intended to limit the angular degree of angles A7 and A8 in any way. Additionally, the angles A7 and A8 can be the same as each other or different.

The angles A7 and A8 can be selected from any range as long as the distance between the upper stop 426 and the panel rest 406 (whether in a relaxed position or in a flexed position in which the upper stop 426 and the panel rest 406 are flexed apart from each other) is sufficient to receive an edge of the solar panel inserted into the solar panel mount 400. Additionally, the size of the back stop 422 can be of any size adequate to support an edge of a solar panel. Both of the angles A7 and A8 can be sized such that the upper stop 426 and the panel rest 406 are parallel to each other and that the upper stop 426 is oriented toward with the upper guide stop 414 of the first support structure 402. Furthermore, the upper guide stop 414 of the first support structure 402 can be offset from parallel to the panel rest 406.

The angles A7 and A8 of the upper stop 426 and the panel rest 406 with respect to the edge support structure 422 can correspond to an angle at which the solar panel rests when installed into the first support structure 402 and the second support structure 404 of the solar panel mount 400. In other words, the angles A7 and A8 of the upper stop 426 and the panel rest 406 can correspond to an installed angle of the solar panel at which the solar panel rests in the installed position. Accordingly, the angles A7 and A8 can be set such that the upper stop 426 is in alignment with, or parallel to the panel rest 406 of the solar panel mount 400. The upper stop 426 and the panel rest 406 can be angled with respect to the edge support structure 422 to facilitate support of an edge of the solar panel by the edge support structure 422 and support of opposing faces of the solar panel by the upper stop 426 and the panel rest 406 when the solar panel is installed in the second support structure 404 of the solar panel mount 400. Alternative configurations of the second support structure 404 also exist. For example, upper stop 426 can be omitted and still have the second support structure 404 provide adequate support for the solar panel therein. The upper stop 426 can provide a retention surface to support and retain the solar panel in the solar panel mount 400. The back stop 412 and the back stop 422 can each act to provide support for an edge of the solar panel within the solar panel mount 400.

In operation, a solar panel 300 can be inserted into a solar panel mount 400, as illustrated with respect to FIGS. 6A-6D. With reference to FIGS. 5A-5C and FIGS. 6A-6D, the example solar panel mount 400 shown, inserting the solar panel 300 can be accomplished by inserting the solar panel

300 into the first support structure 402 and causing the solar panel 300, and particularly different portions of the solar panel 300 (e.g., the first edge 302 of the solar panel), to be captured by first support structure 402 and secured within the first retention channel 403. As illustrated in FIGS. 6A-6D, the first retaining channel 403 and the second retaining channel 405 (at least partially defined by the first support structure 402 and the second support structure 404) can be spatially positioned and oriented relative to one another to facilitate quick capture of the solar panel 300, and to secure the solar panel in the installed position within the solar panel mount 400.

Figure 6A:
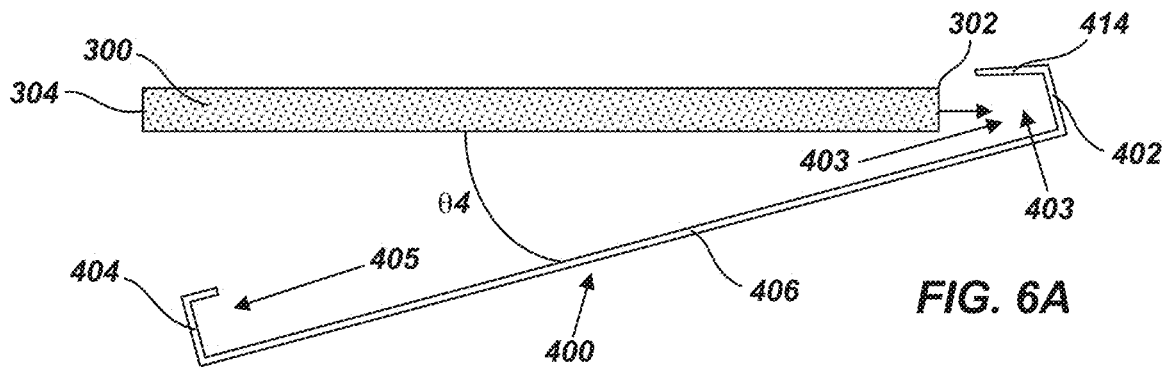
FIGS. 6A-6E illustrate various steps and insertion/installation angles of a solar panel being installed in the solar panel mount of FIG. 4.

For example, the first edge 302 of the solar panel 300 can be inserted and rotated about a lateral axis so that it is oriented on an incline relative to the panel rest 406 when being inserted into the solar panel mount 100. The angle of incline of the solar panel upon an initial insertion of the solar panel 300 into the solar panel mount 400 is referred to herein as an access angle $\theta_4$ shown in FIG. 6A. As shown in FIGS. 5B and 6A, the angle A6 of the upper guide stop 414 relative to the back stop 412 on first support structure 402 allows for a much wider range of access angles for insertion of the solar panel 300 into the solar panel mount 400 as compared to the solar panel mount 100. For example, with the solar panel 300 oriented on an access angle $\theta_4$, the first edge 302 of the solar panel 300 can be inserted substantially fully (e.g., up to a point where contact between the solar panel 300 and the back stop 412 is possible) into the first support structure 402 defining the first retention channel 403 without the need of additional rotation steps as shown in FIGS. 3A-3E with reference to solar panel mount 100.

As shown in FIG. 6A, the solar panel 300 can be inserted into the solar panel mount 400 at angle $\theta_4$ such that the solar panel 300 is substantially aligned with and/or parallel to the upper guide stop 414 of the first support structure 402. In this angle $\theta_4$, the second edge 302 of the solar panel 300 can be inserted into first support structure 402 and the first retention channel 403 much further than the solar panel 300 can be inserted into the first support structure 102 and first retention channel 103 of the solar panel mount 100 shown in FIGS. 3A-3E. For example, the first edge 302 can be inserted completely, or nearly completely, into the first retention channel 403 at the access angle $\theta_4$, which may not be possible at steeper angles (such as $\theta_4$) for the solar panel mount 100 without causing the solar panel 300 to bind against the first support structure 102, thereby preventing a deep or full insertion of the solar panel 300 into the first support structure 100.

Figure 6B:
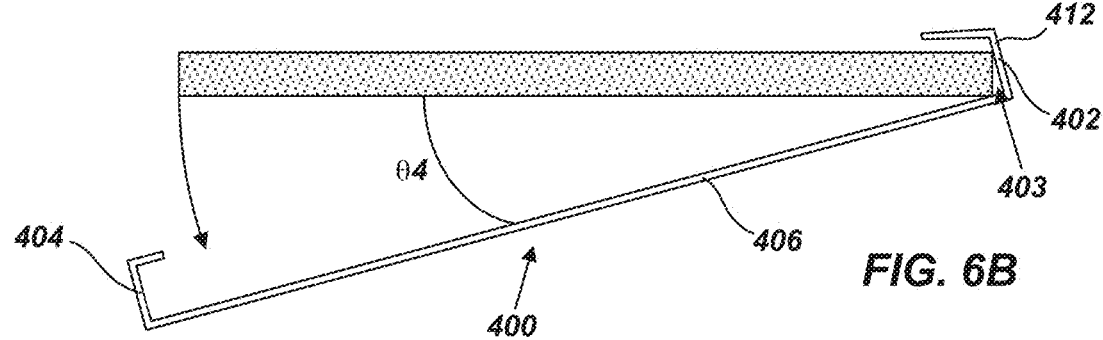
Figure 6C:
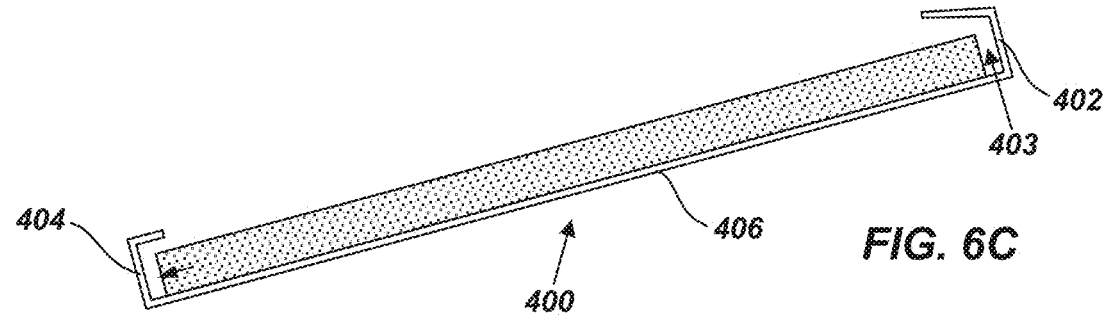
Figure 6D:
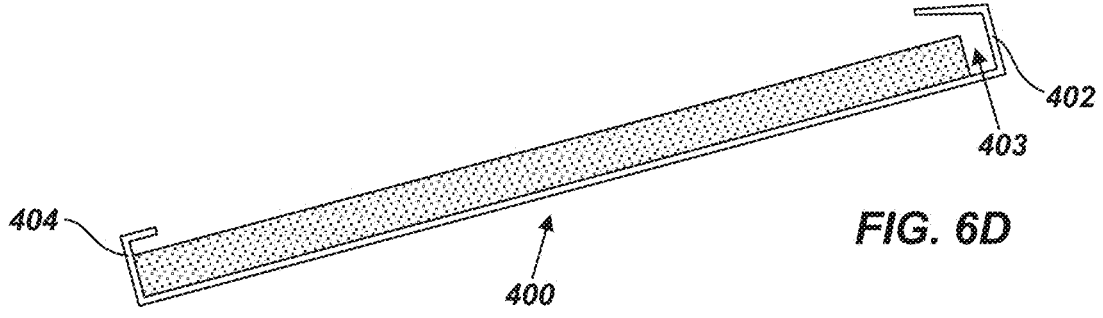
Figure 6E:
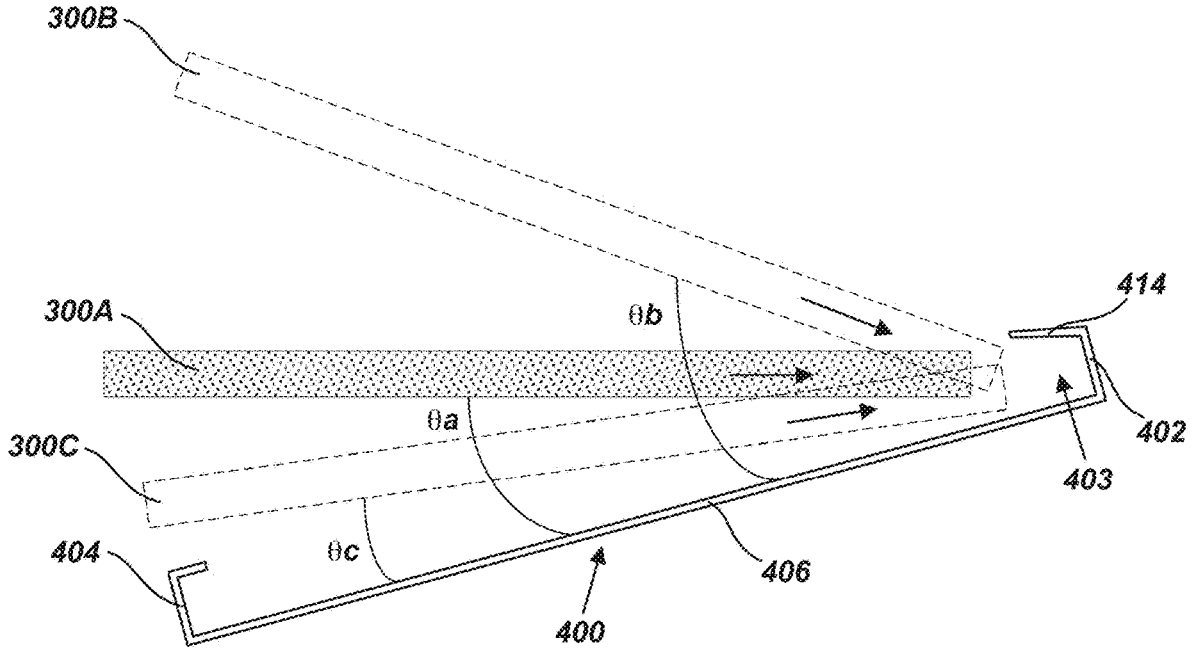

As shown in FIG. 6B, even at the steep angle of $\theta_4$ the solar panel 300 can be inserted into the first retention channel 403 until it abuts the back stop 412 of the first support structure 402 without requiring additional rotation of the solar panel 300 toward the panel rest 406. As illustrated in FIG. 6C, the solar panel 300 can clear the second support structure 404 and rotate into position against the solar panel rest 406. Additionally, the solar panel 300 can move toward the second support structure 404 within the solar panel mount 400 and eventually rest against the second support structure 404 and the panel rest 406 to be retained within the solar panel mount 400. The lengths of the upper guide stop 414 and upper guide stop 426 of the first and second support structures 402 and 404, respectively, can be formed and set apart from each other to ensure the solar panel 300 can be retained and cannot be removed from the solar panel mount unless the solar panel 300 is moved up toward the first support structure 402 and then rotated away from the solar panel rest 406 to clear the second support structure 404, as shown in the position illustrated in FIG. 6B.

Additionally, since the first retention channel 403 defined by the first support structure 402 has a much wider opening than the dimension of the edge 302 of the solar panel 300, wider angles than $\theta_4$ are also possible for the solar panel 300 to be inserted into the solar panel mount 400. Smaller angles are also possible for the solar panel 300 to be inserted into the first support structure 402. For example, with reference to FIG. 6E, exemplary angles of insertion are illustrated with reference to the solar panel 300. The solar panel can be inserted as an example at an orientation of a solar panel 300A in which the solar panel is inserted at an access angle of $\theta_a$ in which the solar panel 300A is substantially aligned with or parallel to the upper guide stop 414. The solar panel can be inserted as an example at an orientation of a solar panel 300B in which the solar panel is inserted at an access angle of $\theta_b$ in which the solar panel 300B is at a steeper angle than $\theta_a$. With the wide opening of the first retention channel 403, the first retention channel 403 can receive the solar panel 300b to the back stop 412 at a plurality of angles as long as the angle of access allows for the solar panel 300B between the upper guide stop 414 and the panel rest 406. Additionally, the solar panel can be inserted as an example at an orientation of a solar panel 300C in which the solar panel is inserted at an access angle of $\theta_c$ in which the solar panel 300C is at a shallower angle than $\theta_c$. With the wide opening of the first retention channel 403, the first retention channel 403 can receive the solar panel 300b to the back stop 412 at a plurality of angles (e.g., angles steeper than, shallower than, or aligned with the upper guide stop) as long as the angle of access allows for the solar panel 300B between the upper guide stop 414 and the panel rest 406.

Figure 7A:
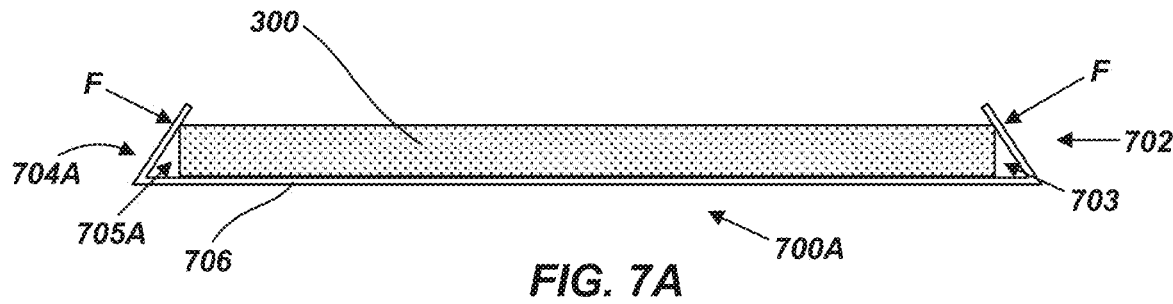
FIG. 7A illustrates a front view of a solar panel mount in accordance with an example of the present disclosure.

FIGS. 7A-7D illustrate alternative configurations for a solar panel mount configured to receive, retain, and support a solar panel in an installed position. FIG. 7A illustrates a solar panel mount 700A in accordance with an example of the present disclosure. As illustrated, the solar panel mount 700A can include a first support structure 702 defining, at least in part, a first retaining channel 703 configured to receive and retain a first edge of the solar panel in the installed position and a second support structure 704A defining at least in part a second retaining channel 705A configured to receive and retain a second edge of the solar panel in the installed position. The solar panel mount 700A can further include a panel rest 706 comprising a seating surface configured to receive and support a lower surface of the solar panel 300 in the installed position. The panel rest 706 can be a length that is greater than a length of a solar panel 300 that is to be retained in the solar panel mount 700 in order to fully accommodate a solar panel 300 in the mount 700. In other words, the first and second retaining channels 703 and 705 spaced apart by the panel rest 706 can be spatially positioned apart from, and oriented relative to, one another at a distance greater than a length of the solar panel 300 such that the first retaining channel is positioned to receive the first edge 302 of the solar panel 300 and the second retaining channel is positioned to receive a second edge 304 of the solar panel 300 opposite the first edge to secure the solar panel in the installed position (see FIGS. 3E, 6D, 7A, 7B, 10D).

Figure 7B:
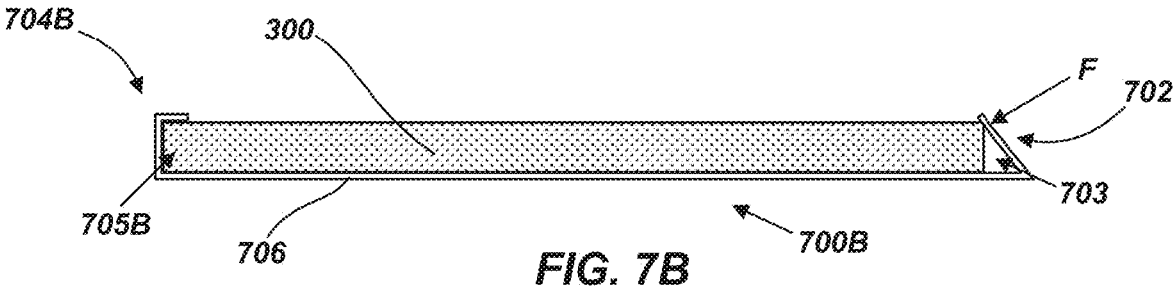
FIG. 7B illustrates a front view of a solar panel mount in accordance with an example of the present disclosure.

FIG. 7B illustrates a solar panel mount 700B in accordance with an example of the present disclosure. As illustrated, the solar panel mount 700B can include a first support structure 702 defining, at least in part, a first retaining channel 703 configured to receive and retain a first edge of the solar panel in the installed position and a second support structure 704B defining at least in part a second retaining channel 705B configured to receive and retain a second edge of the solar panel in the installed position. The solar panel mount 700B can further include a panel rest 706 comprising a seating surface configured to receive and support a lower surface of the solar panel 300 in the installed position.

In both of the solar panel mounts 700A and 700B, the first retaining channels and the second retaining channels are spatially positioned and oriented relative to one another to facilitate quick capture of the solar panel 300, and to secure the solar panel 300 in the installed position. As illustrated in FIG. 7A, the first support structure 702 and the second support structure 704A of the solar panel mount 700A have substantially the same configuration, while in FIG. 7B, the first support structure 702 and the second support structure 704B have different configurations from each other. The second support structure 704B of the solar panel mount 700B is configured similar or the same to the support structures 104 and 404 illustrated in at least FIGS. 2C and 5C. Accordingly, a further discussion of second support structure 704B will not be given here as such support structures are discussed in more detail elsewhere in this disclosure.

The support structures 702 and 704A of the solar panel mounts 700A and 700B are illustrated as being the same or similar in configuration. For example, as shown, with further reference to FIG. 7C, the first support structure 702, as well as the second support structure 704A, can include a guide stop 712 extending upward from the panel rest 706. As shown the guide stop 712 can be angled with respect to the panel rest 706 at an angle of $\theta_d$ with respect to the panel rest 706. The guide stop 712 can be configured to facilitate guidance of the solar panel 300 towards the panel rest 706 and within the first retaining channel 703 during installation of the solar panel 300 into the solar panel mount including the support structure.

As illustrated in both FIGS. 7A and 7B, the distance between tips of the guide stops of the first and second support structures 702, 704A, and 704B is configured to be less than a length of the solar panel 300. Accordingly, the solar panel 300 cannot be inserted between the guide stops of the support structures 702, 704A, and 704B in either of FIGS. 7A and 7B unless flexure or pivoting of one or more of the guide stops is caused during insertion of the solar panel 300. The insertion of the solar panel 300 into solar panel mounts 700A and 700B is illustrated and explained in further detail with reference to FIGS. 7C and 7D. It will be understood that while FIGS. 7C and 7D are of different scale than FIGS. 7A and 7B, FIGS. 7C and 7D are merely used to illustrate the insertion of a solar panel 300 into a solar panel mount and would be workable with any scale of mount or solar panel.

Figure 7C:
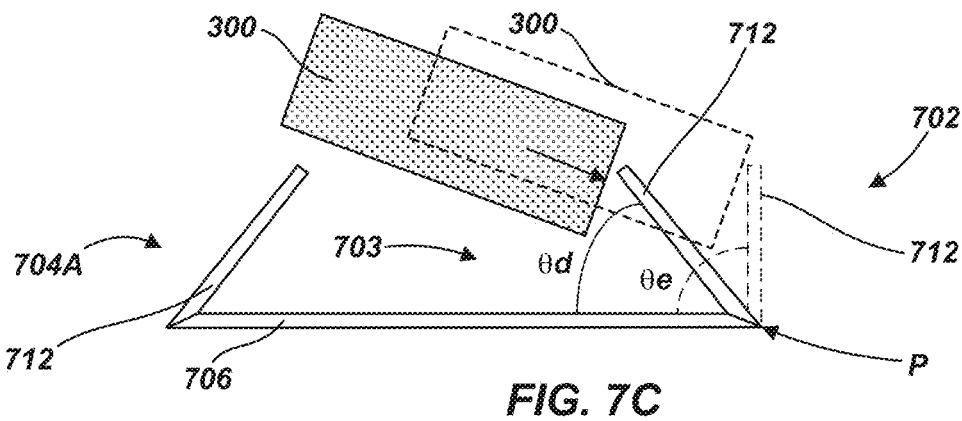
FIGS. 7C and 7D illustrate various steps of a solar panel being installed in the solar panel mount of FIG. 7A.

As shown in FIG. 7C, the solar panel 300, upon insertion toward the guide stop 712 of the first support structure 702, contacts a portion or tip of the guide stop 712. Under a load or force from movement or manipulation of the solar panel 300, the guide stop 712 can be caused to deflect and a distance from the second support structure 704A increased or extended in order to create a distance between the first and second support structures 702 and 704A, B sufficient to allow the solar panel 300 to fit between the first and second support structures 702 and 704A, B. For example, the guide stop 712 can be oriented at an angle $\theta_d$, which can be an acute angle, with respect to the panel rest 706 in an un-flexed position. Under a load, the guide stop 712 can deflect to a flexed position that is more open than the un-flexed position and oriented at an angle $\theta_e$ with respect to the panel rest 706.

The angle $\theta_e$ can be an angle that is larger than $\theta_d$ in order to open or widen the distance between the support structures and allow the solar panel 300 to be received in the solar panel mount 700A, B. In the deflected position associated with angle $\theta_e$, the guide stop 712 can be deflected enough to accommodate the solar panel 300 clearing the second support structures 704A, B. Accordingly, the solar panel 300 can be lowered into place to seat and rest against the panel rest 706. As illustrated, the guide stops 712 can have a height greater than the solar panel 300 accommodated in the mount 700. However, the guide stops can be shorter than the solar panel 300 and still retain the solar panel 300 in the mount 700 by contacting edges of the solar panel 300.

Figure 7D:
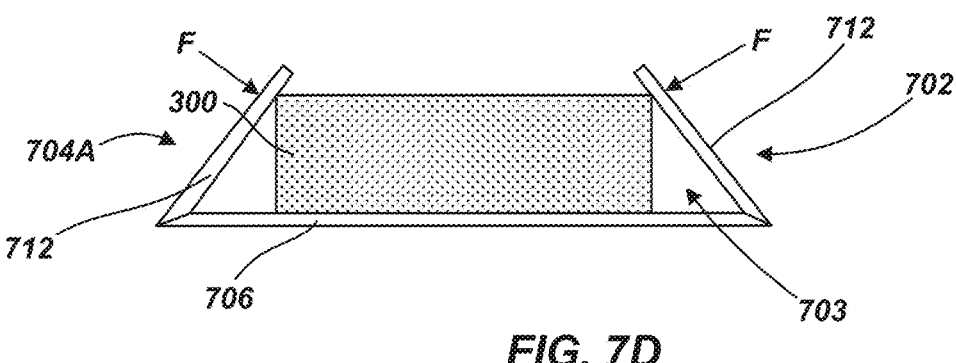

As shown in FIG. 7D, when the solar panel 300 is seated against the panel rest 706, the guide stop 712 can be configured to spring back to or near the un-flexed state. In this configuration, both of the support structures 702 and 704A can provide a force F pressing the solar panel 300 toward the opposing support structure and against the panel rest 706 to retain the solar panel in the solar panel mount 700A. It will be understood by those skilled in the art that both of the guide stops 712 of the first and second supporting structures 702 and 704 may be in the un-flexed state when holding the solar panel 300 or may not be in a completely un-flexed state while the solar panel 300 is in the solar panel mount 700A. Instead each of the guide stops 712 may be partially flexed and attempting to spring back to the un-flexed state in order to exert the force F against the solar panel. In accordance with spring mechanics, the more the guide stops 712 are deflected, the greater the spring force exerted on the solar panel 300.

Although FIGS. 7C and 7D illustrate a configuration of a solar panel mount 700A including support structures as shown in FIG. 7A, it will be appreciated that the guide stop 702 can provide a similar function in the solar panel mount 700B of FIG. 7B. For example, the guide stop 712 of the first support structure 702 can flex to allow clearance for the solar panel 300 to fit between the first support structure 702 and the second support structure 704B and can provide a force F to retain the solar panel 300 within the second support structure 704B.

It will be appreciated by those skilled in the art that the solar panel mount, or at least the guide stops 712, can be made of a compliant or spring material such as a spring steel, a polymer, or other appropriate material to facilitate flex or deflection and return to an un-flexed state after a force is removed from the guide stops 712. Additionally, the guide stops 712 can be attached to the solar panel rest via a hinge, spring hinge, spring, or other flexible joint to pivot about point P. In short, any mechanism or configuration configured to cause flexure and/or pivoting of the guide stop 712 relative to the panel rest 706 is intended to be within the scope of this disclosure for attaching the guide stop 712 to the panel rest 706 without any intended limitations.

An alternative support structure is illustrated in FIGS. 8A-8D. It will be appreciated that any of the solar panel mounts described herein can be modified or designed and formed to include any of the support structures (e.g., any combination of support structures 102, 104, 402, 404, 702, 704A, 704B, 802, or any support structure formed in accordance with the principles described herein) in any combination and configuration.

Figure 8A:
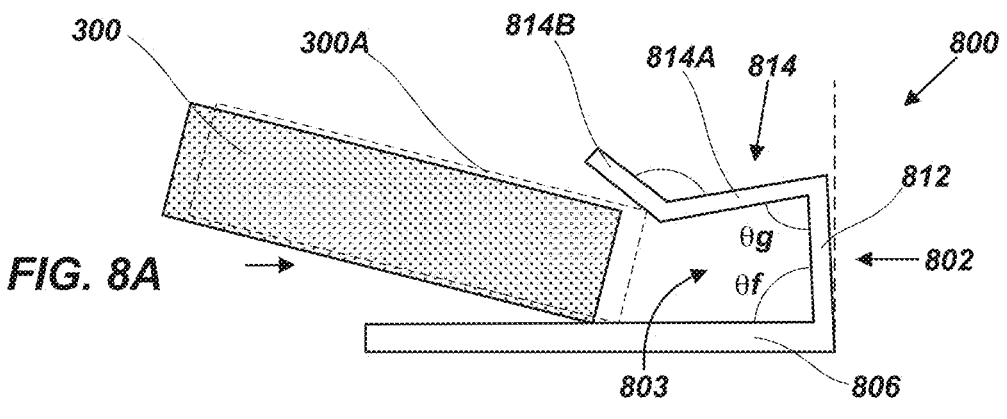
FIGS. 8A-8D illustrate various steps of a solar panel being installed in a solar panel mount including a support structure in accordance with an example of the disclosure.

FIG. 8A illustrates a support structure 802 defining, at least in part, a retaining channel 803 configured to receive and retain a first edge of the solar panel 300 in an installed position. The support structure 802 can include a back stop 812 configured to provide support to the first edge of the solar panel 300. The back stop 812 can be configured to have a height that is greater than the first edge 302 of the solar panel 300 so that the first retaining channel 803 can be sized to accommodate the solar panel 300 at the first edge 302. The back stop 812 can be oriented at an angle $\theta_f$ with respect to a panel rest 806. The angle $\theta_f$ is illustrated as being less than 90 degrees with respect to the panel rest 806. However, it will be appreciated that the angle $\theta_f$ is not intended to be limited in any way and can be such that the back stop 812 can be perpendicular to the panel rest 806 or can be the angle $\theta_f$ can be greater than 90 degrees. The support structure 802 can further include an upper guide stop 814 extending from the back stop 812 at an angle $\theta_g$ with respect to the back stop 812, and configured to facilitate guidance of the solar panel 300 towards the back stop 812 and within the retaining channel 803 during installation of the solar panel 300 in to the solar panel mount 800. The angle $\theta_g$ can be an angle less than 90 degrees in an un-flexed state of the support structure 802 as shown in FIG. 8A, however the angle $\theta_g$ is not intended to be so limited.

As illustrated the upper guide stop 814 can include two portions including a first portion 814A that is interfaced with the back stop 812 and a second portion 814B that is at an end of the first portion 814A. The first portion can be oriented with respect to the back stop 812 at the angle of $\theta_g$ at which the first portion 814A is angled toward the panel rest 806, and the second portion can be oriented at an angle $\theta_h$ with respect to the first portion 814A such that the second portion 814B is angled away from the panel rest 806 to facilitate guiding the solar panel 300 toward the panel rest 806 and into the retention channel 803.

FIG. 8A illustrates initial insertion of the solar panel 300 into the solar panel mount 800. As shown, the solid illustrated solar panel 300 can be moved toward the support structure 802 defining the retention channel 803 up to a point illustrated as dashed line 300A showing a position at which the solar panel contacts the second portion 814B of the upper guide stop 814. As illustrated, at this point the opening of the retention channel 803, defined by the support structure 802, is not open enough to accommodate the solar panel 300 being inserted therein. The support structure 802 can be made of a material configured to flex or deflect under an applied load or force and return to an un-flexed position upon removal of the applied force. The material used to achieve flexure of the support structure 812 is not intended to be limited in any way by this disclosure, but may be a spring steel, a polymer, or any other material configured to deflect under a force. Additionally, the portions of the support structure 802 making up the pivots and bends where the back stop 812 meets the panel rest 806, where the back stop 812 meets the upper guide stop 814, and/or where the first portion 814A meets the second portion 814B of the upper guide stop 814 can each comprise a biasing member configured to bias the solar panel towards the panel rest. For example, the portions making up the pivots and bends of the support structure 802 where the back stop 812 meets the panel rest 806, where the back stop 812 meets the upper guide stop 814, and/or where the first portion 814A meets the second portion 814B of the upper guide stop 814 can be all one piece, as shown, or separate components coupled together by a hinge, pivot, and/or spring configured to flex under an applied force. It will be further appreciated that the portions making up the pivots and bends of any support structures described herein where the back stop meets the panel rest, where the back stop meets the upper guide stop 814, and/or otherwise can each comprise a biasing member configured to bias the solar panel towards the panel rest.

Figure 8B:
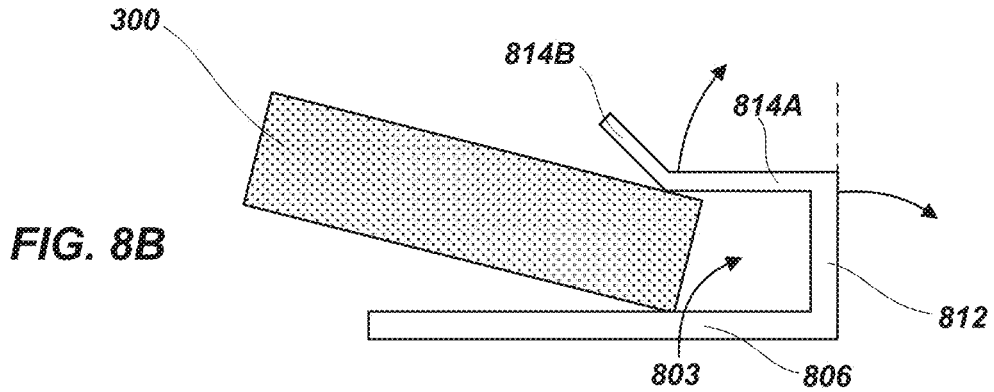
Figure 8C:
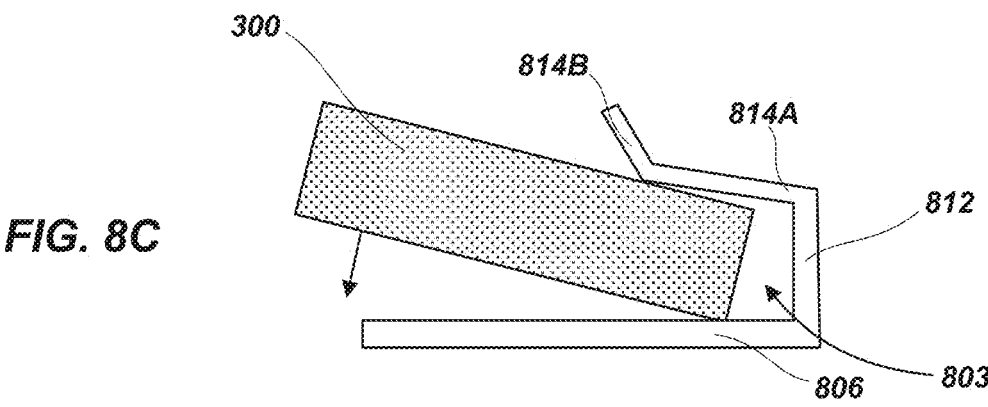

FIG. 8B illustrates further insertion of the solar panel 300 into the retention channel 803. As illustrated, under the applied force of the solar panel 300, one or more of the upper guide stop 814 and/or the back stop 812 can flex to open up the retention channel 803 by expanding one or more of the angles $\theta_g$ and $\theta_f$, thereby allowing the solar panel to be inserted into the retention channel 803. Further insertion of the solar panel 300 can cause further flexure of one or more of the back stop 812 and/or the upper guide stop 814 to even more fully accommodate the solar panel 300 into the retention channel 803, as is illustrated in FIG. 8C. In the illustrated position of FIG. 8C showing the solar panel 300 in the retention channel 803, the solar panel can be moved downward to seat rest against the panel rest 806, thus being positioned in the installed position. The solar panel can also be moved to rest against the back stop 812.

Figure 8D:
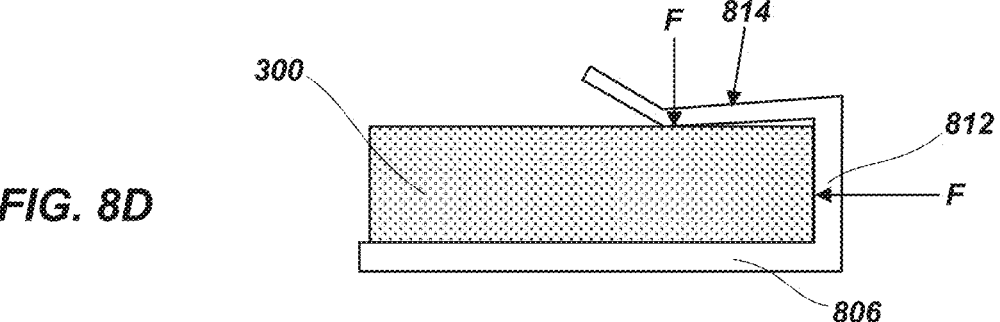

In the configuration shown in FIG. 8D, with the solar panel 300 fully inserted into the support structure 802, the flexed upper guide stop 814 can exert a force F on the solar panel 300 towards the panel rest 806. Furthermore, the flexed back stop 812 can exert a force F on the solar panel 300 toward, for example, a second support structure (not shown) of the solar panel mount 800. In this manner, the support structure 812 can receive, support, and retain the solar panel 300 in the solar panel mount 800. Although the motion of inserting the solar panel 300 into the solar panel mount 800 is described in steps, it is to be appreciated that the insertion of the solar panel 300 from FIGS. 8A-8D can be accomplished in one motion.

Figure 9:
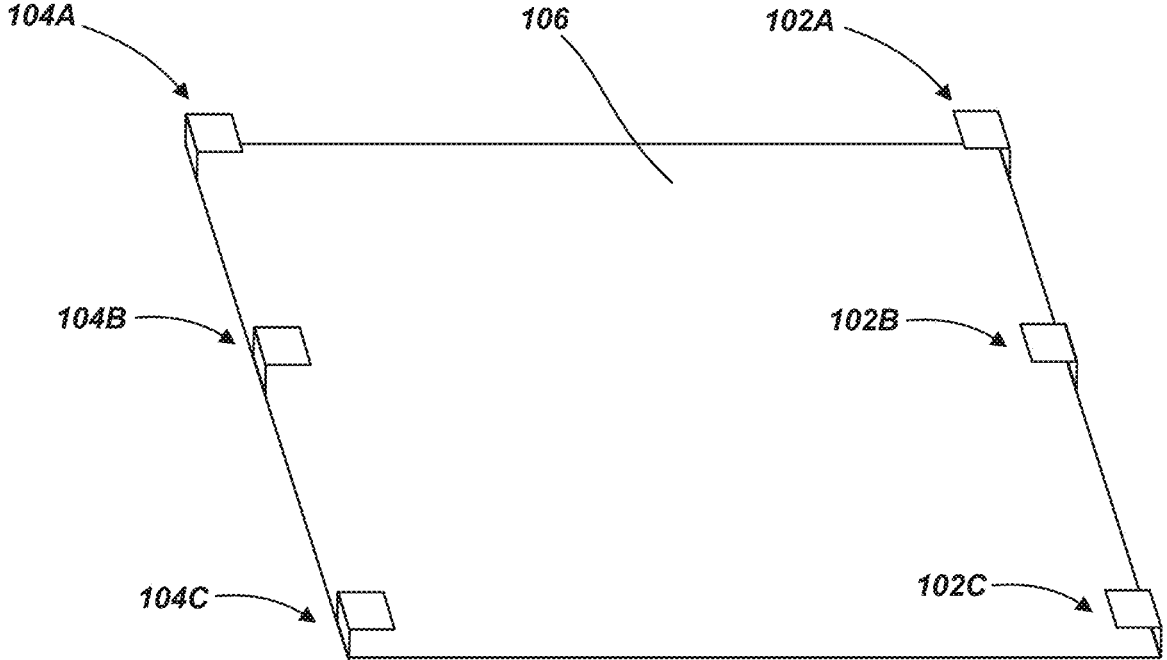
FIG. 9 illustrates a front elevation view of a solar panel mount in accordance with an example of the present disclosure.

Each of the side views of various support structures (e.g., support structures 102, 104, 402, 404, 702, 704A, 704B, 802) have been illustrated in the figures. While FIGS. 1 and 4 illustrate the supporting structures as spanning an entire width of a solar panel mount, it is to be understood that the support structures can be more narrow and take up less than the full width of the solar panel mount. Additionally, a plurality of support structures, configured as brackets disposed on a single end of the solar panel mount can be used as the support structures. For example, as shown in FIG. 9, a solar panel mount can include a panel rest 106 in support of a plurality of support brackets disposed along opposing edges of the panel rest 106 in various positions. For example, a plurality of first support brackets 102A, 102B, and 102C can be disposed along a first edge of the panel rest 106. A plurality of second support brackets 104A, 104B, and 104C can be disposed along a second edge of the panel rest 106 opposite to the first edge. As shown, the brackets have similar cross sections and side views as the support structures 102 and/or 104. However, the brackets are not so limited. It is to be understood that the plurality of brackets 102A-102C and 104A-104C can be configured as any of the support structures described herein (e.g., support structures 102, 104, 402, 404, 702, 704A, 704B, 802).

Figures 10A, 10B, 10C, 10D:
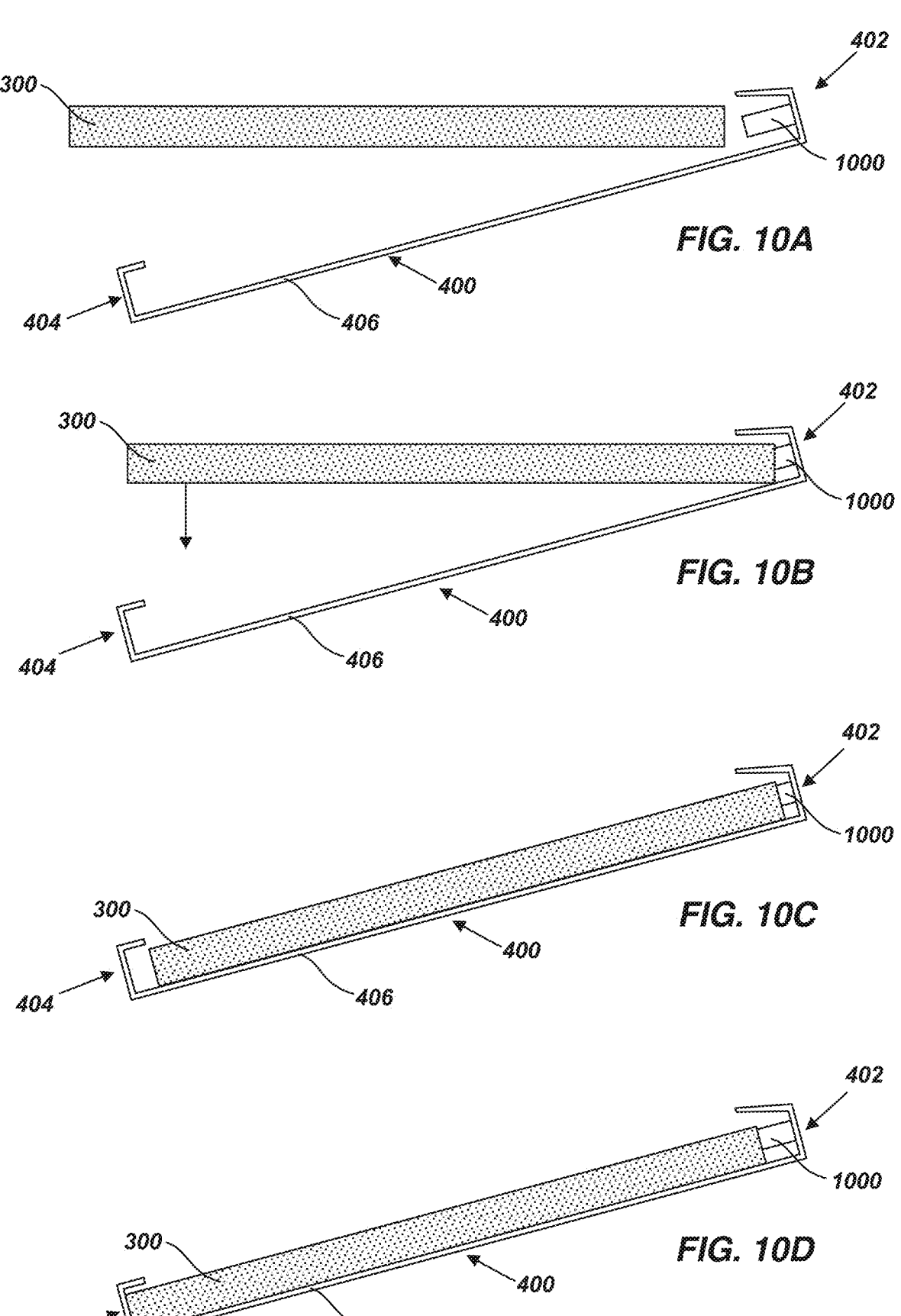
FIGS. 10A-10D illustrate various steps of a solar panel being installed in the solar panel mount of FIG. 4, which in some examples can include biasing members.
Figures 11A, 11B, 11C, 11D:
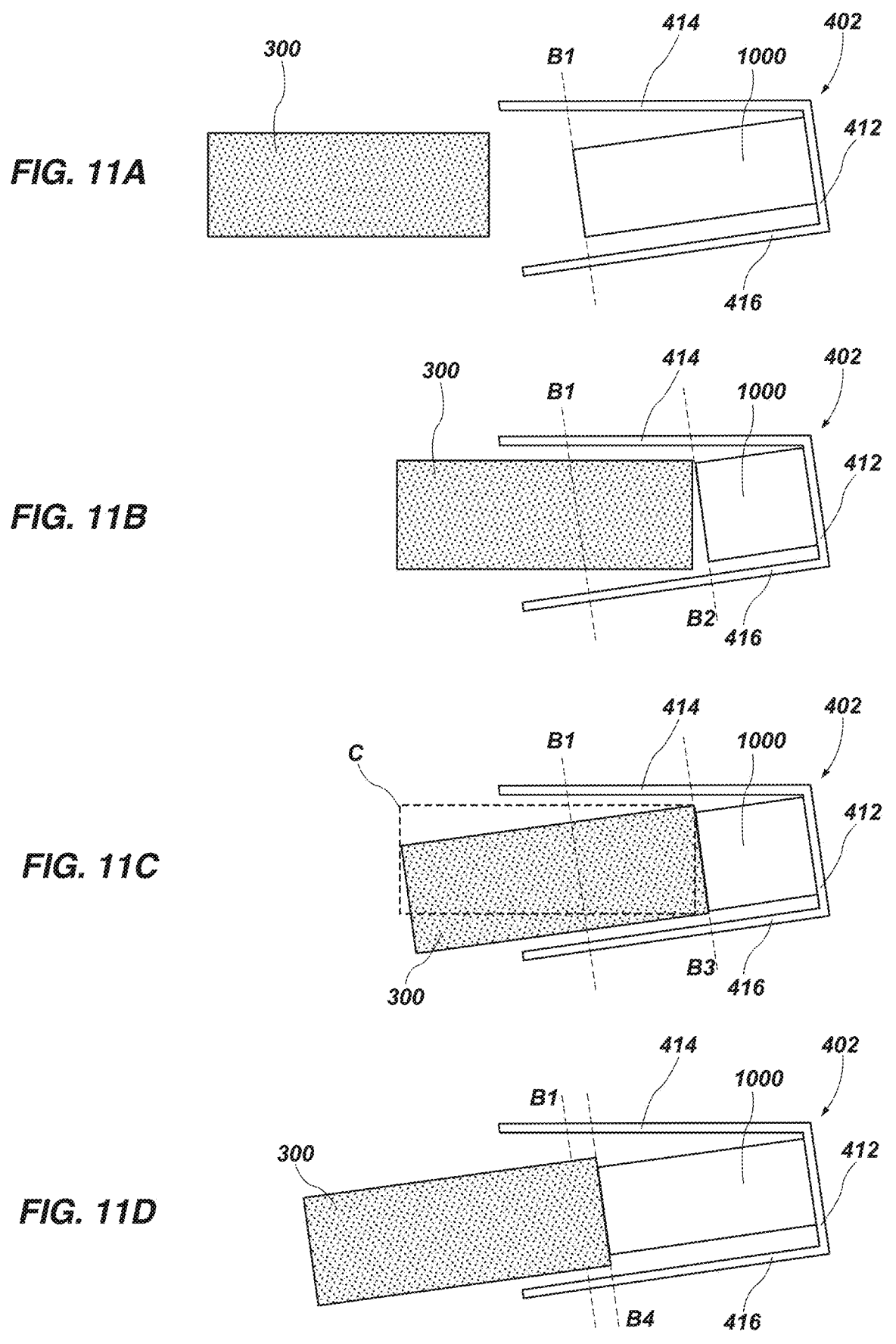

The support structures described herein can include additional features to facilitate quick capture, quick install, quick release, and proper retention/support of a solar panel within a solar panel mount. FIGS. 10A-10B illustrate a configuration of a solar panel being installed into panel mount 400, wherein the first support structure 402 comprises one or more biasing structures 1000 supported on the first support structure 402 and configured to bias the solar panel 300 toward the second support structure 404. As illustrated in FIG. 10A, the solar panel 300 can be aligned with the first support structure 402 as described elsewhere in this disclosure. A detail view of the panel aligned with the support structure 402 is illustrated in FIG. 11A. In the alignment of the solar panel 300 with the first support structure 402, the biasing member 1000 is in an uncompressed, or relaxed state, in which the biasing member is extended to line B1 shown in FIG. 11A.

The solar panel 300 can be inserted into the first support structure 402 and brought into contact with the biasing structure 1000 as shown in FIG. 10B. A detail view is illustrated in FIG. 11B. As shown, upon installing the solar panel 300 and making contact with the biasing structure 1000, this causes the biasing structure 1000 to compress from line B1 to line B2. In this state of compression, the biasing structure can be exerting a force on the solar panel 300 due to a spring force of the biasing member trying to return to the relaxed/uncompressed state.

As shown in FIGS. 10C and 11C, the solar panel 300 can be moved from a position C substantially in alignment with the upper guide stop 414 to a position aligned with or resting against the panel rest 406. In this position, the biasing structure 1000 can be compressed to a position B3, which can be the same or different from B2. Once the solar panel 300 is aligned with the panel rest of the mount and in between the two support structures 402 and 404, the solar panel 300 can be biased against the second support structure 404 to the installed position. With the solar panel in the installed position (as shown in FIGS. 10D and 11D), the biasing structure 1000 can be at least partially uncompressed to a state in which the biasing structure is aligned with line B4. In this state the biasing structure, being partially compressed, can exert a force against solar panel 300 to bias the solar panel 300 against the second support structure 404.

The biasing structures can be incorporated with any of the solar panel mounts described herein, or with any of the support structures described herein, in order to bias the solar panel 300 to an installed position. The biasing structure can comprise any configuration or form of any material configured to compress and exert a force and propensity to return to an uncompressed state. For example, the biasing structure 1000 can be a coil spring that deflects under an applied load and exerts a force according to known spring mechanics. The biasing member 1000 can further comprise a compliant material such as a block or three-dimensional piece of rubber, plastic, polymer, foam, sponge, or other material known to compress or deform under an applied load and to return to a relaxed state on release of the applied load. These examples are not intended to be limiting in any way as those skilled in the art will recognize other devices, objects, systems that can perform a biasing function as intended and discussed herein.

Figure 12A:
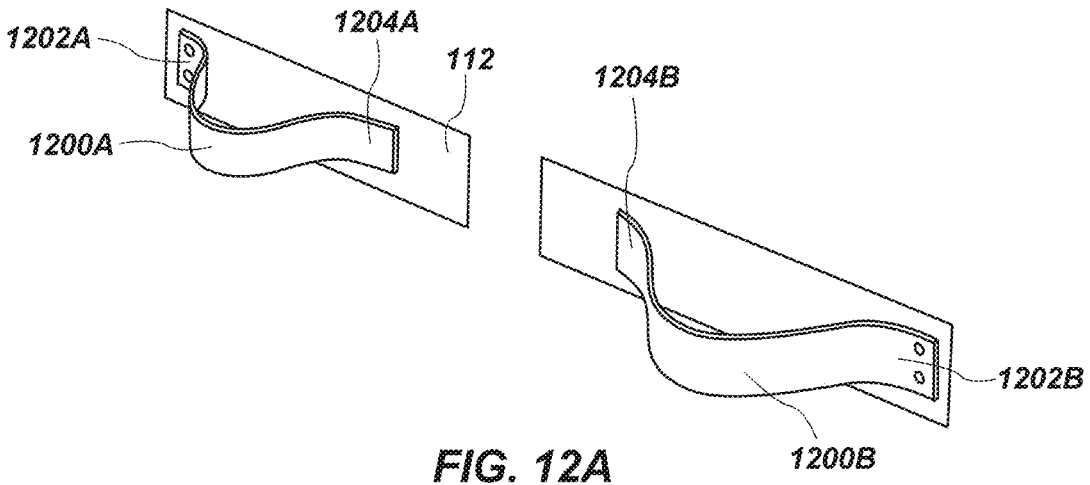
FIGS. 12A and 12B illustrate front elevation views of biasing members of the solar panel mount of FIG. 4 in accordance with an example of the present disclosure.
Figure 12B:
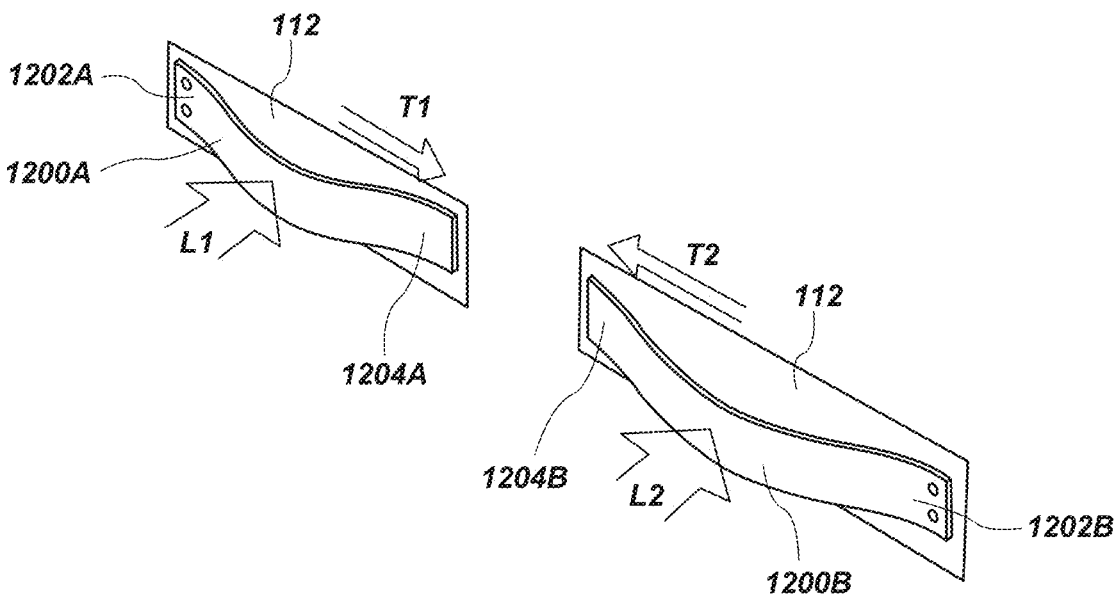

Examples of biasing springs are illustrated in FIGS. 12A and 12B. FIG. 12A illustrates the biasing springs in a relaxed or un-flexed state while FIG. 12B illustrates the biasing springs in a compressed or flexed state under an applied load. As shown, the back stop 112, as described elsewhere in the disclosure, can comprise one or more biasing springs 1200A and/or 1200B. In other words, one or more biasing springs can be formed with or attached to the back stop 112. As illustrated, the biasing springs 1200A and 1200B can be elongated strips of a flexible material configured to deflect under an applied force and to return to an un-flexed position upon removal of the applied force. The biasing spring 1200A can comprise a first end 1202A and a second end 1204A. Similarly, the biasing spring 1200B can comprise a first end 1202B and a second end 1204B. The respective first ends 1202A and 1202B of each of the biasing springs 1200A and 1200B can be coupled to the back stop 112. The manner of coupling the first ends 1202A and 1202B to the back stop 112 is not intended to be limited in any way and can be accomplished by any means (e.g., fasteners, welding, adhesive, or brackets) or the biasing springs 1200A and 1200B can be formed integrally with the back stop 112.

The respective second ends 1204A and 1204B of the biasing springs 1200A and 1200B can be unattached to the back stop 112 and can be either in contact with or separated from the back stop 112. In the configuration shown in FIG. 12A, the biasing springs 1200A and 1200B are shown in their relaxed or un-flexed state. In FIG. 12B, the biasing springs 1200A and 1200B are subject to one or more applied loads L1 and L2 (e.g., from a solar panel being pressed against the biasing springs 1200A and 1200B). It will be appreciated that the loads L1 can be the result of the same solar panel being applied to both springs or separate solar panels being applied to each of the springs 1200A and 1200B. The one or more loads L1 and L2 against the biasing springs 1200A and 1200B can cause the biasing springs 1200A and 1200B to deflect. Under the loads L1 and L2, the fixed ends 1202A and 1202B of the biasing springs 1200A and 1200B can remain in position fixed to the back stop 112. The unattached or floating ends 1204A and 1204B however can translate along the back stop 112 as the one or more loads L1 and L2 are applied to the biasing springs 1200A and 1200B. The second end 1204A can translate in a direction T1 along the back stop 112 as the load L1 applied and the second end 1204B can translate in a direction T2, thereby facilitating deflection and flattening of the biasing springs 1200A and 1200B against the back stop 112 to accommodate a solar panel in an associated solar panel mount. The biasing springs' propensity to return to the un-flexed or relaxed states can cause the biasing springs 1200A and 1200B to exert a biasing force in opposition to the loads L1 and L2 applied to each of the biasing springs 1200A and 1200B, thereby biasing the solar panel towards a support structure placed on the solar panel mount in opposition to the back stop 112.

Although the second ends 1204A and 1204B of the biasing springs 1200A and 1200B are illustrated as being separate and/or unattached from the back stop 112, it will be understood that alternative configurations exist. For example, the second ends 1204A and 1204B can be fixed to the back stop 112 and the first ends 1202A and 1202B can be unattached. Alternatively, both the first ends 1202A and 1202B and the second ends 1204A and 1204B can be attached to the back stop 112. The all or some of the first and second ends can be fixedly attached, slidably attached, pivotably attached, unattached, otherwise attached to the back stop 112. In a case in which all of the first and second ends of the biasing springs are attached, the biasing springs may deflect only inward toward the back stop 112 through bending or flexing of the biasing springs instead of translating on a surface of the back stop in order to accommodate the solar panel.

FIGS. 13A-13D illustrate various other biasing members that can be used to bias or position the solar panel inside a solar panel mount. FIG. 13A illustrates a set screw 1300 as an actuatable pin that can be inserted through the back stop 112. The set screw 1300 can be actuated through rotation to extend or retract through the back stop 112 to interface with the solar panel in the solar panel mount and to bias the solar panel against within the solar panel mount. FIG. 13A illustrates the set screw 1300 fully extended out of the back stop 112. FIG. 13B illustrates the set screw 1300 at least partially extended out of the back stop 112. It will be appreciated that the set screw 1300 can be actuated to turn via a head 1302 of the set screw 1300 to extend or retract from the back stop 112. It will be further appreciated that the set screw can be disposed on a first support structure, a second support structure, or both support structures to interface with a solar panel. The set screw 1300 can interface with a surface of the solar panel or a recess formed in an edge of the solar panel.

FIG. 13B illustrates a spring loaded pin 1306 as an actuatable pin that can be inserted through the back stop 112. The spring loaded pin 1306 can be actuated through an applied force to extend or retract through the back stop 112 and to interface with the solar panel in the solar panel mount and to bias the solar panel against within the solar panel mount. FIG. 13C illustrates the spring loaded pin 1306 fully extended out of the back stop 112. FIG. 13D illustrates the spring loaded pin 1306 at least partially extended out of the back stop 112. It will be appreciated that the spring loaded pin 1306 can be actuated via an applied force to retract into the back stop 112 and can be biased to extend through the back stop 112 via one or more springs 1308. It will be further appreciated that the spring loaded pin can be disposed on a first support structure, a second support structure, or both support structures to interface with a solar panel. The spring loaded pin can interface with a surface of the solar panel or a recess formed in an edge of the solar panel to hold the solar panel. It will also be appreciated that the spring loaded pin can be spring loaded in any known configuration, not just the configuration shown in FIG. 13D.

Figure 14A:
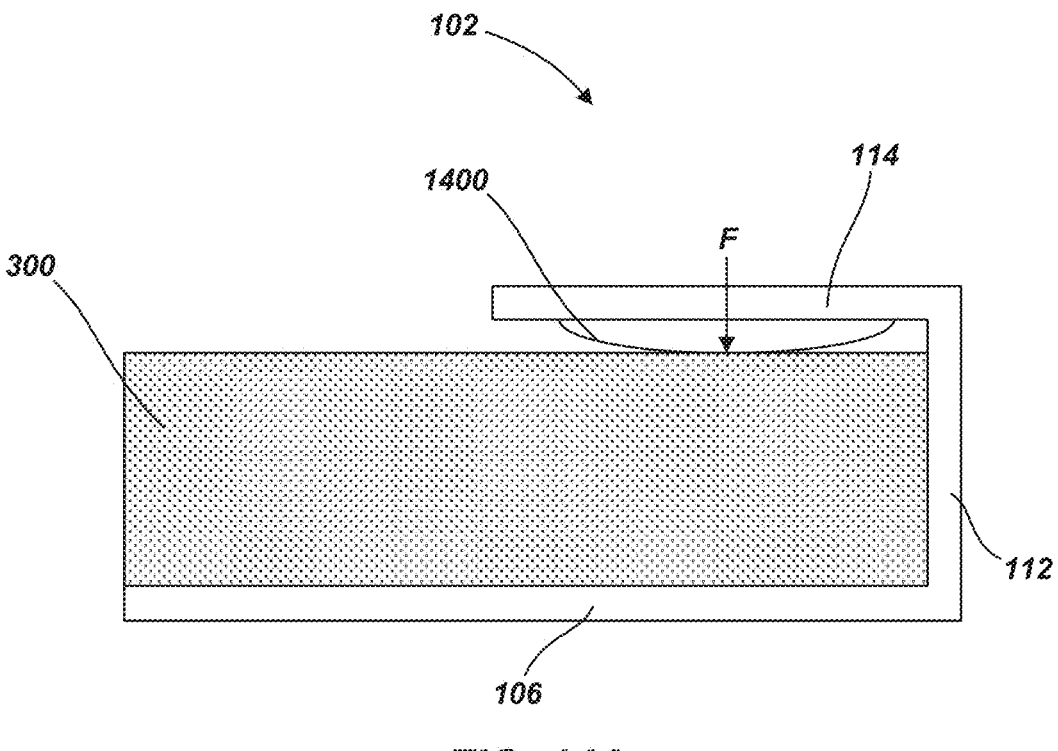
FIGS. 14A and 14B side views of solar panel mounts in accordance with an example of the present disclosure.

FIG. 14A illustrates an alternative configuration of a support structure 102. The support structure 102 can further include a spring 1400, for example a leaf spring, disposed on one or more of the panel rest 106, back stop 112, and/or the upper guide stop 114. As shown in FIG. 14A, the spring can be disposed on the upper guide stop to provide a force F that presses the solar panel 300 against the panel rest 106. Additional springs 1400 can be additionally or alternatively disposed on any of the panel rest 106, back stop 112, and/or the upper guide stop 114. While the example illustrates the support structure 102, it will be understood that the spring 1400 can be applied to any of the support structures described herein and any surfaces or elements thereof.

Figure 14B:
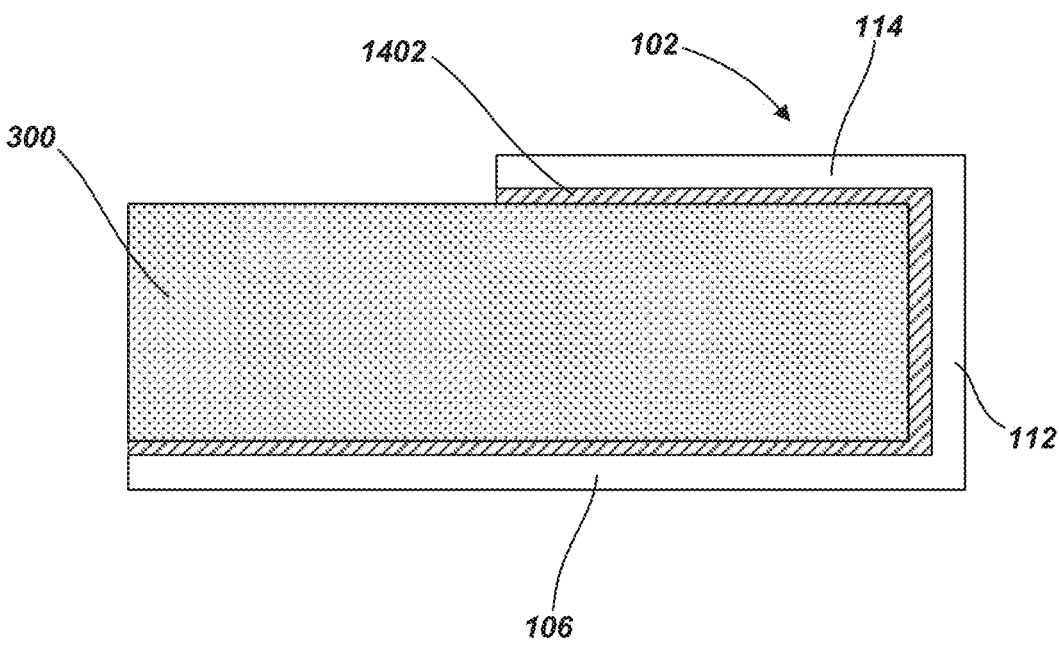

FIG. 14B illustrates that the support structure 102 can further or alternatively comprise a friction inducing material configured to interface with the solar panel to hold the solar panel in the one or more of the first support structure and the second support structure on one or more surfaces of one or more of the upper guide stop 114, the back stop 112, and/or the panel rest 106. The friction inducing material is disposed on each of the upper guide stop 114, the back stop 112, and the panel rest 106 in FIG. 14B but may alternatively be disposed on only one, two, or more of the upper guide stop 114, the back stop 112, and/or the panel rest 106. The friction inducing material can be a rubber, a foam, a polymer, an abrasive material, or any known material for increasing friction between the solar panel 300 and any of the surfaces of the upper guide stop 114, the back stop 112, and/or the panel rest 106. While the example illustrates the support structure 102, it will be understood that the friction inducing material 1402 can be applied to any of the support structures described herein and any surfaces or elements thereof.

Figures 15A, 15B, 15C, 15D:
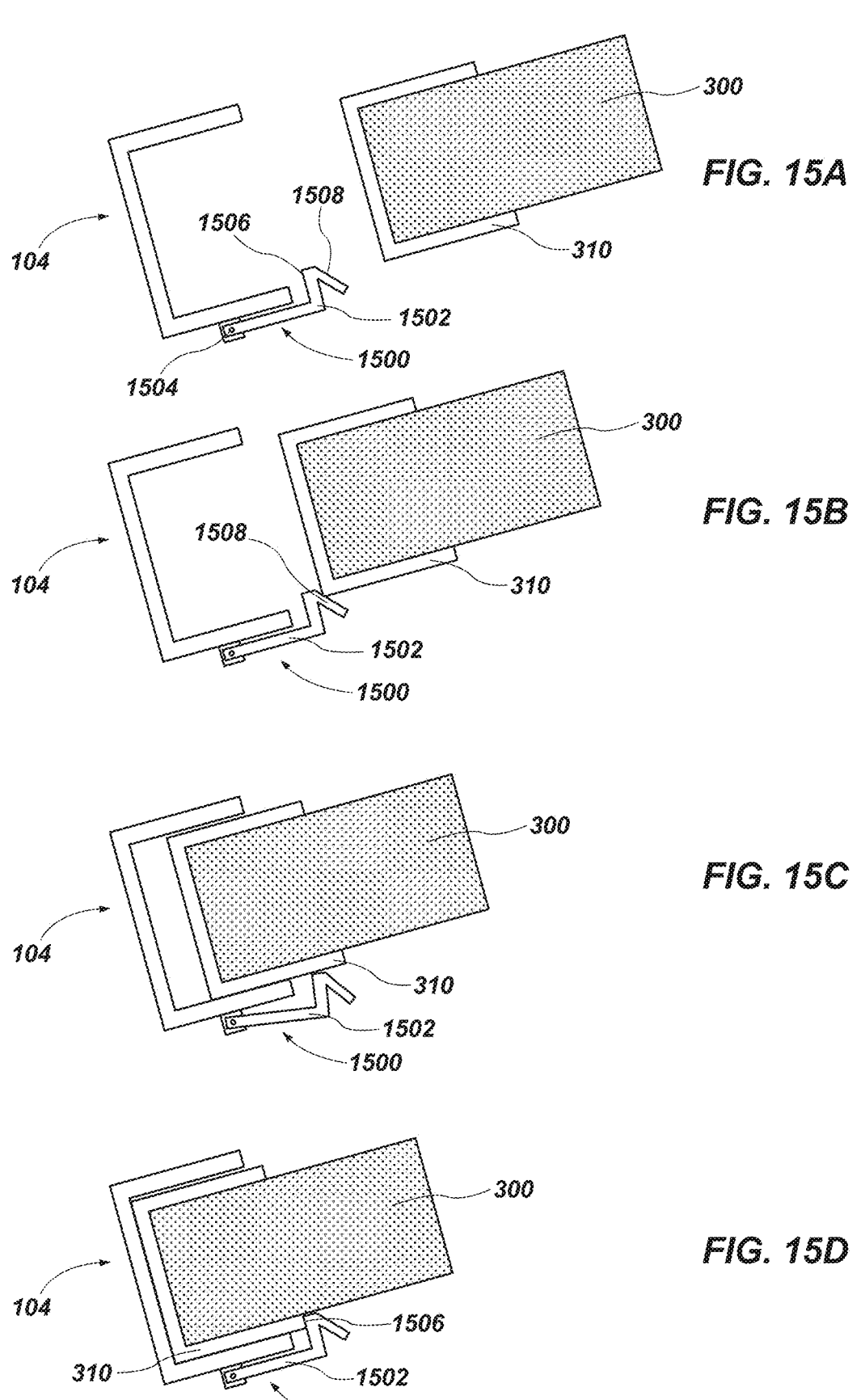
FIGS. 15A-15D illustrates views of a solar panel engaging with a retention latch in accordance with an example of the present disclosure.

The support structures of the solar panel mounts described here can further include a retention latch configured to engage with and hold a solar panel in place within a solar panel mount. FIGS. 15A-15D illustrate the operation of an exemplary retention latch according to at least one example of the disclosure. As illustrated in FIG. 15A, the retention latch 1500 can comprise a latch body 1502. The latch body 1502 can be coupled to the support structure 104 via a hinge 1504. The hinge 1504 can be spring loaded and biased to a certain position or can be a simple hinge pivotable by mechanical or manual actuation. The retention latch 1500 can further comprise a first engagement surface 1506 coupled to or part of the latch body 1502 and configured to engage with a feature of the solar panel. For example, the solar panel 300 can include a frame 310 disposed on an edge of the solar panel 300. The first engagement surface 1506 can be disposed to engage with the frame 310 of the solar panel 300 when the solar panel 300 is inserted into the support structure 104 to retain the solar panel 300 in the support structure 104.

The latch 1500 can further comprise a second engagement surface 1508 disposed on the latch body 1502. The second engagement surface 1508 can be an angled surface operable to engage with the solar panel to push the solar panel retention latch 1500 out of the way of the solar panel being inserted into the solar panel mount to allow the solar panel access into the support structure of the mount. Operation of the retention latch 1500 as the solar panel is inserted into the support structure 104 of the solar panel mount is described with reference to FIGS. 15A-15D.

FIG. 15A illustrates a position at which the solar panel 300 is outside of the support structure 104. In this case, the retention latch can be spring loaded at (e.g., at the hinge) to bias the retention latch to a closed, or latched, position as illustrated in FIG. 15A. As the solar panel 300 is moved toward the support structure 104, the frame 310 of the solar panel 300 is illustrated to come into contact with the angled engagement surface 1508 of the retention latch 1500 in FIG. 15B. Being in contact with the angled engagement surface 1508, the solar panel 300 can cause the retention latch 1500 to rotate away from the solar panel 1300 in order to allow the solar panel 300 access into the support structure 104. FIG. 15C illustrates a position where the solar panel 300 has moved the retention latch out of the way to allow the solar panel 300 access to the support structure 104.

FIG. 15D illustrates a position in which the solar panel 300 is inserted into the support structure 104 far enough for the retention latch to clear the frame 310. The spring loaded retention latch can then return to the closed or latched position by the biasing of the spring in order to catch an edge of the solar panel frame. As illustrated in FIG. 15D, the frame 310 can interface with the engagement surface 1506 of the frame 310 to retain the solar panel 300 in the support structure 104. The retention latch 1500 can be configured to swing up through an aperture in a solar panel mount (e.g., aperture 408 in solar panel mount 400) to capture the solar panel. It will be appreciated that the retention latch can be disposed on and used in conjunction with any of the support structures and any panel mounts disclosed herein. Also, the retention latch can be manually or mechanically actuatable, without a biasing feature, in order to be operated to lock the solar panel in place. The retention latch can further be interfaced with any part of any of the panel rests described herein. Additionally, any number of retention latches can be used to retain the solar panel in a solar panel mount.

Each of the solar panel mounts disclosed herein can be part of a solar panel mount system including at least one solar panel mount as well as at least one solar panel either installed in the solar panel mount or provided with the solar panel mount to be subsequently installed therein. A solar panel mount system can include at least one solar panel 300 comprising a first edge 302, a second edge 304 opposite the first edge 302, and a lower surface extending from the first edge to the second edge (e.g., FIGS. 3E, 6D, 7A, 7B, 10D, 11D, and 14B). The system can further include at least one solar panel mount in support of the solar panel in an installed position within the solar panel mount. The solar panel mount can be any of the solar panel mounts described in accordance with the principles recited in this disclosure (e.g., solar panel mounts 100, 400, 700A, 700B, 800 as in any of FIGS. 3E, 6D, 7A, 7B, 10D, 11D, 14B).

Figure 16:
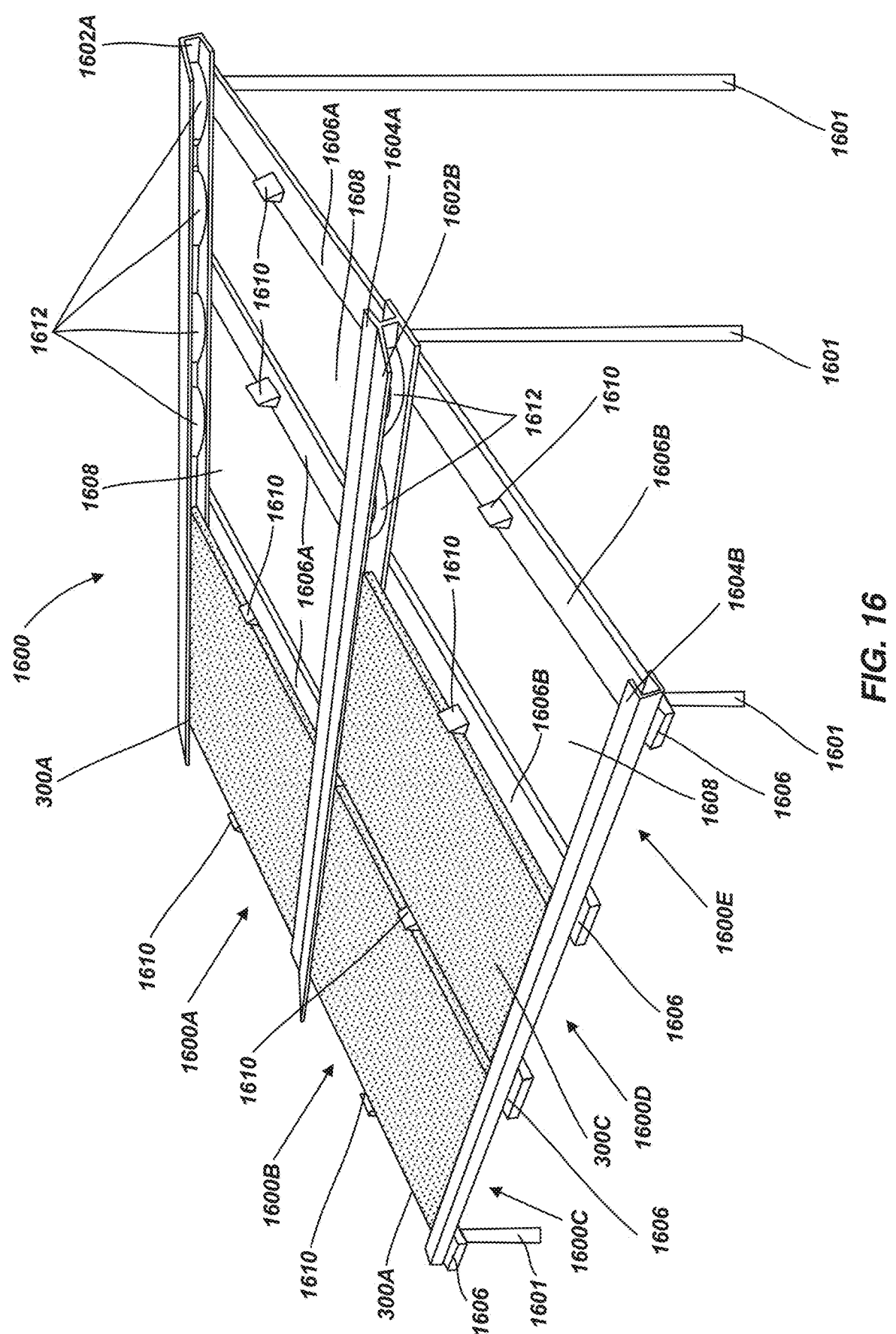
FIG. 16 illustrates a front elevation view of a solar panel mount array system in accordance with an example of the present disclosure.

A plurality of the solar panel mounts described herein, in any combination or arrangement, can be combined into a solar panel array frame system. An exemplary array frame system 1600 is illustrated in FIG. 16. The solar panel array frame system 1600 can include one or more solar panel mount supports 1601 configured to support one or more solar panel mounts on an installation surface. The installation surface can be a roof, a parking lot, a field, or any other structure or surface to which a solar panel or solar panel mount can be installed without limitation.

The array frame system 1600 can include a plurality of solar panel mounts 1600A and 1600B. Each solar panel mount can receive, support, and retain one or more solar panels. For example, as shown in FIG. 16, each of the solar panel mounts 1600A and 1600B are configured to receive one, two, or three solar panels. The solar panel mount 1600A is shown retaining at least one solar panel 300A and has space for an additional two more solar panels. The solar panel mount 1600B is shown retaining at least two solar panels 300B and 300C and has space for an additional solar panel. It will be appreciated that the solar panel mounts 1600A and 1600B are merely exemplary. Solar panel mounts according to this disclosure can be configured to receive any number of solar panels desired. Additionally, the solar panel mounts 1600A and 1600B are configured to hold solar panels in a row. Alternatively, the solar panel mounts can be configured to hold solar panels in a column. Furthermore, as with any of the solar panel mounts described herein, the solar panels can be inserted into the solar panel mounts in either a portrait, landscape, or other orientation without limitation. Any possible orientation of solar panel is intended to be contemplated in conjunction with the principles described herein.

As illustrated in FIG. 16, the solar panel mount 1600A can receive a first row of solar panels in the array system 1600. The solar panel mount 1600B can receive a second row of solar panels in the array system 1600. The solar panel mount 1600A can be arranged parallel to and above the solar panel mount 1600B. In this arrangement, the solar panel mounts 1600A and 1600B can define columns 1600C, 1600D, and 1600E configured to receive a plurality of solar panels in a column configuration. While each column shown has space available to capture two solar panels, it will be appreciated that a column can be configured to receive any number of solar panels desired.

It is to be understood, that while the solar panel mounts 1600A and 1600B are described herein as individual solar panel mounts that can each hold up three solar panels, that the array 1600 shown in FIG. 16 can also be considered to have 6 individual solar panel mounts that each hold one solar panel. In other words, each single solar panel can be held in a single solar panel mount, or each solar panel mount can hold a plurality of solar panels.

The solar panel mounts 1600A and 1600B of the array frame system 1600 can each include structures similar or the same as those described in connection with all solar panel mounts described herein (e.g., any of support structures 102, 104, 402, 404, 702, 704A, 704B, 802, or any support structure formed in accordance with the principles described herein). For example, the solar panel mount 1600A can include a first support structure 1602A defining, at least in part, a first retaining channel configured to receive and retain a first edge of the solar panel in an installed position. Similar to other solar panel mounts described herein, the first support structure of the solar panel mount 1600A can comprise a back stop configured to provide support to the first edge of the solar panel, and an upper guide stop extending from the back stop at a first angle with respect to the back stop, and configured to facilitate guidance of the solar panel towards the back stop and within the first retaining channel during installation of the solar panel. Additionally or alternatively, the first support structure 1602A can be configured as any of the support structures described herein.

The solar panel mount 1600A can further comprise a second support structure 1604A positioned offset from the first support structure, and defining, at least in part, a retaining channel configured to receive and retain a second edge of the solar panel in the installed position. The second support structure can be configured as any of the support structures described herein. The first retaining channel and the second retaining channel of the first and second support structures 1602A and 1604A can be spatially positioned and oriented relative to one another to facilitate quick capture of the solar panel, and to secure the solar panel in the installed position, as shown in FIG. 16.

Similar to the solar panel mount 1600A, the solar panel mount 1600B of the array frame system 1600 can include structures similar or the same as those described in connection with all solar panel mounts described herein (e.g., any of support structures 102, 104, 402, 404, 702, 704A, 704B, 802, or any support structure formed in accordance with the principles described herein). For example, the solar panel mount 1600B can include a first support structure 1602B defining, at least in part, a first retaining channel configured to receive and retain a first edge of the solar panel in an installed position. Similar to other solar panel mounts described herein, the first support structure of the solar panel mount 1600B can comprise a back stop configured to provide support to the first edge of the solar panel, and an upper guide stop extending from the back stop at a first angle with respect to the back stop, and configured to facilitate guidance of the solar panel towards the back stop and within the first retaining channel during installation of the solar panel. Additionally or alternatively, the first support structure 1602B can be configured as any of the support structures described herein.

The solar panel mount 1600B can further comprise a second support structure 1604B positioned offset from the first support structure, and defining, at least in part, a retaining channel configured to receive and retain a second edge of the solar panel in the installed position. The second support structure can be configured as any of the support structures described herein. The first retaining channel and the second retaining channel of the first and second support structures 1602B and 1604B can be spatially positioned and oriented relative to one another to facilitate quick capture of the solar panel, and to secure the solar panel in the installed position, as shown in FIG. 16.

The array frame system 1600 can further include one or more panel rests 1606 configured to support one or more of the plurality of solar panel mounts 1600A and 1600B. Each of the panel rests 1606 can comprise one or more seating surfaces 1606A and 1606B configured to receive and support a lower surface of one or more solar panels in the installed position. As illustrated in FIG. 16, each of the panel rests 1600 can be a single elongated member that supports both of the first panel mount 1600A and the second panel mount 1600B. Alternatively, the first and second panel mounts 1600A and 1600B can include their own separate panel rests that are separate from the panel rests of the other solar panel mount. Alternatively, a single monolithic panel rest can be used to support both of the first and second solar panel mounts 1600A and 1600B. Apertures 1608 can be left between or formed in the panel rests 1606 in order to provide access for people or other elements (e.g., a retention latch) to the solar panels disposed in the array frame system 1600.

The first and second panel mounts 1600A and 1600B can further comprise one or more dividers 1610 supported by or extending from the one or more panel rests 1606. In one example, as shown, the dividers 1610 can extend upward from the panel rests 1606 to provide spacing between solar panels disposed on the array frame system 1600. In alternative embodiments, dividers 1610 can span an entire length of the solar panel mount 1620 from a first support structure 1622 to a second support structure 1624. Furthermore, dividers 1610 can be segmented and of any number, whether one, two, or more, and disposed along a side of solar panel mount 1630. The dividers 1610 can be placed within the retention channels of the first and/or second support structures 1632 and 1634 to provide division and spacing of the solar panels in the supporting structures. In addition to providing division and spacing of solar panels, the dividers 1610 of any shape or configuration, can function as guides that provide lateral constraint and guidance to the solar panels as the solar panels are being installed and moved into place within solar panel mounts during installation as described herein. Although shown in the example first and second panel mounts 1600A and 1600B of FIG. 16, the dividers can be present on any of the panel mounts discussed herein and shown in FIGS. 1-15. In the various examples discussed above and shown in the drawings, the dividers can further be considered sides or side edges of the panel mounts, with the dividers (sides) and the support structures defining a recess in which the solar panel rests in the installed position.

The first support structures 1602A and 1602B can comprise one or more biasing members or springs 1612 configured to bias solar panels installed into the solar panel mounts (e.g., into the second support structures). The springs 1612 can be of any kind of biasing member or spring described herein that is configured to bias a solar panel in the solar panel mounts 1600A and 1600B. The array frame system 1600 can be made of any of the solar panel mounts and configurations disclosed herein and in any combination thereof. The solar panel array frame system 1600 can further include any additional elements described herein (e.g., friction inducing material, set screws, leaf springs, biasing springs).

A method of installing a solar panel into any of the solar panel mounts described herein is discussed below. FIG. 17 illustrates a method 1700 of installing a solar panel into a solar panel mount. The method can comprise a step 1702 of inserting a first edge of the solar panel into a first retaining channel configured to receive and retain a first edge of the solar panel in an installed position. The first retaining channel can be defined, at least in part, by a first support structure. The first support structure can be configures as any of the support structures described herein including support structures 102, 104, 402, 404, 702, 704A, 704B, 802, or any support structure formed in accordance with the principles described herein. For example, the first support structure can comprise a back stop configured to provide support to the first edge of the solar panel, and an upper guide stop extending from the back stop at a first angle with respect to the back stop, and configured to facilitate guidance of the solar panel towards the back stop and within the first retaining channel during installation of the solar panel. The inserting step 1702 can include inserting the solar panel between dividers or guides (e.g., side edges or side dividers) of the solar panel mount, wherein the dividers or guides can facilitate proper alignment of the solar panel relative to the solar panel mount during the installation process. The inserting step 1702 can include a step of aligning the solar panel with a reception angle of the first retaining channel of the first support structure. The reception angle can correspond to an angle of the upper guide stop (e.g., $\theta_4$ of FIG. 6B or any angle larger or smaller than $\theta_4$ that will allow for the solar panel to be inserted into the first support structure 402). Additionally, the reception angle can correspond to an angle $\theta_3$ of FIG. 3C that allows a solar panel to be inserted far enough into the first support structure 102 to clear the second support structure 104 and to rest against the panel rest 106. It is to be appreciated that angles $\theta_1$ and $\theta_2$ of FIGS. 3A and 3B can also be considered reception angles although the solar panel may be additionally rotated toward the panel rest 106 before the solar panel can be fully received into the first support structure 102.

The method 1700 can further comprise a step 1704 of aligning the solar panel within the first support structure with a panel rest comprising a seating surface configured to receive and support a lower surface of the solar panel in the installed position. The solar panel can be aligned with the panel rest by a mechanism, manually, or by the force of gravity acting on the panel to pull the panel towards the panel rest. The method 1700 can further comprise a step 1706 of aligning a second edge of the solar panel with a second support structure positioned offset from the first support structure, and defining, at least in part, a retaining channel configured to receive and retain a second edge of the solar panel in the installed position. The second support structure can be a support structure according to any of the support structures described herein such as support structures 102, 104, 402, 404, 702, 704A, 704B, 802, or any support structure formed in accordance with the principles described herein. The method 1700 can further comprise a step 1708 of interfacing the second edge of the solar panel with the second support structure to retain the solar panel in the solar panel mount. The solar panel can be interfaced with the second support structure by a mechanism, by manual movement of the solar panel, or by the force of gravity acting on the panel. The first retaining channel and the second retaining channel can be spatially positioned and oriented relative to one another to facilitate quick capture of the solar panel, and to secure the solar panel in the installed position.

The step 1708 of interfacing the second edge of the solar panel with the second support structure can comprise biasing the solar panel toward the second support structure with one or more solar panel biasing structures configured to bias the solar panel toward the second support structure. The method 1700 can further include a step 1710 of securing the solar panel in place within the solar panel mount with one or more solar panel retention latches.

FIG. 18 illustrates a method of configuring a solar panel mount according to any of the examples disclosed herein. The method 1800 can include a step 1802 of configuring the solar panel mount to comprise a panel rest comprising a seating surface configured to receive and support a lower surface of the solar panel in the installed position. The method 1800 of configuring a solar panel mount can include a step 1804 of configuring the solar panel mount to comprise a first support structure defining, at least in part, a first retaining channel configured to receive and retain a first edge of the solar panel in an installed position. The first support structure can be a support structure as described according to any of the examples or principles described herein. For example, configuring the solar panel mount to comprise a first support structure can include configuring the first support structure to comprise an upper guide stop extending from the panel rest at a first angle with respect to the panel rest, and configured to facilitate guidance of the solar panel towards the panel rest and within the first retaining channel during installation of the solar panel.

Alternatively, the step 1804 of configuring the solar panel mount to comprise a first support structure can include configuring the first support structure to comprise a back stop configured to provide support to the first edge of the solar panel and configuring the first support structure to comprise an upper guide stop extending from the back stop at a first angle with respect to the back stop, and configured to facilitate guidance of the solar panel towards the back stop and within the first retaining channel during installation of the solar panel.

The method 1800 can further comprise a step 1806 of configuring the solar panel mount to comprise a second support structure positioned offset from the first support structure, and defining, at least in part, a second retaining channel configured to receive and retain a second edge of the solar panel in the installed position. The method 1800 can further comprise a step 1808 of configuring the first retaining channel and the second retaining channel to be spatially positioned and oriented relative to one another to facilitate quick capture of the solar panel, and to secure the solar panel in the installed position.

Solar Panel Dispensing/Installation Device

In conjunction with the solar panel mounts described above, a solar panel dispensing and/or installation device can be used in order to install solar panels into the solar panel mounts. Exemplary configurations of solar panel dispensing devices are described with reference to the drawings.

Figures 19A, 19B:
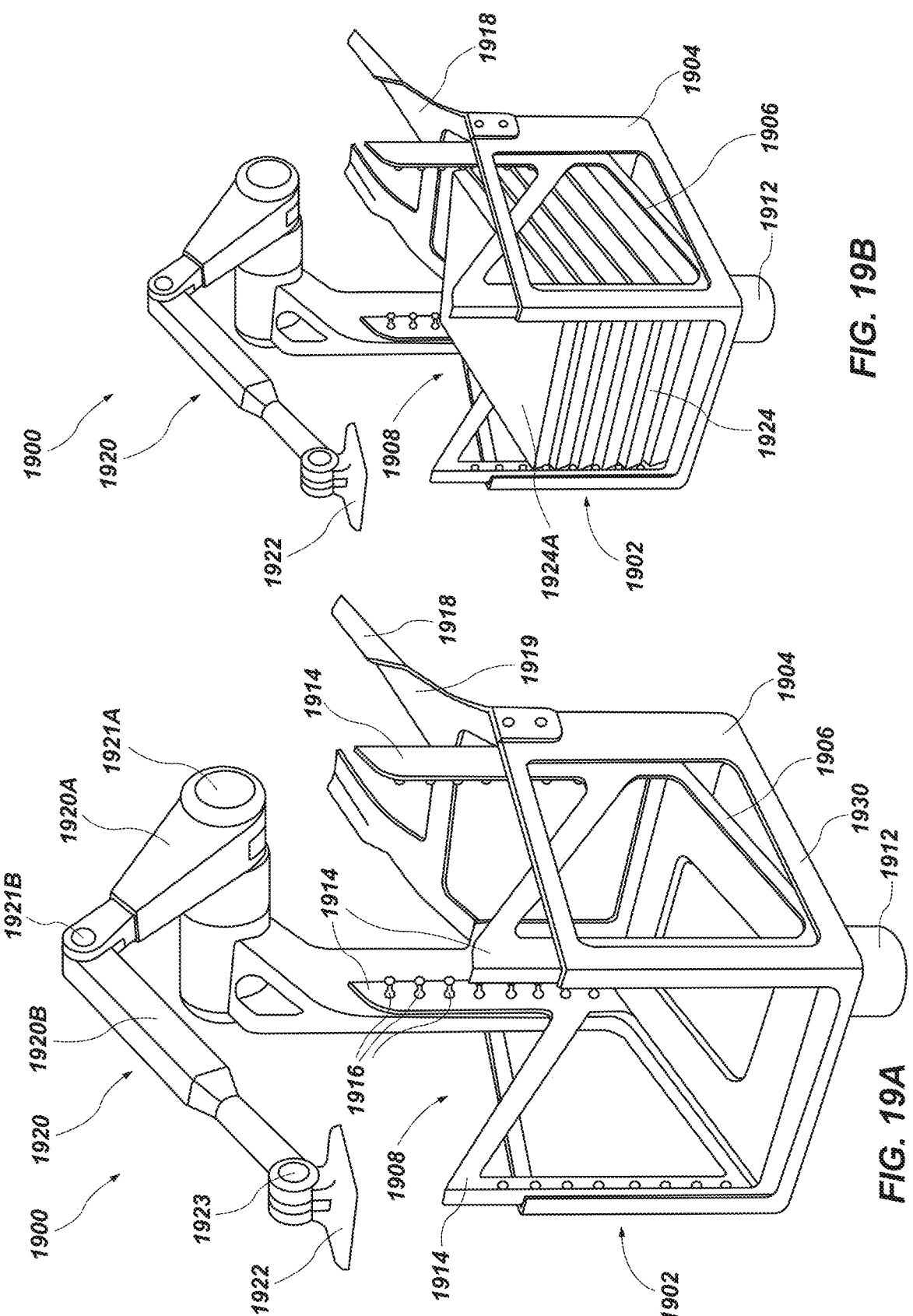
FIGS. 19A and 19B illustrate isometric views of a solar panel dispensing device in accordance with an example of the present disclosure.

FIG. 19A illustrates a solar panel dispensing device 1900 in accordance with one example of the present disclosure. As shown, the solar panel dispensing device 1900 can include a hopper 1902 configured to support a plurality of solar panels 1924 therein. The hopper 1902 can include a frame 1904 configured to support and house the solar panels 1924 within an interior volume defined by the frame 1904. The hopper 1902 can further include a panel base 1906 in the frame 1904 that is configured to interface with and support the solar panels. The hopper 1902 can further include an exit 1908 defined by an opening in the hopper configured to facilitate removal of the solar panels out of the hopper 1902. The opening and associated exit 1908 can be formed anywhere in the hopper (e.g., top, bottom, or on any sides of the hopper) and the location of the exit 1908 is not intended to be limited in anyway by this disclosure. In the example shown in FIG. 19A, the exit 1908 is formed in a top of the hopper 1902 such that the solar panels 1924 are configured to be dispensed out of the top of the hopper 1902.

The panel base 1906 can be fixed to the frame 1904 or can be movable within the frame 1904 to actuate towards the exit 1908 of the hopper 1902 in order to move solar panels 1924 towards the exit 1908 in preparation for being removed from the hopper 1902 and dispensed from the device 1900. For example, a hopper actuator 1912 can move the panel base 1906 toward an opening of the hopper 1902 where the exit 1908 is defined. The hopper actuator 1912 can be configured to move the plurality of solar panels 1924 (shown in a stack) (either directly or via movement of the panel base 1906, in a direction toward the exit 1908 of the hopper 1902 as each the plurality of solar panels 1924 are successively dispensed from the hopper 1902. The hopper actuator 1912 is not intended to be limited in anyway by this disclosure. The hopper actuator 1912 can be a piston device, a motor, an engine, a lift, and/or another actuator operable to drive a moveable column, an extendable column, a linkage, an arm, or any other structure coupled to the panel base 1906 to move the surface base 1906 towards the exit 1908 of the hopper 1902.

As shown in FIG. 19A, the panel base 1906 can be angled within the frame toward the exit 1908 to align the solar panels 1924 at an exit angle toward the exit 1908 to facilitate removal of the solar panels from the hopper 1902. Alternatively, the panel base 1906 can also be substantially aligned with a bottom, top, or sides of the frame 1904. The plurality of solar panels 1924 can exit the hopper 1902 at an angle substantially the same as (i.e., within +/−10 degrees of) the angle of the panel base 1906 relative to the base 1930 of the solar panel dispensing device 1900.

The panel base 1906 can further comprise one or more spacer arms 1914 extending from the panel base 1906. One or more spacers 1916 (e.g., 1916A, 1916B, and 1916C) can be disposed on one or more of the spacer arms 1914. The spacers can be spaced apart from each other at desired positions spaced apart from each other within the hopper (e.g., on the spacer arms 1914) and extending into the interior volume defined by the frame. Each of the spacers 1916 can at least partially define a level spaced apart by a distance greater than a height of one solar panel to provide space for a solar panel to be supported at each defined level within the hopper 1902. For example, spacer 1916A can define a first level, spacer 1916B can define a second level below the first level, and the spacer 1916C can define a third level below the second level. Each level and spacer can at least partially support one of the solar panels in the hopper 1902. The spacers 1916 can be support structures that each support at least one solar panel and the spacers 1916 together can define multiple support levels for supporting solar panels within the hopper 1902. For example, the panel base 1906 can define a first support level for a lead or first solar panel within the hopper 1902 and each successive spacer 1916 on a spacer arm 1914 can define successive support levels for successive solar panels. The support spacers 1916 can provide a benefit that each solar panel in the hopper 1902 is supported by its own respective spacers 1916, thereby relieving excessive load from bottom panels with in the hopper that may be damaged by supporting the weight of multiple panels. In the case of the spacers 1916, the solar panels in the hopper 1902 do not support the weight of other solar panels and are, therefore, protected from damage.

The solar panel dispensing device 1900 can further include a guide arm 1918 comprising a support surface 1919 positioned adjacent to the opening and exit 1908 of the hopper 1902, extending away from the exit 1908, and configured to guide the solar panels 1924 from the hopper 1902 to an installation position and/or installed position relative to a solar panel mount. As illustrated in FIGS. 19A and 19B, the guide arm 1918 can be angled with respect to the hopper 1902 of the solar panel dispensing device 1900. While the guide arm 1918 is angled upward relative to a horizontal plane and to the device 1900, it will be appreciated that the guide arm 1918 can be formed at any desired angle. The angle of the guide arm 1918 relative to the and hopper 1902 is not intended to be limited in anyway by this disclosure. The angle of the guide arm 1918 can be angled any of upward (e.g., greater than 0 degrees), downward (e.g., less than 0 degrees), or horizontal (e.g., at 0 degrees), relative to the solar panel dispensing device to facilitate installation of solar panels into mounts and at angles that are oriented in directions that are any of upward, downward, or horizontally relative to a horizontal plane or the dispensing device.

The guide arm 1918 can be configured to guide solar panels 1924 from the hopper 1902 to the solar panel mount configured to receive the solar panel in an orientation or position used for installing the solar panel into the solar panel mount. In other words, the guide arm 1918 can be positioned and/or angled relative to the hopper 1902 such that, as the solar panel moves over or through the guide arm, the solar panel is placed in an appropriate orientation to facilitate installation in the solar panel mount. The solar panel mount can be any solar panel mount in accordance with the principles and examples discussed herein.

The solar panel dispensing device 1900 can further comprise a panel actuator 1920 configured to displace a lead solar panel 1924A of the plurality of solar panels 1924 contained in the hopper 1902 through the exit 1908, and to present the lead solar panel 1924A to the guide arm 1910.

As illustrated in FIGS. 19A and 19B, the panel actuator 1920 can be a robotic arm comprising one or more linkages 1920A and 1920B that are moveably coupled together and to the solar panel dispensing device 1900 by one or more joints 1921A and 1921B. As shown, the robotic arm panel actuator 1920 can include a first end supported at a position proximate to the hopper 1902 at joint 1921A. In one example, the robotic arm panel actuator 1920 can be supported directly from a component of the frame or the hopper 1902, as shown. The panel actuator 1920 can further comprise a second end that is moveable about the hopper 1902, wherein the second end includes an end effector 1922 coupled to one of the linkages 1920A or 1920B via a joint 1923. The end effector 1922 can be a contact interface between the actuator and the solar panel that is configured to interface with a lead solar panel 1924A of the plurality of solar panels 1924 to facilitate displacement of the lead solar panel 1924A through the exit 1908, presentation of the lead solar panel 1924A to the guide arm 1910, and movement of the lead solar panel 1924A through the guide arm 1910 to the installation position. The end effector 1922 can be operable to release the solar panel 1924A at the installation position.

The panel actuator 1920 being a robotic arm can comprise the first end movably coupled to a frame of the solar panel dispensing device 1900 at any location appropriate to interact with solar panels in the hopper 1902. For example, the first end can be the end of the linkage 1920A coupled to the frame of the solar panel dispensing device 1900 at joint 1921A. The panel actuator 1920 can further comprise a second end configured to lift a lead solar panel of the plurality of solar panels from the hopper 1902, move the solar panel through the guide arm 1918 to the installation position, and release the solar panel at the installation position. The second end of the panel actuator 1920 can be the end effector 1922 configured to interface with and move the solar panel 1924A. The end effector can be any type of end effector operable to interface with and/or lift a solar panel without limitation. For example, the end effector 1922 can be a vacuum gripper configured to lift the solar panel through suction, a suction cup gripper, an end effector configured to grip the solar panel, or any other known end effector operable to interface with and move a solar panel.

Figure 20:
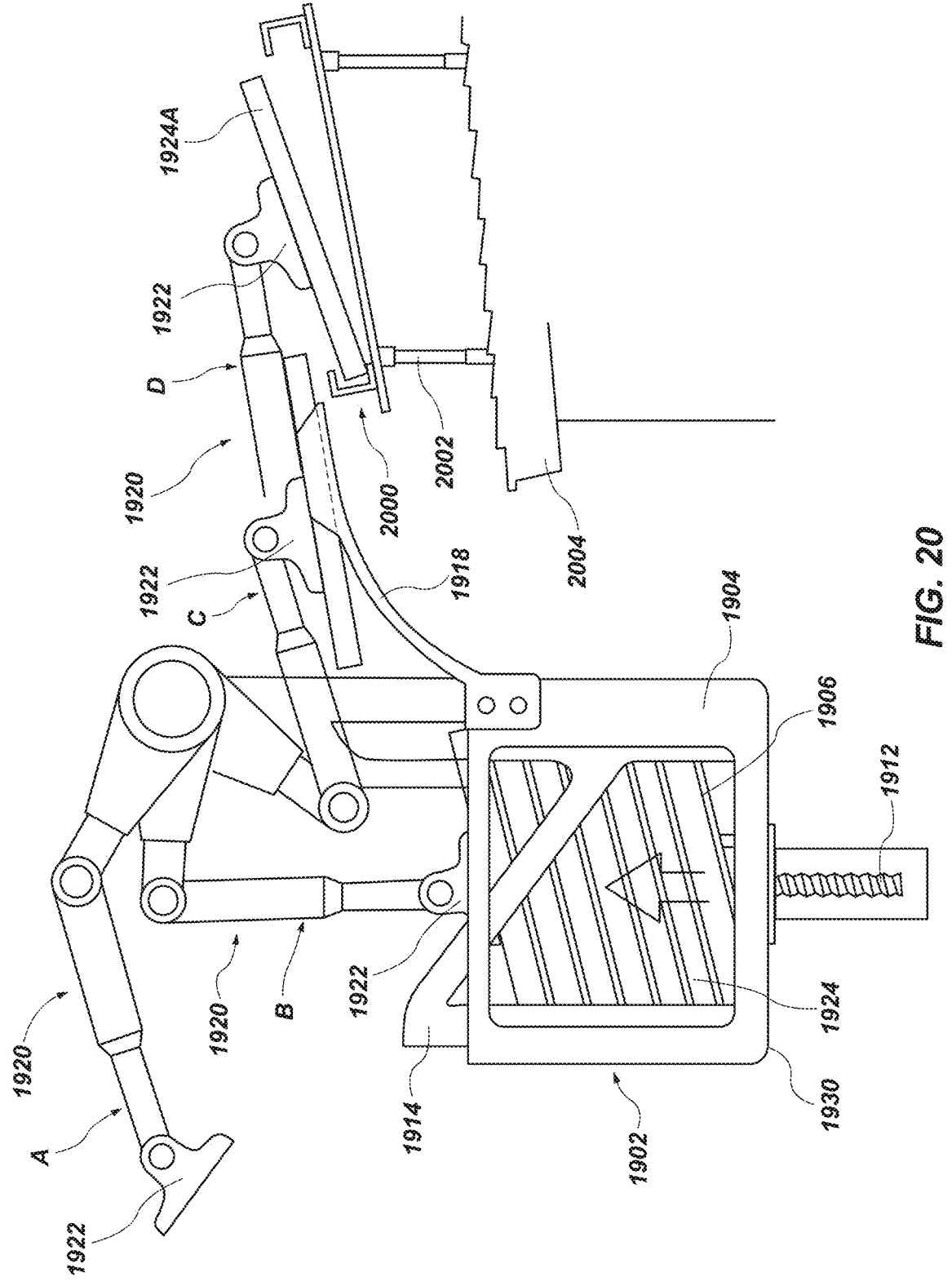
FIG. 20 illustrates a side view of the solar panel dispensing device of FIGS. 19A and 19B in operation in accordance with an example of the present disclosure.

FIG. 20 illustrates an example of operation of the solar panel dispensing device 1900 installing a solar panel 1924A in a solar panel mount 2000. The solar panel dispensing device 1900 and the guide arm 1918 thereof can first be aligned with the solar panel mount 2000 to ensure proper alignment and installation of the solar panels into the mount 2000. The solar panel dispensing device 1900 and guide arm 1918 can be aligned with the mount 2000 by a user by manual manipulation and positioning performed by the user or motorized movement of the device 1900 controlled by the user and aided by either eyesight or cameras mounted on the dispensing device 1900 providing video to the user on a display. Aligning the device 1900 with the mount 2000 can also be carried out by automated means, such as automated movement of the device 1900 using sensors or cameras mounted on the device 1900 to align with specified features or sensor tags, magnets, proximity sensors, or other sensors disposed on the mount 2000. Aligning the device 1900 with the mount 2000 may further be carried out by moving the device 1900 such that mechanical or structural features of the device 1900 mate with corresponding guide features disposed on the mount 2000.

As illustrated, the solar panel dispensing device 1900 can operate to dispense a solar panel 1924A by using the panel actuator 1920. The panel actuator 1920 can move from any position (e.g., position A in FIG. 20) to a position B in which the panel actuator 1920 can interface with one of the solar panels 1924 contained in the hopper 1902 (e.g., a lead solar panel). The panel actuator 1920 can interface with the solar panel 1924 through suction, gripping, lifting, adhesive, or any other known means. The panel actuator 1920 can then move the solar panel to and through the guide arm 1918 as shown in position C of FIG. 20. The guide arm 1918 can be aligned with a solar panel mount 2000 in such a way that the guide 1918 acts to properly align the solar panel 1924A with an installation position in which the solar panel 1924A can be initially inserted into the solar panel mount 2000. At position D of the panel actuator 1920, the solar panel is moved into an installation position at which the solar panel is initially inserted into the solar panel mount 2000 before being released into the solar panel mount 2000 to a final installed position.

The guide arm 1918 allows for the panel actuator 1920 to be controlled in a predictable and repeatable motion to install successive solar panels 1924 in various solar panel mounts. Without a guide arm, a panel actuator 1920 may need to detect positions of the solar panel mount in order to install solar panels in solar panel mounts. Additionally, without the reference defined by the guide arm 1918, multiple different motions may be required for the panel actuator 1920 to install a solar panel in a mount. With the guide arm 1918, a single, repeatable motion can be used to install a plurality of solar panels once the guide arm 1918 is properly aligned with a solar panel mount, thus significantly decreasing the complexity of control required to operate the panel actuator 1920.

FIG. 20 illustrates the solar panel 1924A being installed into the solar panel mount 2000 in a bottom first configuration. However, it will be appreciated that the solar panel dispensing device 1900 can be configured to insert a solar panel into any solar panel mount configured according to the principles described herein (e.g., any of the solar panel mounts described herein and shown in the figures). Additionally, the solar panel dispensing device 1900 and the guide arm 1918 thereof can be configured to insert a solar panel into a solar panel mount in a manner as described in any of the examples herein (e.g., FIGS. 3A-3E, 6A-6E, 7A-7D, 8A-8D, 10A-10D, and/or 11A-11D). As additionally shown in FIG. 20, the solar panel mount 2000 can be mounted via support members 2002 to a structure or ground

2004 such as a ground surface, a house, a building, a frame, or any other structure or ground surface without limitation.

As each successive solar panel 1924 is dispensed from the solar panel dispenser 1900, the hopper actuator 1912 can actuate to move the panel base 1906 toward the panel actuator 1920 to move the solar panels 1924 in the hopper 1902 in a successive manner to facilitate dispensing the panels 1924 from the hopper 1902. As illustrated, the panel base 1906 in the hopper 1902 can be angled with respect to a base 1930 of the solar panel dispensing device 1900 (which can also be a base of the hopper 1902) to support the plurality of solar panels 1924 at an orientation that is angled with respect to the base 1930 of the solar panel dispensing device 1900 and/or the base of the hopper 1902. Alternatively, the panel base 1906 can be oriented substantially parallel to the base 1930 of the solar panel dispensing device 1900 and/or the hopper 1902. The orientation of the panel base 1906 is not intended to be particularly limited by this disclosure.

Figure 21A:
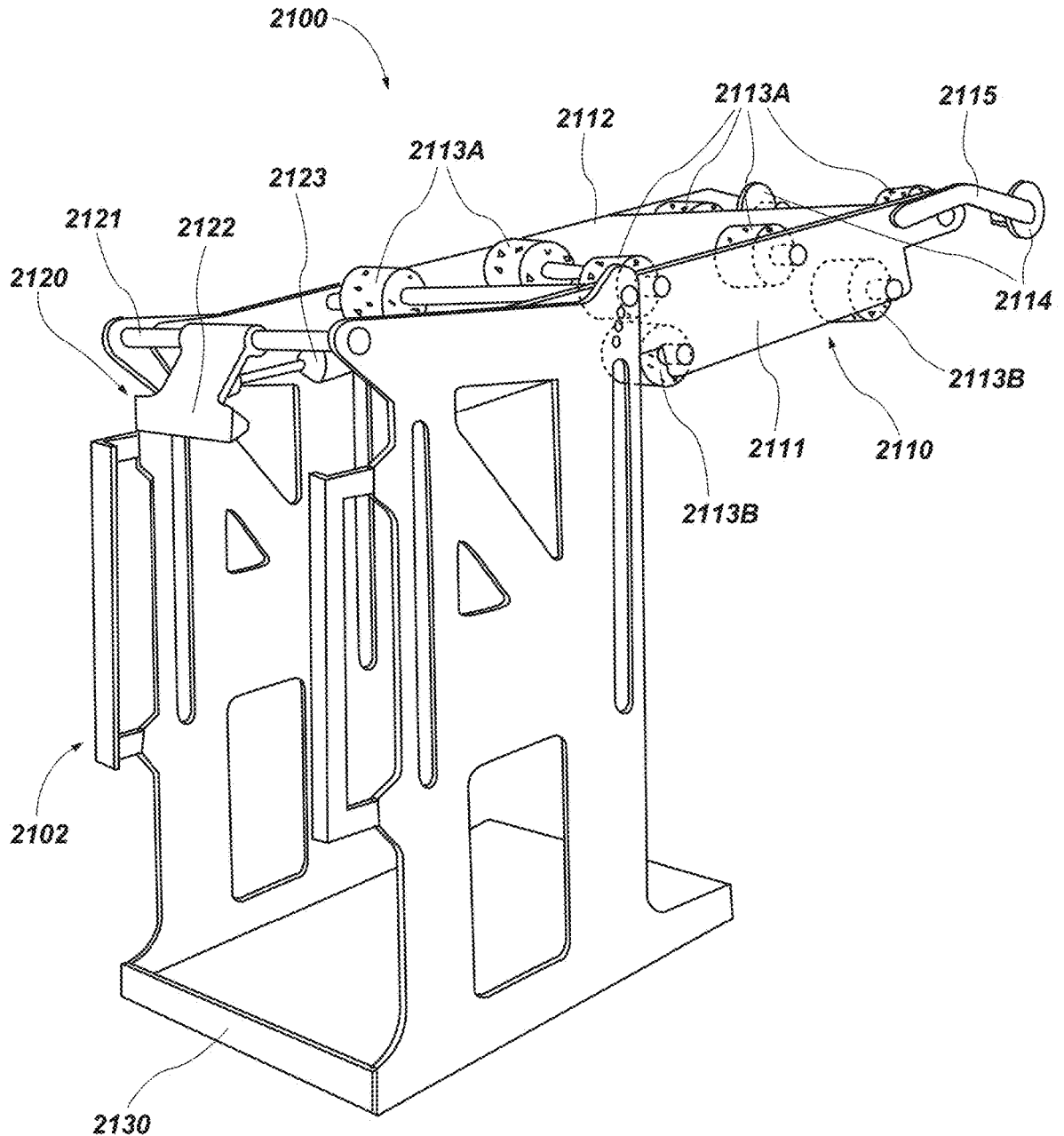
FIGS. 21A and 21B illustrate isometric views of a solar panel dispensing device in accordance with an example of the present disclosure.
Figure 21B:
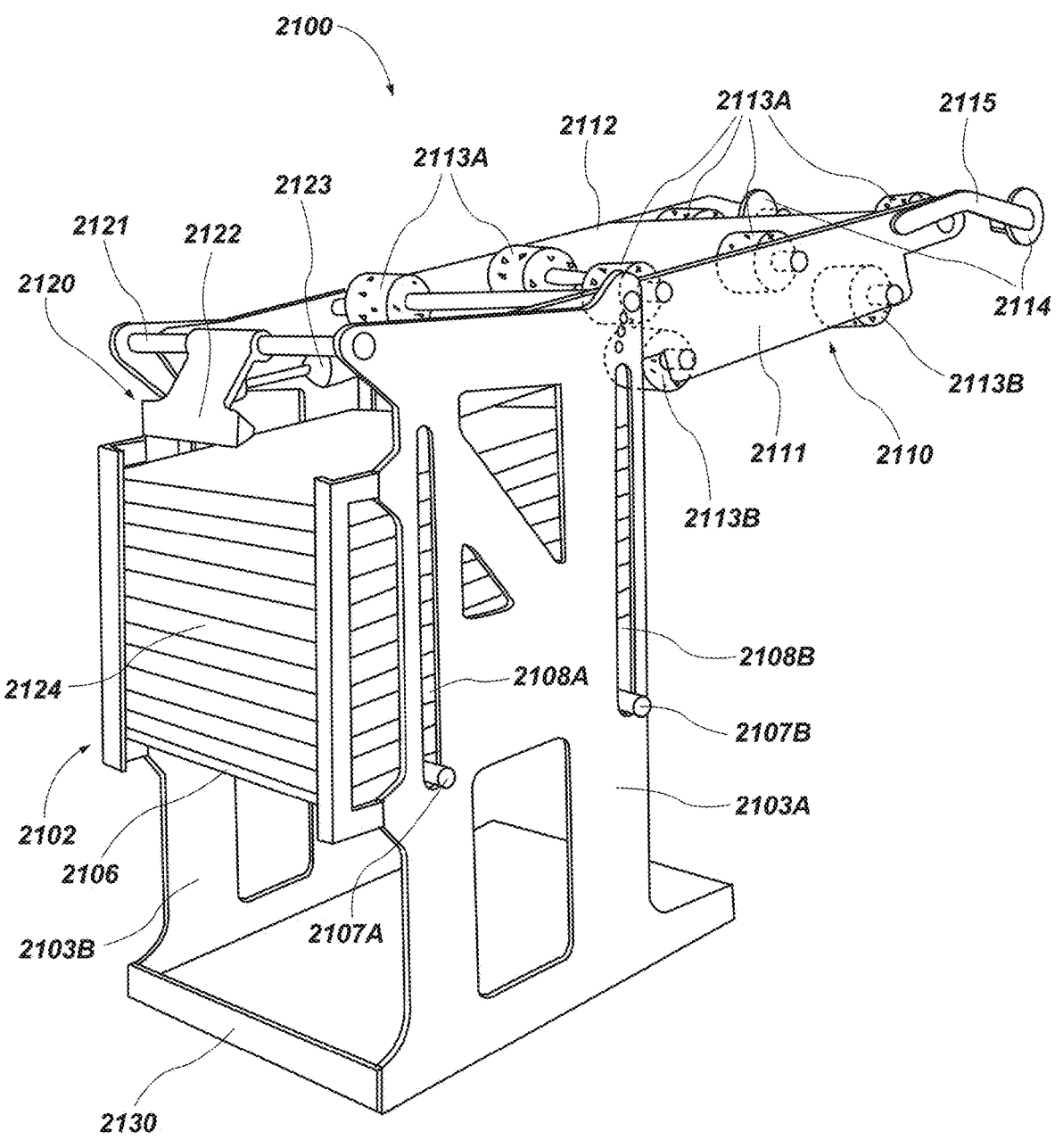
Figures 21C, 21D, 21E:
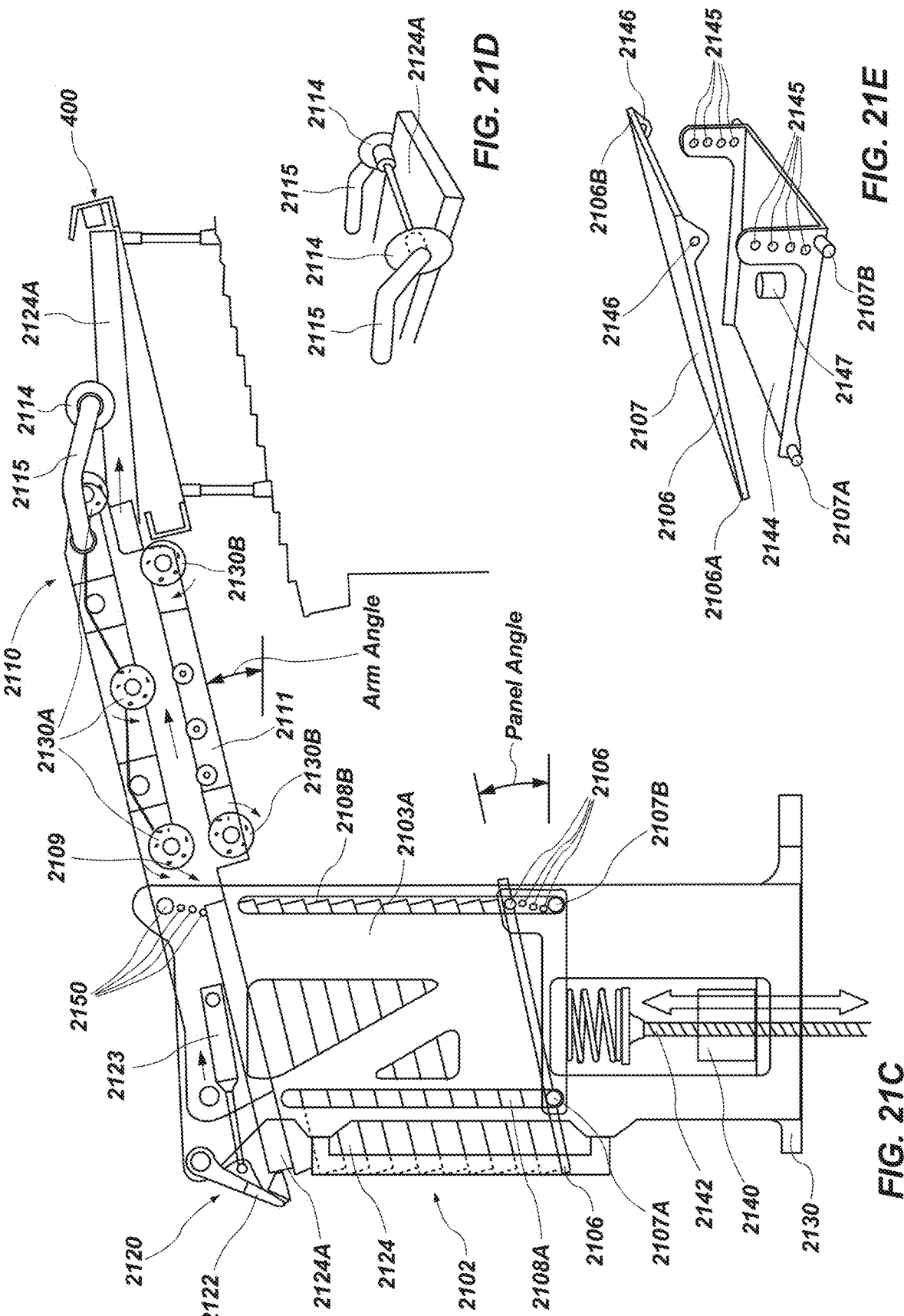
FIG. 21C illustrates a side view of the solar panel dispensing device of FIGS. 21A and 21B in operation in accordance with an example of the present disclosure.
FIG. 21D illustrates a directing arm of the solar panel dispensing device of FIG. 21C according to an example of the present disclosure.
FIG. 21E illustrates an adjustable panel base of the solar panel dispensing device of FIG. 21C according to an example of the present disclosure.

Another exemplary solar panel dispensing device 2100 is illustrated in FIGS. 21A, 21B, and 21C. As shown in FIG. 21A, the solar panel dispensing device 2100 can comprise a hopper 2102 configured to support a plurality of solar panels therein. The hopper 2102 can include a first side 2103A and a second side 2103B supported on a base 2130 and defining an interior space in which to support and house the solar panels. The solar panel dispensing device 2100 can further include an exit 2109 defined by an opening in the hopper 2102 that allows for solar panels 2124 to be moved out of the hopper 2102. The hopper 2102 can be configured to contain a plurality of solar panels 2124 therein, the hopper comprising the exit 2109 that is configured to facilitate removal of the plurality of solar panels 2124 out of the hopper 2102. The opening and associated exit 2109 can be formed anywhere in the hopper 2102 (e.g., top, bottom, or on any sides of the hopper). The location of the exit 2109 is not intended to be limited in anyway by this disclosure. In the example shown in FIG. 21C, the exit 2109 is formed near a top of the hopper 2102 such that the solar panels 2124 are configured to be dispensed from the top of the hopper 2102.

The solar panel dispensing device 2100 can further include a guide arm 2110 positioned adjacent to the exit 2109 of the hopper 2102 and configured to guide the solar panels 2124 from the hopper 2102 to an installation position and/or installed position relative to a solar panel mount. As illustrated in FIGS. 21A-21C, the guide arm 2110 can be angled with respect to the hopper 2102 and/or the solar panel dispensing device 2100. The angle of the guide arm 2110 relative to the solar panel dispensing device 2100 and hopper 2102 is not intended to be limited in anyway by this disclosure. The guide arm 2110 can be configured to guide solar panels 2124 from the hopper 2102 to a solar panel mount configured to receive the solar panel 2124 in an orientation or position that facilitates installing the solar panel into the solar panel mount. In other words, the guide arm 2110 can be positioned and/or angled relative to the hopper 2102 and/or solar panel dispensing device 2100 such that, as the solar panel moves over or through the guide arm 2110, the solar panel is placed in an appropriate orientation to be installed in the solar panel mount. The solar panel mount can be any solar panel mount in accordance with the principles and examples discussed herein.

In the configuration illustrated in FIGS. 21A-21C, the guide arm 2110 can comprise one or more support members such as a first arm 2111 and a second arm 2112 extending away from the hopper 2102 parallel to each other. The first arm 2111 and the second arm 2112 can extend away from the exit 2109 and be configured to guide a lead solar panel 2124A to an installation position. The first arm 2111 and the second arm 2112 can together support a plurality of rollers 2113 between the arms that are operable to act as support surfaces and rotate and drive the solar panel 2124 from the hopper 2102 to an installation position. The rollers 2113 can include upper rollers 2113A configured to interface with an upper surface of the solar panels being dispensed through the guide arm 2110. The rollers can further include lower rollers 2113B configured to support and interface with a lower surface of the solar panels being dispensed through the guide arm 2110. One or more of the rollers can be driven by a motor to provide a driving force to drive the solar panel to the end of and out of the guide arm 2110. The guide arm 2110 can further include a directing arm 2115 disposed at an end of the guide arm 2110 away from the hopper 2102. The directing arm 2115 can include a roller 2114 at the end thereof. The directing arm 2115 can be configured to direct the solar panel into the installation position as the solar panel leaves the guide arm 2110.

As illustrated in FIG. 21C, the lead solar panel 2124A is dispensed from the hopper 2102 into the guide arm 2110 and from the guide arm 2110 to an installation position at the end of the guide arm 2110. At the installation position, the directing arm 2115 is actuated downward to position the lead solar panel 2124A into an installation angle that facilitates insertion of the lead solar panel 2124A into a solar panel mount 400 in which the lead solar panel 2124A is to be installed. A detailed illustration of the directing arm 2115 interfacing with a solar panel 2124A is shown in FIG. 21D.

The solar panel dispensing device 2100 can further comprise a panel actuator 2120 configured to move the solar panels out of the hopper 2102 via the exit 2109 and towards the guide arm 2110. As illustrated in FIGS. 21A-21C, the panel actuator 2120 can be a rotating arm 2122 including a contact interface 2125 configured to contact and displace a lead solar panel 2124 of the contained solar panels 2124 out of the exit 2109 of the hopper 2102 from a rear of the solar panel. The rotating arm 2122 can have a first end coupled to a shaft 2121 and a second that interfaces with and pushes the solar panel. The shaft 2121 can be configured to rotate to cause the rotating arm 2120 to push the solar panel out of the hopper 2102. The shaft 2121 and the rotating arm 2122 can be actuated by an arm actuator 2123 coupled to the rotating arm 2122 that is operable to rotate the rotating arm 2122 about the shaft 2121 to drive a solar panel out of the hopper 2102 and into the guide arm 2110. As illustrated in FIG. 21C, as the panel actuator 2120 pushes the lead solar panel out of the exit 2109 of the hopper 2102, the lead solar panel is caused to interface with the upper and lower rollers 2130A and 2130B of the guide arm 2110. Accordingly, once the solar panel is only partially out of the exit 2109, the solar panel can then be pulled out of the hopper 2102 by the driving of the rollers 2130 of the guide arm 2110. The solar panel can then be driven by the rollers 2130 to a distal end of the guide arm 2110 and out of the guide arm 2110 into the installation position relative to a solar panel mount.

As shown in FIGS. 21B and 21C, the hopper 2102 can further include a panel base 2106 configured to interface with and support the plurality of solar panels 2124. The panel base 2106 can interface with the first side 2103A and the second side 2103B of the hopper 2102 to be disposed in the hopper 2102 at a position to support the solar panels 2124. The panel base 2106 can be movable within the hopper 2102 to actuate towards the exit 2109 of the hopper 2102 in order to move solar panels towards the exit 2109 in preparation for being dispensed from the device 1900. For example, as shown in FIG. 21B, the panel base 2106 can comprise a first pin 2107A and a second pin 2107B that interface with a first slot 2108A and a second slot 2108B formed in the first side 2103A of the hopper 2102. Similar corresponding pins and slots can be formed on the opposite side of the panel base 2106 and the second side 2103B. By the interface between the pins 2107A and 2107B and the slots 2108A and 2108B, the panel base 2106 can slide toward the top of the hopper 2102 as panels are dispensed or can slide downward toward a top of the hopper 2102 as panels are loaded in the hopper 2102.

A hopper actuator 2140 can be operable to actuate the panel base 2106 upward or downward by driving a shaft 2142 coupled to the hopper actuator 2140 and the panel base 2106. Actuation of the hopper actuator 2140 can push the panel base 2106 toward a portion of the hopper 2102 where the exit 2109 is defined. The type of hopper actuator 2140 is not intended to be limited in anyway by this disclosure. The hopper actuator 2140 can be a piston device, a motor, an engine, a lift, and/or another actuator operable to drive a moveable column, an extendable column, a linkage, an arm, or any other structure coupled to the panel base 2106 to move the panel base 2106 and the plurality of solar panels towards the exit 2109 of the hopper 2102. As each successive solar panel 2124 is dispensed from the hopper 2102, the panel actuator can actuate the solar panels 2124 upward to place another solar panel in a leading position to be dispensed from the hopper 2102.

As shown in FIG. 21C, the panel base 2106 can be angled within the hopper 2102 toward the exit 2109 to align the solar panels 2124 at an exit angle toward the exit 2109 to facilitate dispensing the solar panels from the hopper 2102. The panel base 2106, and therefore the solar panels 2124, can be angled at a panel angle as shown in FIG. 21C. Additionally, the guide arm 2110 can be angled at an arm angle. To facilitate dispensing of the solar panels from the hopper 2102, the arm angle and the panel angle can be substantially the same (i.e., within +/−10 degrees of) to facilitate smooth transitions for the solar panels from the hopper 2102 to the guide arm 2110 as shown in FIG. 21C. The arm angle can be set to provide desired alignment of the guide arm 2110 with a solar panel mount (e.g., solar panel mount 400).

As illustrated in FIG. 21C, the guide arm 2110 can be aligned with the solar panel mount 400 to allow the solar panel 2124A exiting the distal end of the guide arm 2110 to clear a lower edge (e.g., second support 404) of the solar panel mount 400. The solar panel dispensing device 2100 and guide arm 2110 can be aligned with the mount 400 by a user by manual manipulation and positioning performed by the user or motorized movement of the solar panel dispensing device 2100 controlled by the user and aided by either eyesight or cameras mounted on the dispensing solar panel dispensing device 2100 providing video to the user on a display. Aligning the solar panel dispensing device 2100 with the mount 400 can also be carried out by automated means, such as automated movement of the solar panel dispensing device 2100 using sensors or cameras mounted on the solar panel dispensing device 2100 to align with specified features or sensor tags, magnets, proximity sensors, or other sensors disposed on the mount 400. Aligning the solar panel dispensing device 2100 with the mount 400 may further be carried out by moving the solar panel dispensing device 2100 such that mechanical or structural features of the solar panel dispensing device 2100 mate with corresponding guide features disposed on the mount 400.

As the solar panel 2124A exits the guide arm 2110, the directing arm 2115 and roller 2114 can be angled to guide the solar panel 2124A into the solar panel mount 400 at an installation position, or in other words an installation angle, that is appropriate for mating the solar panel 2124A with the mount 400. It will be appreciated that the solar panel installation position and installation angle will vary based on the type of solar panel mount being used to capture and retain the solar panel 2124A. The installation positions and installation angles for each of the solar panel mounts are described in this disclosure with respect to each disclosed solar panel mount. It will be understood by those skilled in the art that the angle of the guide arm 2110 and the directing arm 2115 can be determined based on the solar panel mount being used and the angle of installation for the solar panel 2124A. It will be appreciated that the angle of the guide arm 2110 can be different from or the same as the angle for the directing arm 2115 depending on the desired installation conditions. The directing arm 2115 can be aligned with the guide arm 2110 or can be oriented at a different angle than the guide arm 2110.

The panel angle and the arm angle can be adjusted in the solar panel dispensing device 2100. FIG. 21E illustrates an adjustable panel base 2106. The panel base 2106 can comprise a support surface 2107 configured to support the plurality of solar panels 2124 thereon. As illustrated, the panel base 2106 can be supported by an adjustment panel 2144 that supports the pins 2107A and 2107B. The adjustment panel 2144 can include two vertical members having a plurality of holes 2145 formed therein. The panel base 2106 can include holes 2146 formed in opposite edges of the panel base 2106. The angle of the panel base 2106 can be adjusted by inserting a fastener or pin in a desired hole 2145 corresponding to a desired angle for the panel base 2106. The fastener can also go through the holes 2146 to couple the panel base 2106 to the adjustment panel 2144 at the holes 2145 corresponding to a desired angle of the panel base 2106. In this manner, the panel angle can be adjusted to any desired angle, whether parallel or inclined relative to the base 2130 of the solar panel dispensing device 2100. The panel base 2106 can include a pivoting end 2106A configured to interface the panel base 2106 to the solar panel dispensing device (e.g., adjustment panel 2144). The pivoting end 2106A can interface with the adjustment panel 2144 via a pivoting connection between the panel base 2106 and the adjustment panel 2144. Alternatively, the pivoting end 2106A may simply rest on the adjustment panel 2144 without any additional connection. The panel rest 2106 can further include an adjustable end 2106B configured to rotate about the pivoting end 2106A. The adjustable end 2106B can include the holes 2146 formed therein to configure the adjustable end 2106B to be secured in place at a desired angle of the plurality of different angles corresponding to the holes 2145 in the adjustment panel 2144.

The adjustable end 2106B of the panel base 2106 can be configured to be manually adjusted by a user. Additionally or alternatively, the adjustable end 2106B can be adjusted by an actuator 2147 configured to actuate upward or downward between an extended position and a retracted position relative to the panel base 2106 to push the panel base upward to a steeper angle or release the panel base 2106 downward to a shallower angle relative to the adjustment panel 2144. The actuator 2147 is shown as a piston that can actuate to move upward or downward. The actuator 2147 can be one or more of a hydraulic actuator, electric actuator, motorized actuator, and mechanical actuator. Any known actuator can be used to raise or lower the panel base 2106.

Similarly, the arm angle of the guide arm 2110 relative to the hopper 2102 can be adjusted. For example, the guide arm 2110 can be coupled to the hopper 2102 at a pivot that allows the guide arm 2110 to pivot upward and downward relative to the hopper 2102 to adjust the arm angle. A plurality of holes 2150 can be formed in the hopper 2102 to correspond to a similar hole in the guide arm 2110. The guide arm 2110 can be set to a desired angle by pivoting the guide arm 2110 relative to the hopper and fixing the guide arm 2110 in place by providing a fastener, bolt, or pin through one of the holes 2150 corresponding to a desired angle (e.g., upward angle, downward angle, or horizontal) and also through the hole in the guide arm 2110 to fix the guide arm 2110 in place at the desired angle. Adjustment of the guide arm 2110 at such desired angles can facilitate installation of solar panels into mounts and at angles that are oriented in directions that are any of upward (e.g., greater than 0 degrees), downward (e.g., less than 0 degrees), or horizontal (e.g., at 0 degrees), relative to a horizontal plane or the dispensing device.

Figure 22:
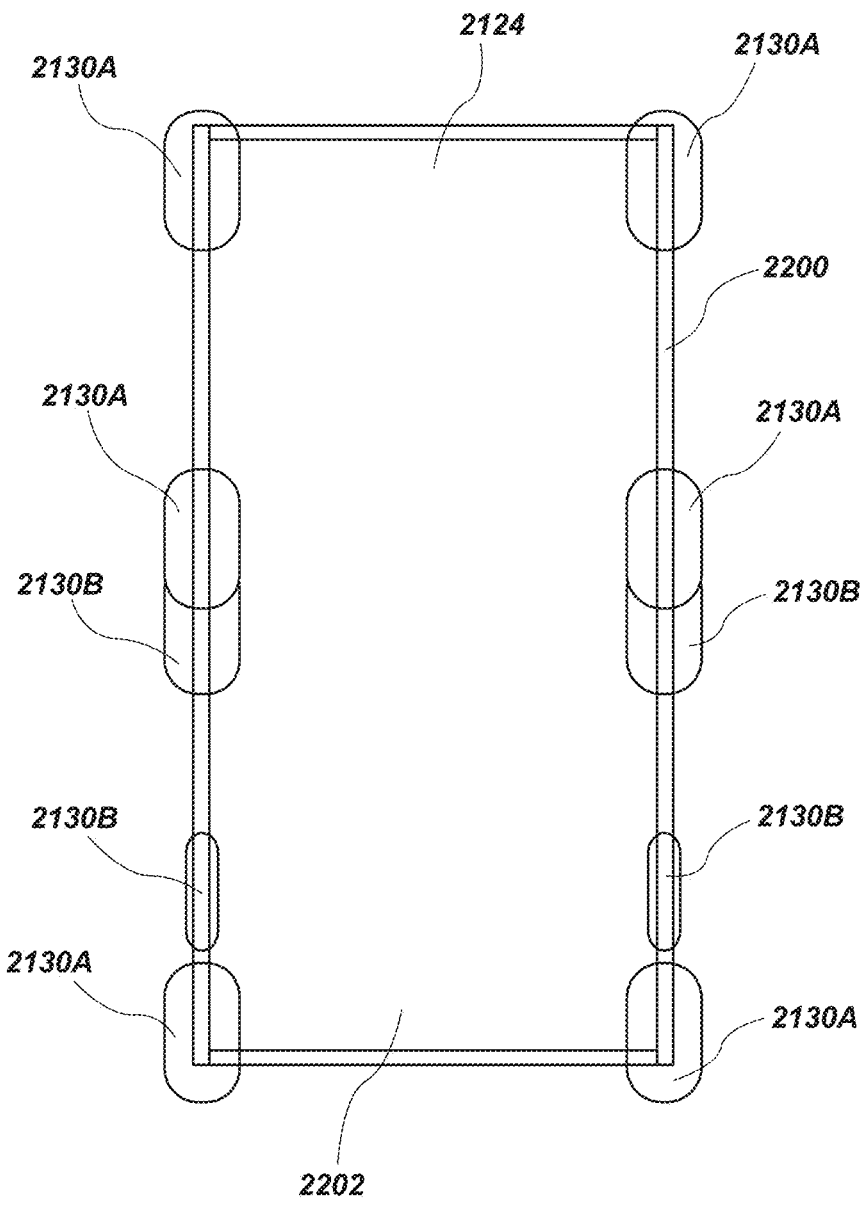
FIG. 22 illustrates a top view of an arrangement of a solar panel relative to rollers of the solar panel dispensing device of FIG. 21C according to an example of the present disclosure.

The rollers 2130A and 2130B, collectively referred to as the rollers 2130, can be disposed on the guide arm 2110 at locations configured to contact the edges of the solar panel 2124. For example, as illustrated in FIG. 22, the positions of the rollers 2130 are each positioned on the guide arm to contact an edge region 2200 of the solar panel 2124. The edge region 2200 can comprise reinforcing frames around the edges of the solar panel to house the solar components and to support the solar panel 2124. In general, the edge region 2200 can be stronger and less susceptible to damage than the solar collecting surface 2202 in the central region of the solar panel. Therefore, to avoid damage to the solar panel during installation, the rollers 2130 can be disposed on the guide arm to only contact or to at least contact a portion of the edge region 2200 of the solar panel. However, this is not intended to be limiting in any way as the rollers can be positioned and configured in other examples to contact any portion of the solar panel.

Figure 23A:
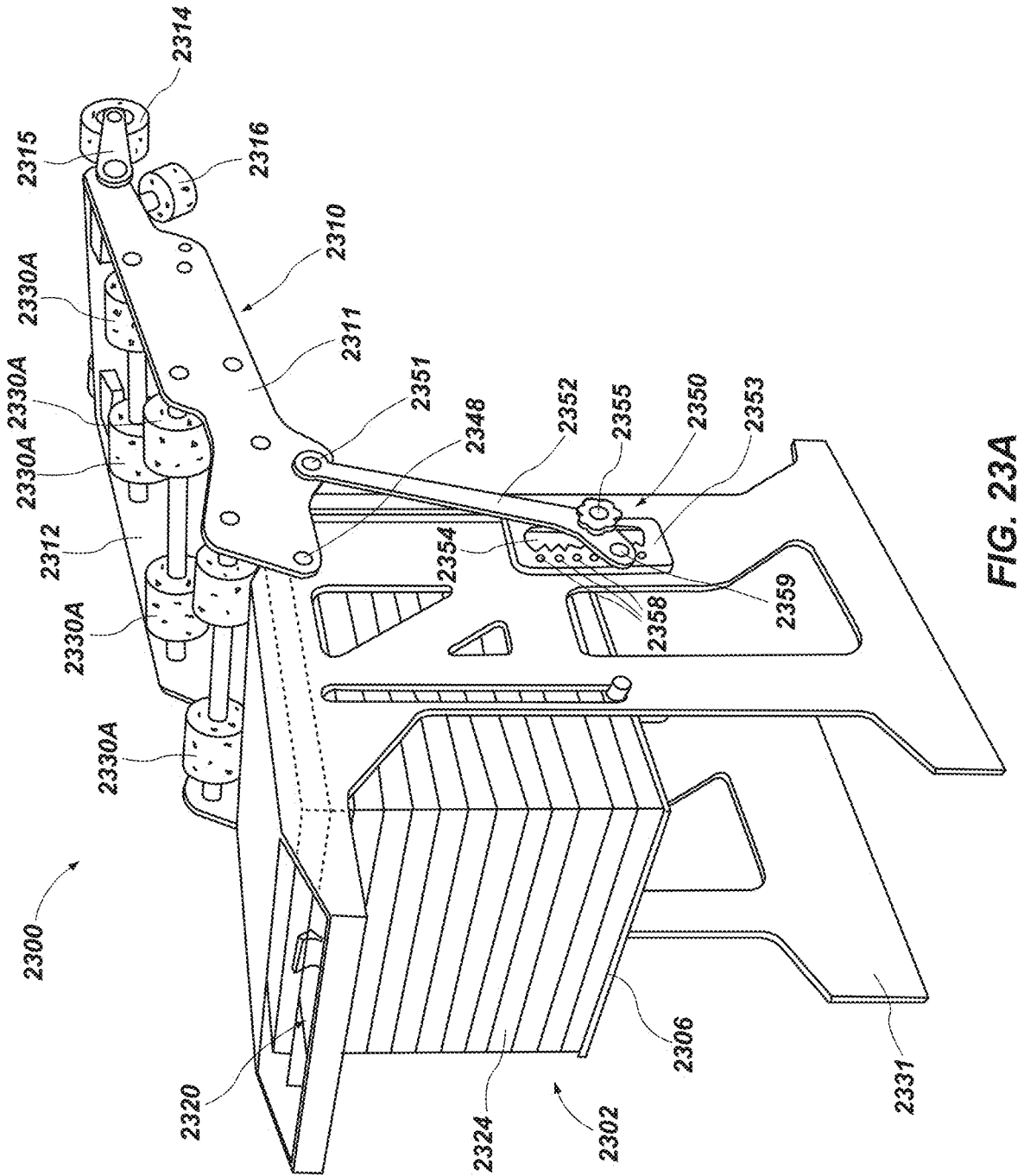
FIG. 23A illustrates an isometric view of a solar panel dispensing device in accordance with an example of the present disclosure.
Figures 23B, 23C:
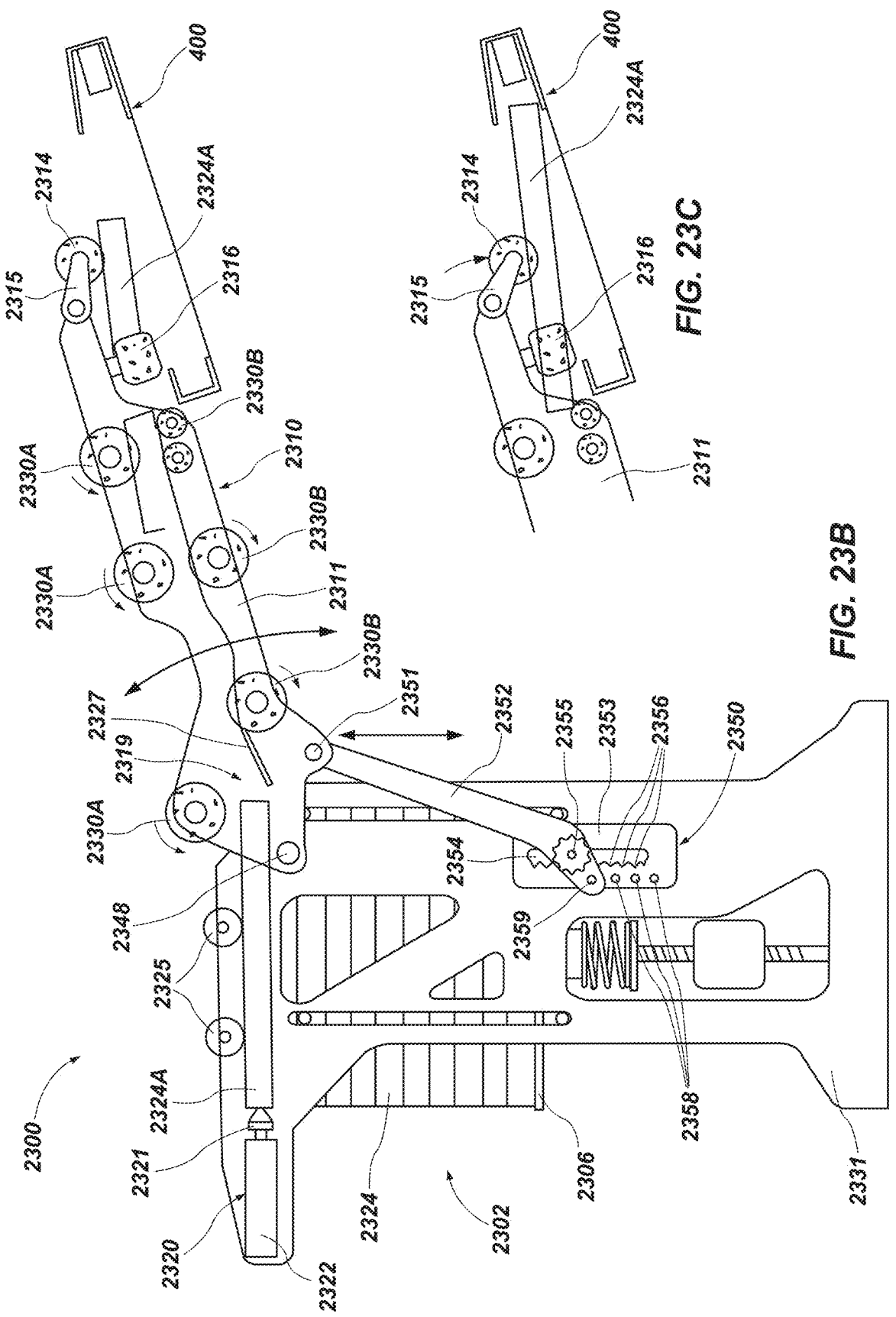
FIGS. 23B and 23C illustrate side views of the solar panel dispensing device of FIG. 23A in operation in accordance with an example of the present disclosure.

Another exemplary solar panel dispensing device 2300 is illustrated in FIGS. 23A, 23B, and 23C. As shown in FIG. 23A, the solar panel dispensing device 2300 can comprise a hopper 2302 configured to support the plurality of solar panels 2324 therein on a hopper base 2306, a base 2331, a guide arm 2310 comprising a plurality of rollers 2330A and 2330B supported by a first arm 2311 and a second arm 2312 and acting as support surfaces of the guide arm 2310, a panel actuator 2320, and a guide arm angle adjustment device 2350. It will be appreciated from FIG. 23A that many of the features of solar panel dispensing device 2300 are similar to features of the solar panel dispensing device 2100. To avoid redundant recitations, not all features of the solar panel dispensing device 2300 will be described in detail. Nevertheless, it will be appreciated that features that are not discussed can have similar form and function to similar features found in the solar panel dispensing device 2100.

As illustrated in FIG. 23A, the solar panels 2324 can be arranged parallel to a base of the solar panel dispensing device 2300 and the guide arm 2310 can be angled with respect to the hopper 2302 and the solar panels 2324 stored therein. The panel actuator 2320 can move the solar panels 2324 from the hopper 2302 into the guide arm 2310.

The angle of the guide arm 2310 can be adjusted by operation of an angle adjustment mechanism 2350. To facilitate the adjustment of the angle of the guide arm 2310 relative to the hopper 2302, the guide arm 2310 can be pivotally coupled to the hopper 2302 at a pivot point 2348. The angle adjustment mechanism 2350 can be coupled, pivotally or fixedly, to the guide arm 2310 at a point 2351.

The angle adjustment mechanism 2350 can include a linkage 2352 having a first end that is coupled to the guide arm 2310 at the point 2351 and a second end that is coupled to the hopper 2302 via an adjustment bracket 2353 disposed on the hopper 2302. A slot 2354 can be formed in the adjustment bracket 2353. The slot 2354 can be configured to receive an adjustment peg 2355 coupled to the second end of the linkage 2352. The slot 2354 can define a plurality of notches 2356 in the bracket 2353, each notch 2356 corresponding to an adjustment angle of the guide arm 2310. The adjustment peg 2355 can be configured to mate with the notches 2356 to set the guide arm 2310 at a desired adjustment angle (e.g., upward angle, downward angle, or horizontal) correspond-ing to the notch mated with the adjustment peg 2355. Adjustment of the guide arm 2310 at such desired angles can facilitate installation of solar panels into mounts and at angles that are oriented in directions that are any of upward (e.g., greater than 0 degrees), downward (e.g., less than 0 degrees), or horizontal (e.g., at 0 degrees), relative to a horizontal plane or the dispensing device.

The bracket 2353 can additionally include a plurality holes 2358 formed therein corresponding to the plurality of notches in the bracket 2353. The linkage 2352 can further comprise a hole 2359 formed in the second end of the linkage 2352 that is configured to correspond with one or more of the plurality of holes 2358. A bolt, pin, peg, fastener, or other means for locking the linkage 2352 in place in the bracket 2353 can be inserted into hole 2359 and one of the plurality of holes 2358 to lock the linkage 2352 in place relative to the bracket 2353.

As shown in the FIG. 23A, as the second end of the linkage 2352 is raised or lowered within the slot 2354 of the bracket 2353, the guide arm 2310 also pivots about pivot point 2348 relative to the hopper and the angle of the guide arm 2310 relative to the hopper 2302 is adjusted. In such a manner, the angle adjustment mechanism 2350 can be operated to adjust the angle of the guide arm 2310 relative to the hopper 2302 to meet a desired angle at which a solar panel is to be installed into a solar panel mount. Therefore, easy adjustment of the guide arm 2310 can be completed quickly to ensure proper alignment of the guide arm 2310 relative to a solar panel mount and to facilitate quick-install of a solar panel into the solar panel mount.

The solar panel dispensing device 2300 can comprise a panel actuator 2320 configured to move the plurality of solar panels out of the hopper 2302 via an exit 2309 of the hopper 2302 and towards the guide arm 2310. As illustrated in FIG. 23B, the panel actuator 2320 can be plunger 2321 compris-ing a contact interface 2327 configured to interface with the lead solar panel 2324A and to provide a force to displace the lead solar panel 2324A of the plurality of solar panels out of the exit 2309 of the hopper 2302 from a rear of the solar panel. The plunger 2321 can be actuated by a linear or other type of actuator 2322 that is operable to actuate the plunger 2321 in a direction to drive a solar panel 2324A out of the hopper 2302 and into the guide arm 2310. As illustrated in FIG. 23B, as the panel actuator 2320 pushes the panel out of the exit 2309 of the hopper 2302, the panel is caused to interface with the upper and lower rollers 2330A and 2330B of the guide arm 2310. Accordingly, once the solar panel is partially out of the exit 2309, the panel can then be pulled out of the hopper 2302 by the driving of the rollers 2330 of the guide arm 2310. The solar panel can then be driven by the rollers 2330 to a distal end of the guide arm 2310 and out of the guide arm 2310 into the installation position relative to a solar panel mount.

The solar panel dispensing device 2300 and guide arm 2310 can be aligned with the mount 400 by a user by manual manipulation and positioning performed by the user or motorized movement of the solar panel dispensing device 2300 controlled by the user and aided by either eyesight or cameras mounted on the dispensing solar panel dispensing device 2300 providing video to the user on a display. Aligning the solar panel dispensing device 2300 with the mount 400 can also be carried out by automated means, such as automated movement of the solar panel dispensing device 2300 using sensors or cameras mounted on the solar panel dispensing device 2300 to align with specified features or sensor tags, magnets, proximity sensors, or other sensors disposed on the mount 400. Aligning the solar panel dis-pensing device 2300 with the mount 400 may further be carried out by moving the solar panel dispensing device 2300 such that mechanical or structural features of the solar panel dispensing device 2300 mate with corresponding guide features disposed on the mount 400.

The panel actuator is not limited to the robotic arm, rotating arm, and plunger examples described herein. The panel actuator 2320 can be any means for moving the panel out of the hopper 2302 and toward the guide arm 2310. For example, the hopper 2302 can comprise one or more pow-ered rollers configured to interface with a panel nearest the exit of the hopper 2302 that are driven to move the panel out of the hopper 2302. Additionally or alternatively, the panel actuator 2320 can include one or more powered rollers 2325 supported about the hopper 2302 each configured to contact a lead solar panel of the plurality of solar panels 2324 at a contact interface and to drive the solar panel 2324A out of the exit 2319 of the hopper 2302 and into a guide 2327 to help guide the panel 2324 into the rollers 2330, as shown in FIG. 23B. It will be appreciated that the rollers 2325 can be implemented in any of the dispensing devices described herein, either in addition to or in place of the other panel actuators described herein in each example. Additionally, the powered rollers 2325 can be positioned on the guide arm 2310 near the exit of the hopper 2302 instead of or in addition to the powered rollers 2325 supported on the hopper 2302. In other words, the powered rollers 2325 can be supported on the guide arm 2310 at a position that pulls the lead solar panel out of the hopper 2302 and into the guide arm 2310. An example of such a configuration is shown in FIG. 24B The guide arm 2310 can further include a slide 2311 configured to engage with the solar panel 2324A to move the solar panel 2324A from a parallel orientation in the hopper 2302 to an angled position within the guide arm 2310. Accordingly, as the panel 2324A is pushed out of the hopper 2302 via the exit 2309, the panel contacts the slide 2311 and is pushed to be oriented at the same angle as the guide arm 2310 to ensure smooth travel of the solar panel 2324A through the guide arm 2310.

Figure 23D:
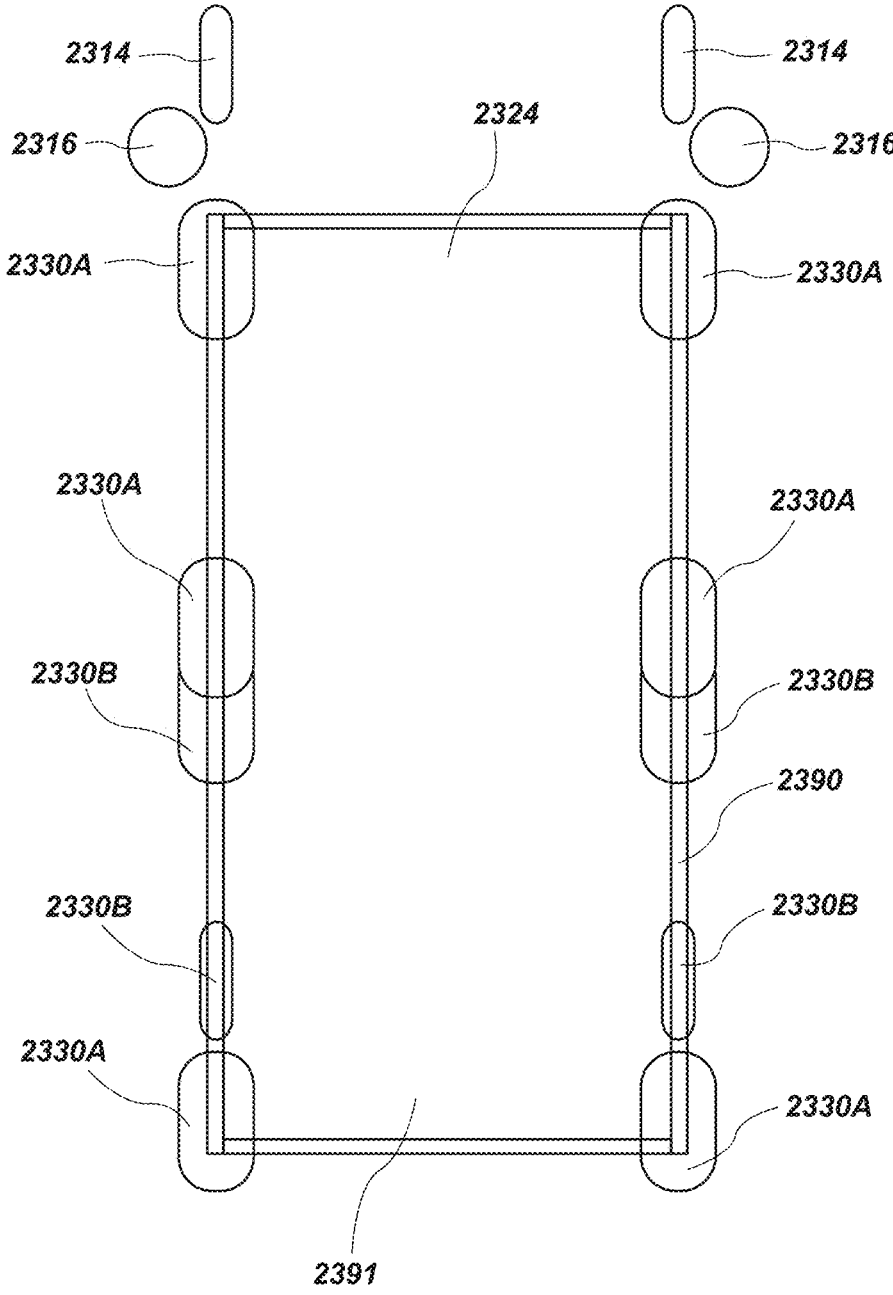
FIG. 23D illustrates a top view of an arrangement of a solar panel relative to rollers of the solar panel dispensing device of FIG. 23A according to an example of the present disclosure.

As illustrated in FIG. 23B, the panel actuator 2320 can be actuated to push the panel 2324A out of the exit and into the rollers 2330 of the guide arm 2310. As illustrated in FIG. 23D, the rollers 2330 of the guide arm 2310 can be disposed on the guide arm 2310 at locations configured to contact the edges of the solar panel 2324. For example, as illustrated in FIG. 23D, the positions of the rollers 2330 are each posi-tioned on the guide arm 2310 to contact an edge region 2390 of the solar panel 2324. The edge region can comprise reinforcing frame members around the edges of the solar panel to house the solar components and to support the solar panel 2324. In general, the edge region 2390 can be stronger and less susceptible to damage than the solar collecting surface 2391 in the central region of the solar panel 2324. Therefore, to avoid damage to the solar panel 2324 during installation, the rollers 2330 can be disposed on the guide arm 2310 to only contact or to at least contact a portion of the edge region 2390 of the solar panel.

The solar panel dispensing device 2300 can further include, on the guide arm 2310, a directing arm 2315 disposed at an end of the guide arm 2310 away from the hopper 2302. The directing arm 2315 can include a roller 2314 at the end thereof configured to direct the solar panel 2324 into the installation position as the solar panel leaves the guide arm 2310. A detail illustration of the directing arm 2315 interfacing with a solar panel 2324A is shown in FIG. 23C. As shown, as the solar panel 2324A exits the guide arm 2310, the directing arm 2315 and roller 2314 can be angled to guide the solar panel 2324A into the solar panel mount 400 at an installation position, or in other words an installation angle, that is appropriate for mating the solar panel 2324A with the mount 400.

The guide arm 2310 can additionally include one or more alignment rollers 2316 configured to interface with a side of the solar panel 2324A as the solar panel 2324A moves toward the solar panel mount 400. The alignment rollers 2316 can operate passively or be driven by a motor to facilitate driving and/or guiding the solar panel 2324A towards the directing arm 2315 and the roller 2314. As the roller 2314 and the directing arm 2315 are actuated downward to guide the solar panel 2324A into the solar panel mount 400, the alignment roller 2316 can continue driving the solar panel 2324A until the solar panel 2324A clears the support structures of the solar panel mount 400 and is slid into place onto a panel rest of the solar panel mount to be positioned in an installed position.

Figure 24A:
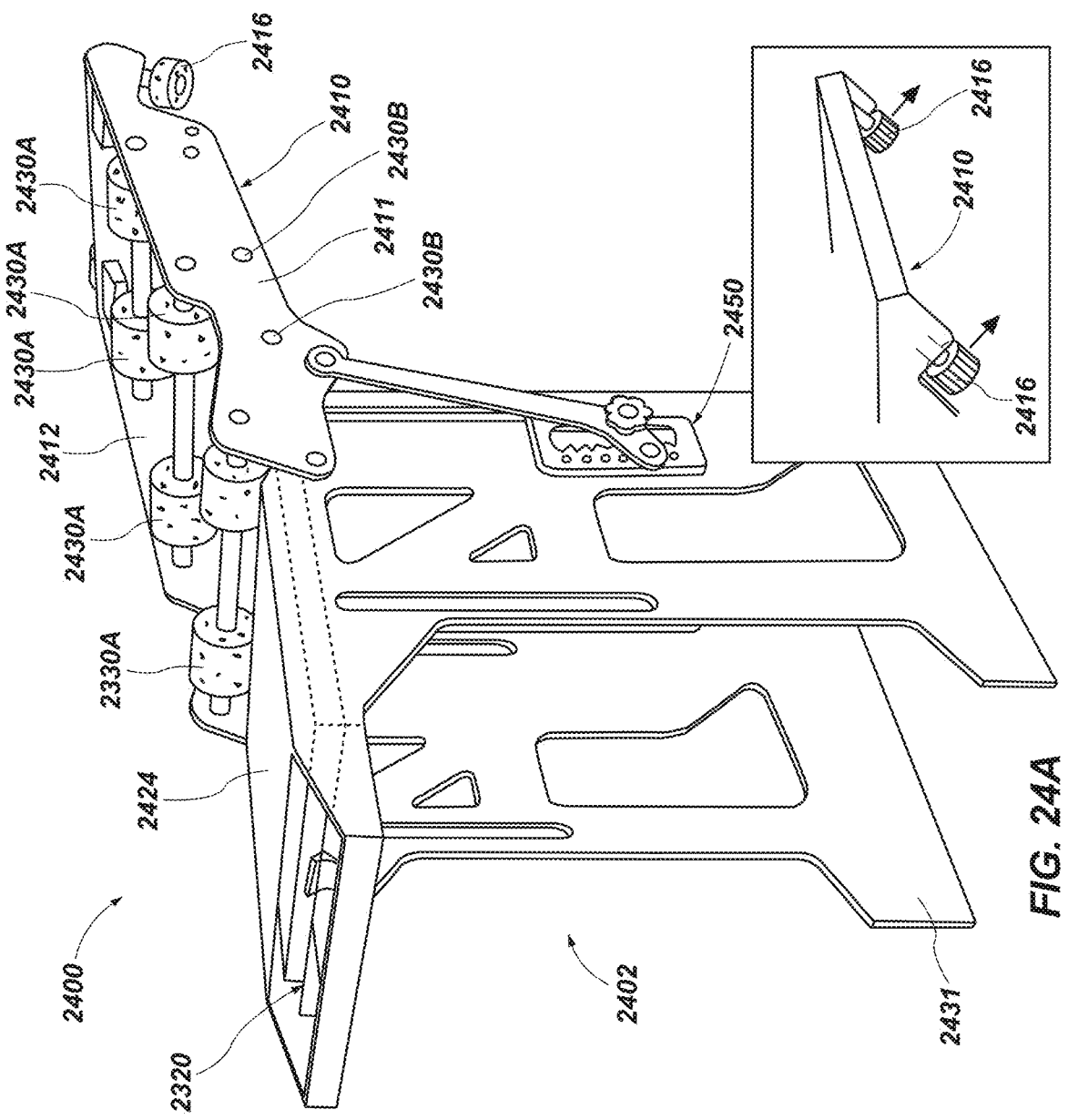
FIG. 24A illustrates an isometric view of a solar panel dispensing device in accordance with an example of the present disclosure.
Figures 24B, 24C, 24D:
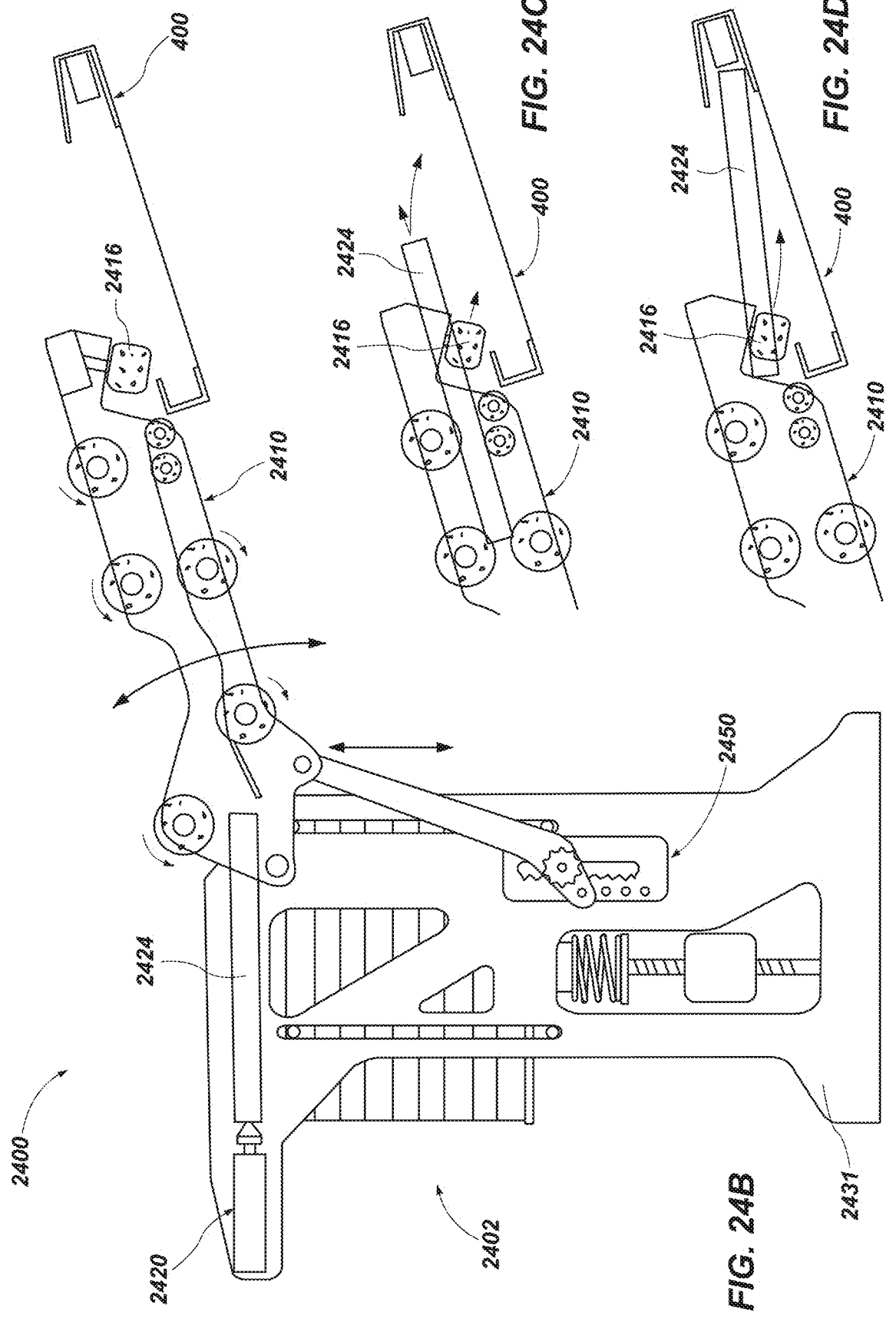
FIGS. 24B-24D illustrate side views of the solar panel dispensing device of FIG. 24A in operation in accordance with an example of the present disclosure.

Another exemplary solar panel dispensing device 2400 is illustrated in FIGS. 24A and 24B. As shown in FIG. 24A, the solar panel dispensing device 2400 can comprise a hopper 2402, a guide arm 2410 comprising a plurality of rollers 2430A and 2430B supported by a first arm 2411 and a second arm 2412 and acting as support surfaces of the guide arm, a base 2431, a panel actuator 2420, and a guide arm angle adjustment device 2450. It will be appreciated from FIG. 24A that many of the features of solar panel dispensing device 2400 are similar to features of the solar panel dispensing device 2300. To avoid redundant recitations, not all features of the solar panel dispensing device 2400 will be described in detail. Nevertheless, it will be appreciated that features that are not discussed can have similar form and function to similar features found in the solar panel dispensing device 2400.

As shown in the drawings, the solar panel dispensing device 2400 can include a guide arm 2410 positioned adjacent to the hopper 2402 and configured to guide the solar panels 2424 from the hopper 2402 to an installation position and/or installed position relative to a solar panel mount. In the configuration illustrated in FIGS. 24A-24D, the guide arm 2410 can comprise a first arm 2411 and a second arm 2412 extending away from the hopper 2402 parallel to each other. The first arm 2411 and the second arm 2412 can together support a plurality of rollers 2430 between the arms that are operable to rotate and drive the solar panel 2424 from the hopper 2402 to an installation position. The rollers 2430 can include upper rollers 2430A configured to interface with an upper surface of the solar panels being dispensed through the guide arm 2410. The rollers can further include lower rollers 2430B configured to support and interface with a lower surface of the solar panels being dispensed through the guide arm 2410. One or more of the rollers can be driven by a motor to provide a driving force to drive the solar panel to the end and out of the guide arm 2410. The guide arm 2410 can omit the directing arm disclosed in other examples herein. The guide arm 2410 can instead include one or more end rollers 2416 disposed at an exit end of the guide arm 2410. As illustrated in FIG. 24A, the end rollers 2416 can be angled downward with respect to the guide arm 2410. As such, the end rollers 2416 can direct the solar panel 2424 downward into a solar panel mount. Therefore, the directing arm and roller can be omitted and the solar panel 2424 still be directed into the solar panel mount 400 at a proper installation angle or installation position that causes the solar panel 2424 to be inserted into the solar panel mount 400.

The solar panel dispensing device 2400 and guide arm 2410 can be aligned with the mount 400 by a user by manual manipulation and positioning performed by the user or motorized movement of the solar panel dispensing device 2400 controlled by the user and aided by either eyesight or cameras mounted on the dispensing solar panel dispensing device 2400 providing video to the user on a display. Aligning the solar panel dispensing device 2400 with the mount 400 can also be carried out by automated means, such as automated movement of the solar panel dispensing device 2400 using sensors or cameras mounted on the solar panel dispensing device 2400 to align with specified features or sensor tags, magnets, proximity sensors, or other sensors disposed on the mount 400. Aligning the solar panel dispensing device 2400 with the mount 400 may further be carried out by moving the solar panel dispensing device 2400 such that mechanical or structural features of the solar panel dispensing device 2400 mate with corresponding guide features disposed on the mount 400.

As illustrated in FIG. 24B, the solar panel 2424 can be loaded in the hopper 2402 of the solar panel dispensing device 2400. The panel actuator 2420 can actuate to push the solar panel 2424 out of the hopper 2402 and into the guide arm 2410. Additionally or alternatively, the panel actuator 2420 can include one or more powered rollers 2425 supported about the guide arm 2410, each of the powered rollers 2425 being configured to contact a lead solar panel of the plurality of solar panels 2424 at a contact interface 2426 and to drive the solar panel 2424 out of the exit of the hopper 2402, as shown in FIGS. 24A and 24B. It will be appreciated that the powered rollers (e.g., rollers 2425) can be implemented as an actuator in any of the dispensing devices described herein, either in addition to or in place of the other panel actuators described herein in each example.

The rollers 2430 of the guide arm 2410 can drive the solar panel 2424 to the end of the guide arm 2410. At the end of the guide arm 2410, as illustrated in FIG. 24C, the alignment roller 2416 can engage with a side of the solar panel 2424. Being angled downward toward the solar panel mount 400, the alignment rollers 2416 can provide a driving force on the solar panel 2424 downward toward the solar panel mount 400 relative to the guide arm 2410, thereby orienting and/or aligning the solar panel 2424 at an installation angle necessary to enter a first support structure of the solar panel mount 400. FIG. 24D show that the alignment roller 2416 can continue to drive the solar panel 2424 into the first support structure of the solar panel mount 400 until the solar panel 2424 falls into place against the panel rest and between the first and second support structures of the solar panel mount 400 in a final installed position.

A method for installing solar panels into a solar panel mount using a solar panel dispensing device is discussed below. FIG. 25 illustrates a method 2500 of installing a solar panel into a solar panel mount using a solar panel dispensing device. The method can comprise a step 2502 of supporting a plurality of solar panels in a hopper of the solar panel dispensing device, the hopper comprising a frame defining an interior volume and exit.

The method 2500 can further comprise a step 2504 of aligning a guide arm with the solar panel mount, and in a position to facilitate dispensing of a lead solar panel into the solar panel mount from an installation position of the lead solar panel. Aligning the guide arm with the solar panel mount can include placing the guide arm relative to the solar panel mount such that a solar panel exiting the guide arm exits at an installation angle used to mate the solar panel with the solar panel mount. Aligning the guide arm can further include aligning the guide arm such that the solar panel exits the guide arm at a position adequate to allow the solar panel to be inserted into a first support structure of the solar panel mount at a distance sufficient to allow the solar panel to clear the second support structure of the solar panel mount and to rest against a panel rest of the solar panel mount.

The method 2500 can further comprise a step 2506 of actuating an actuator to displace a lead solar panel of the plurality of contained solar panels out of the hopper via the exit and into the guide arm. The method 2500 can further comprise a step 2508 of driving the first solar panel from the exit of the hopper and along the guide arm to guide the first solar panel to the installation position. The method 2500 can further include a step 2510 of driving the first solar panel out of the guide arm to the installation position.

The method 2500 can further comprise a step of aligning the guide arm with a second solar panel mount for a second solar panel. The method 2500 can further comprise a step of driving the actuator to move the second solar panel of the plurality of solar panels out of the hopper through the exit. The method 2500 can further comprise a step of driving the second solar panel from the exit of the hopper and along the guide arm to guide the second solar panel to the second solar panel mount. The method 2500 can further comprise a step of driving the second solar panel out of the exit of the guide arm to the second solar panel mount.

In the method 2500, the step 2504 of aligning the guide arm can include aligning an exit of the guide arm where the first solar panel exits the guide arm with the solar panel mount for the first solar panel and angling the guide arm at an angle substantially corresponding to an installation angle (i.e., within +/−10 degrees) for the first solar panel of the plurality of solar panels at which installation angle the first solar panel mates with a first solar panel mount in which the first solar panel is to be installed. The step of aligning the guide arm with the second solar panel mount can include aligning the guide arm can include aligning an exit of the guide arm where the second solar panel exits the guide arm with the second solar panel mount for the second solar panel and angling the guide arm at an angle substantially corresponding to (i.e., within +/−10 degrees) an installation angle for the second solar panel of the plurality of solar panels at which installation angle the second solar panel mates with a second solar panel mount in which the second solar panel is to be installed.

A method for installing solar panels into a solar panel mount using a solar panel dispensing device is discussed below. FIG. 26 illustrates a method 2600 of installing a solar panel into a solar panel mount using a solar panel dispensing device. The method can comprise a step 2602 supporting a plurality of solar panels in a hopper of the solar panel dispensing device, the hopper comprising a frame defining an interior volume and an exit.

The method can comprise a step 2604 of aligning a first exit of a guide arm of the solar panel dispensing device with a first solar panel mount in a position to facilitate dispensing of a lead solar panel into the first solar panel mount from a first installation position of the lead solar panel. The method can comprise a step 2606 of aligning a second exit of a guide arm of the solar panel dispensing device with a second solar panel mount in a position to facilitate dispensing of a lead solar panel into the second solar panel mount from a second installation position of the lead solar panel. In steps 2604 and 2606, aligning the guide arm with the solar panel mount can include placing the guide arm relative to the solar panel mount such that a solar panel exiting the guide arm exits at an installation angle used to mate the solar panel with the solar panel mount. Aligning the guide arm can further include aligning the guide arm such that the solar panel exits the guide arm at a position adequate to allow the solar panel to be inserted into a first support structure of the solar panel mount at a distance sufficient to allow the solar panel to clear the second support structure of the solar panel mount and to rest against a panel rest of the solar panel mount.

The method 2600 can further comprise a step 2608 of actuating an actuator to displace the lead solar panel of the plurality of solar panels out of the hopper via the exit and into the guide arm. The method 2600 can further comprise a step 2610 of driving the lead solar panel from the exit of the hopper and along the guide arm to guide the lead solar panel to one of a first exit corresponding to the first solar panel mount or a second exit corresponding to the second solar panel mount. The method 2600 can further include a step 2612 of driving the lead solar panel out of the first exit or the second exit of the guide arm to either the first installation position or the second installation position.

In the method 2600, the steps 2604 and 2606 of aligning the first exit of the guide arm can include aligning where the first solar panel exits the guide arm with the first solar panel mount for the first solar panel and angling the guide arm at an angle substantially corresponding to (i.e., within +/−10 degrees of) an installation angle for the first solar panel of the plurality of solar panels at which installation angle the first solar panel mates with a first solar panel mount in which the first solar panel is to be installed. The step of aligning the guide arm with the second solar panel mount can include aligning an exit of the guide arm where the solar panel exits the guide arm with the second solar panel mount and angling the guide arm at an angle substantially corresponding to (i.e., within +/−10 degrees of) an installation angle for the solar panel of the plurality of solar panels at which installation angle the solar panel mates with a second solar panel mount.

Figures 27A, 27B:
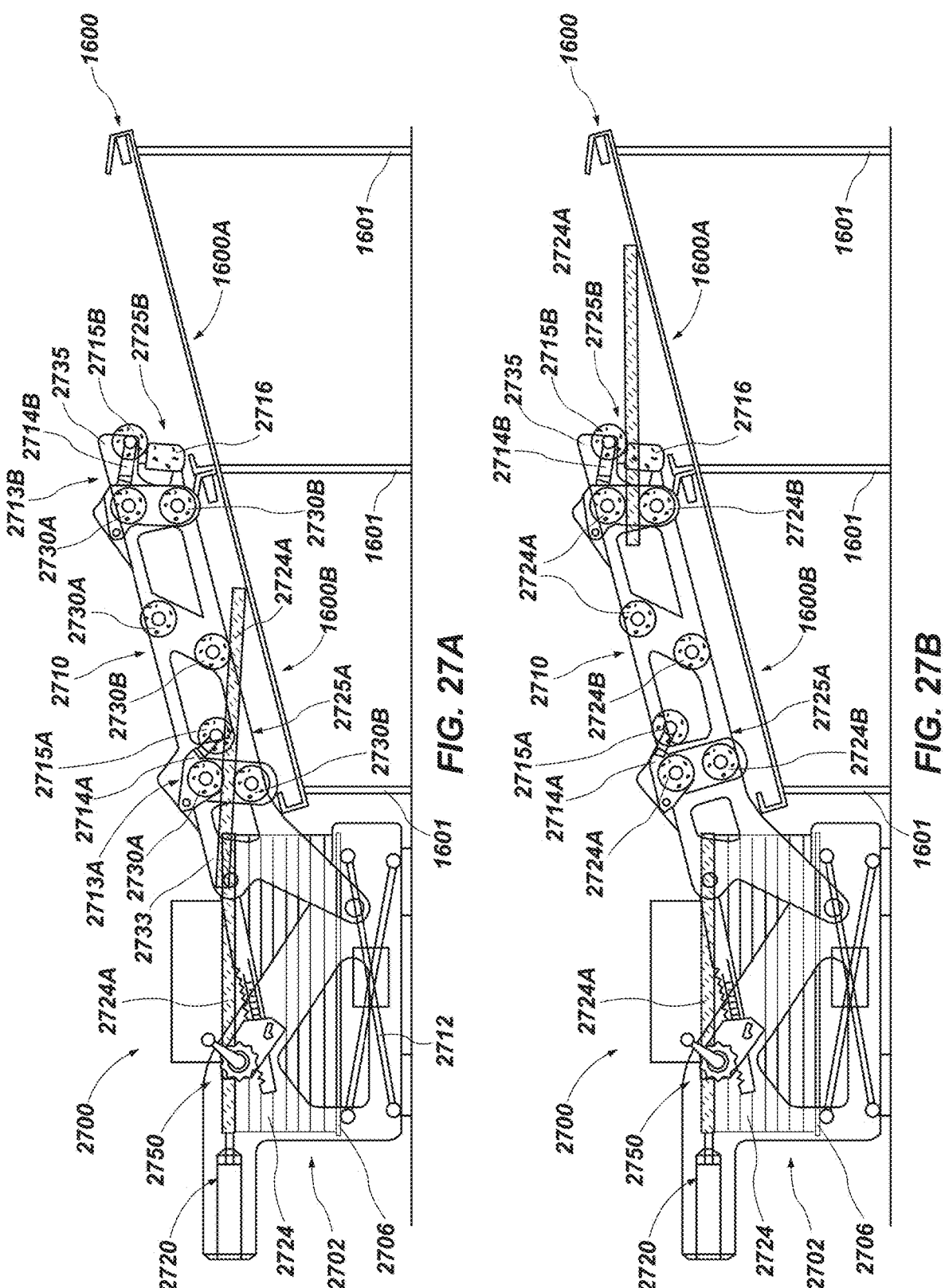
FIGS. 27A and 27B illustrate side views of a solar panel dispensing device in accordance with an example of the present disclosure installing panels into a solar panel support array.

Another exemplary solar panel dispensing device 2700 is illustrated in FIGS. 27A and 27B in which the solar panel dispensing device 2700 is positioned relative to an array frame system, such as the array frame system 1600 of FIG. 16, part of which is shown here, to dispense solar panels into the solar panel mounts. As shown in FIG. 27A, the solar panel dispensing device 2700 can comprise a hopper 2702 configured to support the plurality of solar panels 2724 therein on a hopper base 2706, a guide arm 2710 comprising a plurality of rollers 2730A and 2730B supported by an arm 2711, a panel actuator 2720, and a guide arm angle adjustment device 2750. It will be appreciated from FIG. 27A that many of the features of solar panel dispensing device 2700 are similar to features of the solar panel dispensing device 2300. To avoid redundant recitations, not all features of the solar panel dispensing device 2700 will be described in detail. Nevertheless, it will be appreciated that features that are not discussed can have similar form and function to similar features found in the solar panel dispensing device 2300.

The guide arm 2710 of the solar panel dispensing device 2700 can be configured to include a plurality of exits for solar panels in order to facilitate installing solar panels in a plurality of solar panel mounts of an array frame system (e.g., array frame system 1600). For example, the guide arm 2710 can include a first solar panel exit 2725A defined between lower rollers 2730B of the guide arm 2710. The first solar panel exit 2725A can be configured to allow a lead solar panel 2724A of the plurality of solar panels 2724 to exit the guide arm 2710, the first solar panel exit being disposed between a proximal end 2733 of the guide arm 2710 and a distal end 2735 of the guide arm 2710. As illustrated in FIG. 27A, the lead solar panel 2724A can be dispensed out of the first solar panel exit 2725A into a solar panel mount 1600B. A directing actuator 2713A supported on the guide arm 2710 at a position proximate the first solar panel exit 2725A. The directing actuator 2713A can comprise a directing arm 2714A and a directing roller 2715A coupled to an end of the directing arm 2714A. The directing actuator 2713A (e.g, the directing arm 2714A and the directing roller 2715A) can be actuated to direct the lead solar panel 2724A out of the guide arm 2710 via the first solar panel exit 2725A. For example, the directing arm 2714A can be powered and actuated downward within the guide arm 2710 to apply a force to direct the lead solar panel 2724A out of the first solar panel exit 2725A and into an installation position relative to the solar panel mount 1600B.

As illustrated in FIG. 27A, the directing arm 2714A can direct the lead solar panel 2724A into the solar panel mount 1600B at an installation angle and into an installation position properly aligned to allow the lead solar panel 2724A to be inserted into the solar panel mount 1600B. The solar panel dispensing device 2700 and guide arm 2710 can be aligned with the mount 1600 by a user by manual manipulation and positioning performed by the user or motorized movement of the solar panel dispensing device 2700 controlled by the user and aided by either eyesight or cameras mounted on the dispensing solar panel dispensing device 2700 providing video to the user on a display. Aligning the solar panel dispensing device 2700 with the mount 1600 can also be carried out by automated means, such as automated movement of the solar panel dispensing device 2700 using sensors or cameras mounted on the solar panel dispensing device 2700 to align with specified features or sensor tags, magnets, proximity sensors, or other sensors disposed on the mount 1600. Aligning the solar panel dispensing device 2700 with the mount 1600 may further be carried out by moving the solar panel dispensing device 2700 such that mechanical or structural features of the solar panel dispensing device 2700 mate with corresponding guide features disposed on the mount 1600. The aligning carried out by any of the methods described in this paragraph can be carried out to specifically align the first solar panel exit 2725A with solar panel mount 1600B and to align the second solar panel exit 2725B with solar panel mount 1600A.

The guide arm 2710 can further include a second solar panel exit 2725B defined at a distal end 2735 of the guide arm 2710. The second solar panel exit 2725B can be configured to allow a lead solar panel 2724A of the plurality of solar panels 2724 to exit the guide arm 2710. As illustrated in FIG. 27B, the lead solar panel 2724A can be dispensed out of the second solar panel exit 2725B into a solar panel mount 1600A on a different row of the array frame system. A directing actuator 2714B can be supported on the guide arm 2710 at a position proximate the second solar panel exit 2725B. The directing actuator 2713B can include a directing arm 2714B and a directing roller 2715B disposed at an end of the directing arm 2714B. The directing actuator 2713B (e.g., directing arm 2714B and the directing roller 2715B) can be used to direct the lead solar panel 2724A out of the guide arm 2710 via the second solar panel exit 2725B. For example, the directing arm 2714B can be powered and actuated downward within the guide arm to apply a force to direct the lead solar panel 2724B out of the second solar panel exit 2725B and into an installation position relative to the solar panel mount 1600A. As illustrated in FIG. 27A, the directing arm 2714B can actuate to direct the lead solar panel 2724A into the solar panel mount 1600A at an installation angle and into an installation position properly aligned to allow the lead solar panel 2724A to be inserted into the solar panel mount 1600A.

The solar panel dispensing device 2700 can further include a scissor lift 2712 to act as a hopper actuator that lifts solar panels upward as solar panels are successively dispensed from the hopper 2702. Additionally, the scissor lift 2712 can be lowered to accommodate additional panels being loaded into the device 2700.

When comparing FIGS. 27A and 27B, it is seen in FIG. 27A that the directing arm 2714A is disposed in a first position at which the first directing arm 2714A is configured to apply a force to the solar panel 2724A to guide the solar panel 2724A out of the first solar panel exit 2725A of the guide arm 2710. As shown in FIG. 27B, the first directing arm 2714A is also actuatable to a second position at which the solar panel 2724A is allowed to pass the first directing arm 2714A in the guide arm 2710 and proceed toward the second solar panel exit 2725B. Similarly, the directing arm 2714B is also actuatable between two or more positions depending on how the solar panel is intended to be dispensed from an end of the guide arm 2710.

Figure 28:
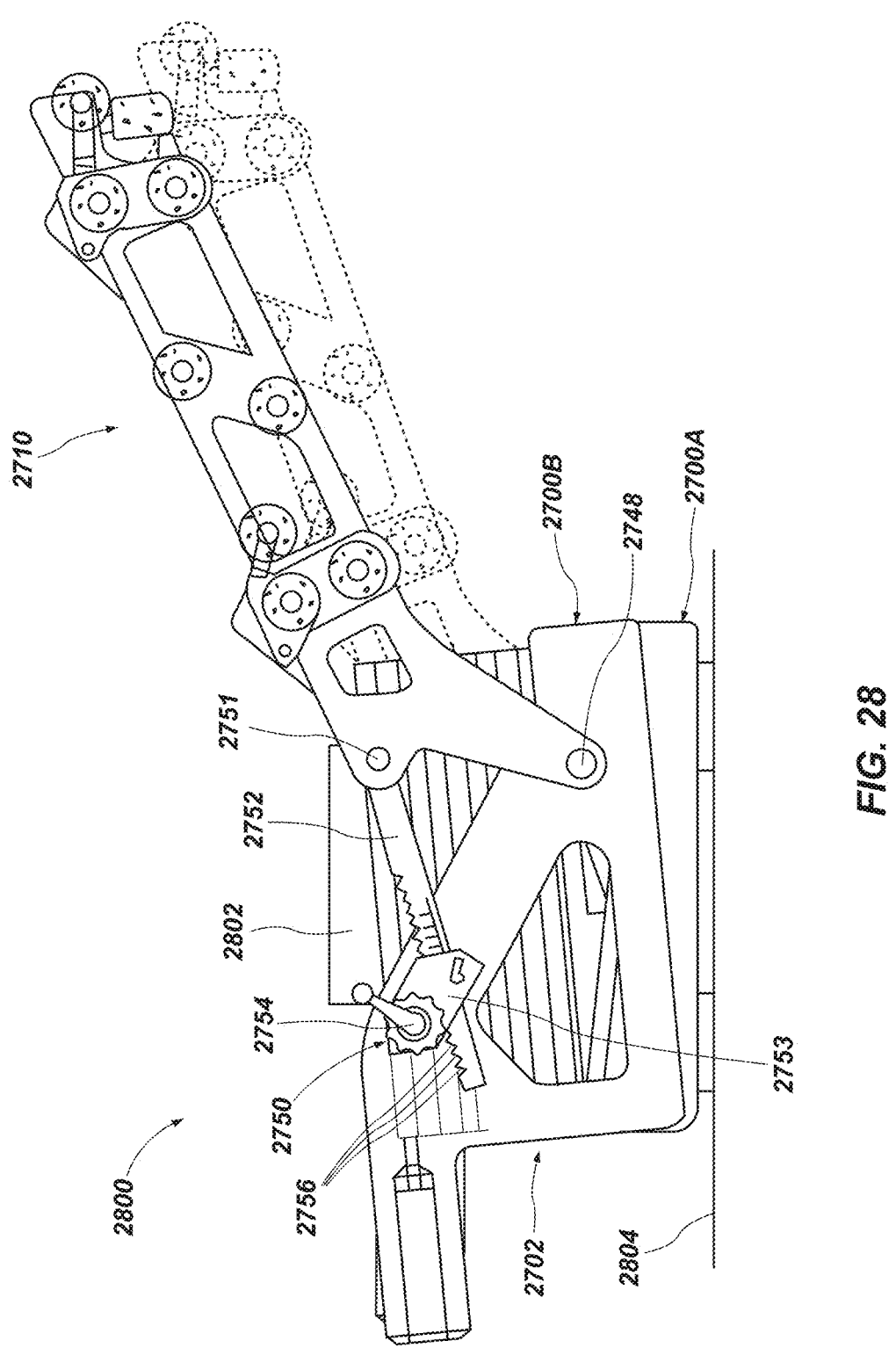
FIG. 28 illustrates a side view of a solar panel dispensing device in accordance with an example of the present disclosure.

FIG. 28 illustrates a solar panel dispensing device 2700 as part of a solar panel dispensing system 2800. As shown, the solar panel dispensing device 2700 can be supported on a platform 2802 configured to support the dispensing device 2700 about a surface 2804. The angle of the guide arm 2710 can be adjusted in a plurality of ways. The solar panel dispensing device 2700 can be supported on the platform 2802 in a tilt-able manner wherein a surface or support of the platform 2802 that supports the solar panel dispensing device 2700 is tilt-able. Accordingly, the solar panel dispensing device 2700 can be tilted by operation of the platform 2802 between a plurality of positions including a first position 2700A and a tilted second position 2700B, thereby adjusting an angle of the hopper 2702 and/or the guide arm 2710 of the dispensing device 2700.

The angle of the guide arm 2710 can further be adjusted by operation of an angle adjustment mechanism 2750. To facilitate the adjustment of the angle of the guide arm 2710 relative to the hopper 2702, the guide arm 2710 can be pivotally coupled to the hopper 2702 at a pivot point 2748. The angle adjustment mechanism 2750 can be coupled, pivotally or fixedly, to the guide arm 2710 at a point 2751. The angle adjustment mechanism 2750 can include a linkage 2752 having a first end that is coupled to the guide arm 2710 at the point 2751 and a second end that is coupled to the hopper 2702 via an adjustment bracket 2753 disposed on the hopper 2702. The adjustment bracket 2753 can include a wheel 2754. The wheel 2754 can be configured to engage with one or more of a plurality of notches 2756 formed on the linkage 2752. Each notch 2756 can correspond to an adjustment angle of the guide arm 2710. The lock 2754 can be configured to mate with the notches 2756 to set the guide arm 2710 at a desired adjustment (e.g., upward angle, downward angle, or horizontal) corresponding to the notch mated with the wheel 2754. Adjustment of the guide arm 2710 at such desired angles can facilitate installation of solar panels into mounts and at angles that are oriented in directions that are any of upward (e.g., greater than 0 degrees), downward (e.g., less than 0 degrees), or horizontally (e.g., at 0 degrees), relative to a horizontal plane or the dispensing device.

Figures 29A, 29B, 29C:
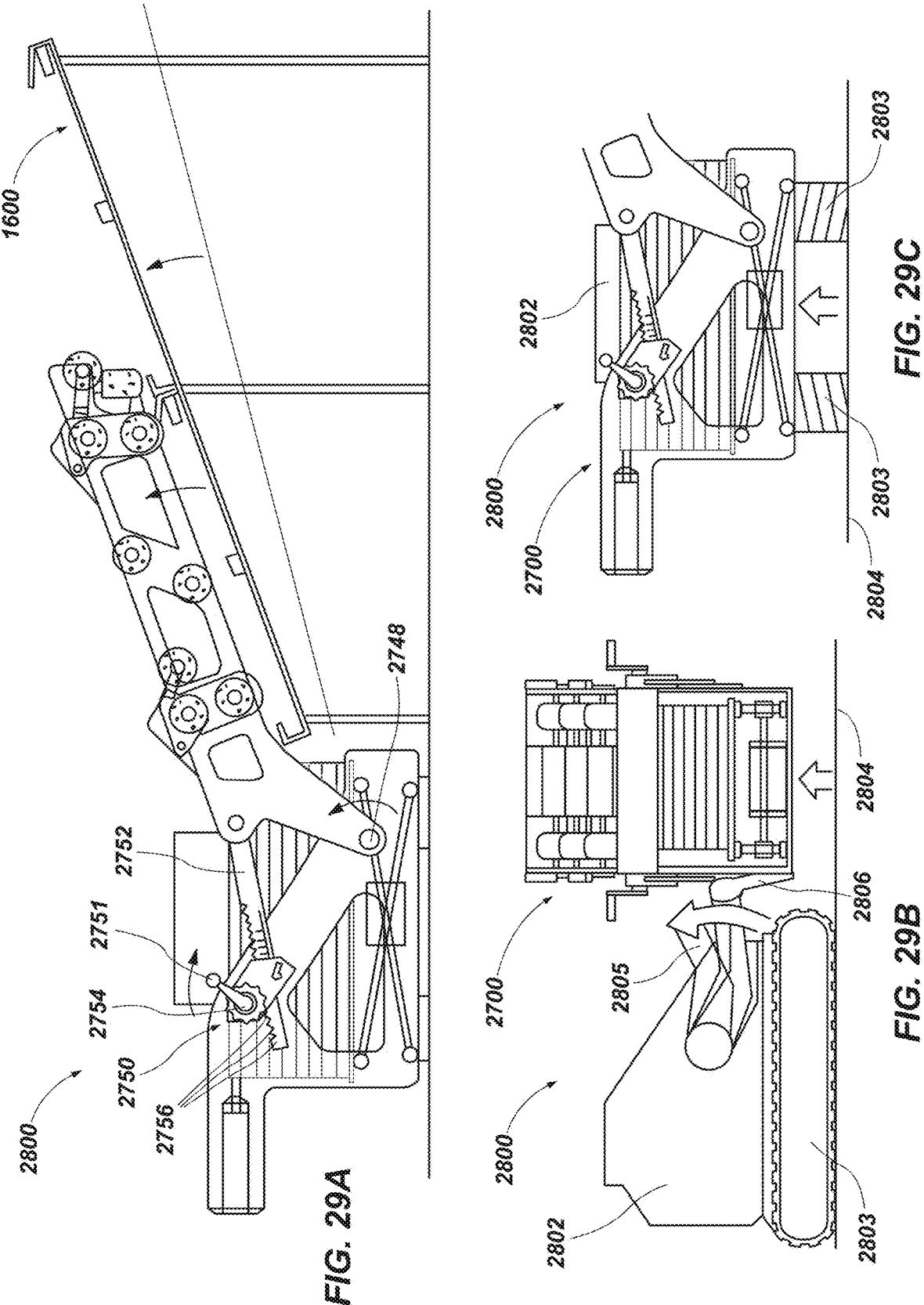
FIGS. 29A-29C illustrate views of a solar panel dispensing device according to an example of the present disclosure and a ground vehicle carrying the solar panel dispensing device.

FIG. 29A illustrates further details of the operation of the angle adjustment mechanism 2750. For example, the wheel 2754 can be a gear comprising a plurality of teeth configured to engage with the notches 2756. The wheel is operable to be rotated by a crank 2757. As the crank 2757 is rotated, teeth of the wheel 2754 engage with the notches 2756 of the linkage 2752 to extend or retract the linkage 2752 relative to the adjustment bracket 2753. Thereby the guide arm 2710 can be raised or lowered to pivot about a pivot point 2748 to achieve a desired angle of the guide arm 2710 relative to the array frame system 1600. In such a manner, the angle adjustment mechanism 2750 can be operated to adjust the angle of the guide arm relative to the hopper 2702 to meet a desired angle at which a solar panel is to be installed into a solar panel mount. Therefore, easy adjustment of the guide arm 2710 can be completed quickly to ensure proper alignment of the guide arm 2710 relative to a solar panel mount and to facilitate quick-install of a solar panel into the solar panel mount.

As illustrated in FIGS. 29B and 29C, the platform 2802 of the system 2800 can be a mobile platform 2802 configured to move and maneuver about an environment or a surface 2804. The mobile platform 2802 can be configured to carry and support any of the solar panel dispensing devices described herein. In one example, the solar panel dispensing devices can be supported on a moveable support 2806 supported on a lift arm 2805. The lift arm can be operable to adjust a position of the solar panel dispensing device 2700 by raising or lowering the solar panel dispensing device 2700. The moveable support 2806 can additionally or alternatively be tilted as shown in FIG. 28 to tilt the solar panel dispensing device 2700 and adjust an angle of the hopper, guide arm, and/or the solar panel dispensing device 2700 as a whole. In another example, the solar panel dispensing device 2700 can be mounted to a mobile platform 2800. In each case, the solar panel dispensing device 2700 and the mobile platform 2800 can interface with one another, and can each comprise various interfacing members and/or components that facilitate the carrying or mounting of the solar panel dispensing device 2700 to the mobile platform 2800. The mobile platform 2802 can be an unmanned or a manned mobile platform that is either automated or controlled by a user, or both. The moveable support 2806 can be configured to adjust one or more of a height of the solar panel dispensing device 2700 relative to the mobile platform 2802, a distance of the solar panel dispensing device 2700 from the mobile platform 2802, and an angle of the solar panel dispensing device 2700 relative to the mobile platform 2802.

In operation, the mobile platform 2802 can be configured to traverse a ground surface adjacent a solar panel array frame system (e.g., the solar panel array frame system of FIG. 16) to locate the solar panel dispensing device operable therewith in one or more proper positions to facilitate installation of one or more solar panels into one or more solar panel mounts of the solar panel array frame system, as taught herein.

As illustrated in several figures herein, installation of the solar panels has been illustrated in which the panel is installed at an inclined angle (see FIGS. 3A-3E, 6A-6E, 10A-11D, 16, 20, 21C, 23B, 23C, 24B-24D, 27A, 27B, and 29A). However, any of the guide arms and solar panel dispensing devices described herein can be configured, by forming or angling the guide arms at different angles, to install solar panels at any desired angle. For example, the guide arms of each solar panel dispensing device can be formed or adjusted to be angled upward (e.g., greater than 0 degrees), downward (e.g., less than 0 degrees), or horizontal (e.g., at 0 degrees), to facilitate installation of solar panels at positions and in mounts that are oriented in any of upward, downward, or horizontal directions or angles. As one example, guide arm 2110 can be adjusted using holes 2150 to be angled any of upward (e.g., greater than 0 degrees), downward (e.g., less than 0 degrees), or horizontal (e.g., at 0 degrees).

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein can be combined with other embodiments or features described herein, this disclosure should be read to describe any such combinations that would be practicable by one of ordinary skill in the art. The use of "or" in this disclosure should be understood to mean non-exclusive or, e.g., "and/or," unless otherwise indicated herein.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A solar panel dispensing device, comprising:

a hopper comprising a frame defining an interior volume and an exit, the hopper being configured to contain one or more solar panels therein;

a guide arm comprising a support surface configured to receive a lead solar panel, the support surface being mounted on the hopper at a position at the exit of the hopper, such that the guide arm is in direct contact with the frame of the hopper, the guide arm extending away from the exit at a position to guide the lead solar panel from the hopper to an installation position; and an actuator comprising a contact interface operable to interface with and displace the lead solar panel of the plurality of contained solar panels through the exit, and to present the lead solar panel onto the support surface of the guide arm.

2. The solar panel dispensing device of claim 1, wherein the hopper comprises a panel base disposed within the interior volume to support the plurality of solar panels.

3. The solar panel dispensing device of claim 2, wherein the panel base is substantially parallel to a base of the solar panel dispensing device to support the plurality of solar panels at an orientation substantially parallel to the base of the solar panel dispensing device.

4. The solar panel dispensing device of claim 3, wherein the plurality of solar panels exit the hopper at an angle substantially the same as the angle of the panel base relative to the base of the solar panel dispensing device.

5. The solar panel dispensing device of claim 2, wherein the panel base is angled with respect to a base of the solar panel dispensing device to support the plurality of solar panels at an orientation that is angled with respect to the base of the solar panel dispensing device.

6. The solar panel dispensing device of claim 5, wherein the plurality of solar panels exit the hopper at an angle different from the angle of the panel base relative to the base of the solar panel dispensing device.

7. The solar panel dispensing device of claim 2, wherein an angle of the panel base is adjustable relative to a base of the solar panel dispensing device to a plurality of different angles.

8. The solar panel dispensing device of claim 2, wherein the panel base comprises:

a support surface;

a pivoting end rotatably coupling the panel base to the hopper; and an adjustable end that is operable to rotate about the pivoting end.

9. The solar panel dispensing device of claim 8, wherein the adjustable end of the panel base is securable at a plurality of positions to position the panel base at a desired angle of the plurality of different angles.

10. The solar panel dispensing device of claim 8, wherein the adjustable end of the panel base is manually adjustable by a user.

11. The solar panel dispensing device of claim 8, further comprising:

a height adjustment actuator engaged with an adjustable end of the panel base and operable to actuate between an extended position and a retracted position to adjust the angle of the panel base.

12. The solar panel dispensing device of claim 11, wherein the height adjustment actuator is one or more of a hydraulic actuator, electric actuator, motorized actuator, and mechanical actuator.

13. The solar panel dispensing device of claim 1, further comprising a hopper actuator operably coupled to the panel base and operable to move the plurality of solar panels in a direction toward the exit of the hopper as each the plurality of solar panels are successively dispensed from the hopper.

14. The solar panel dispensing device of claim 13, wherein the hopper comprises a panel base disposed within the interior volume to support the plurality of solar panels and wherein the hopper actuator is operable to move the plurality of solar panels within the hopper by moving the panel base supporting the plurality of solar panels within the hopper.

15. The solar panel dispensing device of claim 1, wherein the actuator comprises a robotic arm, the robotic arm comprising:

a first end supported at a position proximate to the hopper; and a second end moveable about the hopper and comprising an end effector, the end effector being operable to interface with a lead solar panel of the plurality of solar panels to facilitate displacement of the lead solar panel through the exit, presentation of the lead solar panel to the guide arm, and movement of the lead solar panel through the guide arm to the installation position, the end effector being operable to release the solar panel at the installation position.

16. The solar panel dispensing device of claim 15, wherein the end effector of the actuator comprises one or more of a vacuum gripper, a suction cup gripper, and an end effector.

17. The solar panel dispensing device of claim 1, wherein the actuator comprises one or more rollers supported about at least one of the hopper and the guide arm and positioned to contact a solar panel of the plurality of solar panels and to drive the solar panel out of the exit of the hopper.

18. The solar panel dispensing device of claim 1, wherein the actuator comprises a rotating arm positioned about the hopper and driveable to displace a solar panel of the plurality of solar panels out of the exit.

19. The solar panel dispensing device of claim 1, wherein the guide arm positioned adjacent to the exit of the hopper comprises one or more support members extending away from the exit and oriented to guide the lead solar panel to the installation position.

20. The solar panel dispensing device of claim 19, wherein the lead solar panel is dispensed from the guide arm in the installation position at an installation angle that facilitates insertion of the lead solar panel into a solar panel mount in which the lead solar panel is to be installed.

21. The solar panel dispensing device of claim 19, wherein the guide arm is oriented at an angle with respect to the hopper and the angle of the guide arm with respect to the hopper is adjustable to a plurality of different angles.

22. The solar panel dispensing device of claim 19, further comprising a base movably coupled to one or more of the hopper and the guide arm wherein an angle of the hopper and the guide arm is adjustable relative to the base of the solar panel dispensing device.

23. The solar panel dispensing device of claim 19, wherein the guide arm comprises one or more rollers wherein the one or more rollers are powered rollers positioned along the guide arm and operable to move the plurality of solar panels along the guide arm and out of an exit of the guide arm into the installation position.

24. The solar panel dispensing device of claim 23, wherein one or more of the rollers of the guide arm is operable as the actuator that interfaces with and displaces a solar panel out of the exit of the hopper.

25. The solar panel dispensing device of claim 23, wherein the one or more rollers are positioned on the support members to contact one or more edges of a solar panel of the plurality of solar panels as the solar panel is moved through the guide arm.

26. The solar panel dispensing device of claim 1, the guide arm comprising at least:

a first solar panel exit disposed between a proximal end of the guide arm and a distal end of the guide arm; and a second solar panel exit disposed between the first solar panel exit and the distal end of the guide arm.

27. The solar panel dispensing device of claim 26, wherein the guide arm comprises a first directing actuator comprising a first directing actuator operable to apply a force to the solar panel in the guide arm to direct the solar panel out of the first solar panel exit of the guide arm at an angle oriented with the installation position.

28. The solar panel dispensing device of claim 26, wherein the first directing actuator is actuatable between a first position at which the first directing actuator is configured to guide the solar panel out of the first solar panel exit of the guide arm and a second position at which the solar panel is allowed to pass the first directing actuator in the guide arm and proceed toward the second solar panel exit.

29. The solar panel dispensing device of claim 26, wherein the guide arm comprises a second directing actuator operable to apply a force to the solar panel in the guide arm to direct the solar panel out of the second solar panel exit of the guide arm at an installation angle corresponding to the installation position.

30. The solar panel dispensing device of claim 26, wherein the second guide member and the second solar panel exit are disposed at the distal end of the guide arm.

31. The solar panel dispensing device of claim 26, wherein the guide arm comprises one or more rollers wherein the one or more rollers are powered rollers operable to move the plurality of solar panels along the guide arm and out of the guide arm into the installation position.

32. The solar panel dispensing device of claim 31, wherein the guide arm comprises one or more alignment rollers disposed at a distal end of the guide arm and positioned to align solar panels exiting the guide arm with an installation angle corresponding with the installation position.

33. The solar panel dispensing device of claim 31, wherein the hopper comprises a plurality of support spacers supported at desired positions spaced apart from each other within the hopper and extending into the interior volume defined by the frame;
    wherein the support spacers are spaced apart from each other on the frame at levels defined by the support spacers and separated by distances greater than a height of a solar panel to provide space for a solar panel to be supported on the support spacers at each of the defined levels.

34. A solar panel dispensing system, comprising:
    a mobile platform operable to move and maneuver about an environment; and
    a solar panel dispensing device supported by the mobile platform, the solar panel dispensing device comprising:
        a hopper comprising a frame defining an interior volume and an exit, the hopper being configured to contain one or more solar panels therein;
        a guide arm mounted to the hopper and comprising a support surface configured to receive a lead solar panel, the support surface being supported by the hopper at a position at the exit of the hopper, such that the guide arm is in direct contact with the frame of the hopper, the guide arm extending away from the exit at a position to guide a lead solar panel from the hopper to an installation position; and
        an actuator comprising a contact interface operable to interface with and displace the lead solar panel of the plurality of contained solar panels through the exit, and to present the lead solar panel to the guide arm.

35. The solar panel dispensing system of claim 34, wherein the mobile platform is a manned ground vehicle.

36. The solar panel dispensing system of claim 34, wherein the mobile platform is an unmanned ground vehicle.

37. The solar panel dispensing system of claim 34, wherein the mobile platform comprises a moveable support in support of the solar panel dispensing device and operable adjust a position of the solar panel dispensing device relative to the mobile platform.

38. The solar panel dispensing system of claim 34, wherein the moveable support is operable to adjust one or more of a height of the solar panel dispensing device relative to the mobile platform, a distance of the solar panel dispensing device from the mobile platform, and an angle of the solar panel dispensing device relative to the mobile platform.

39. A method for installing solar panels into a solar panel mount using a solar panel dispensing device, the method comprising:
    supporting a plurality of solar panels in a hopper of the solar panel dispensing device, the hopper comprising a frame defining an interior volume and an exit;
    aligning a guide arm mounted to the hopper at the exit of the hopper with the solar panel mount in a position to facilitate dispensing of a lead solar panel into the solar panel mount from an installation position of the lead solar panel;
    actuating an actuator to displace a lead solar panel of the plurality of contained solar panels out of the hopper via the exit and onto a support surface of the guide arm;
    driving the first solar panel from the exit of the hopper and along the guide arm to guide the first solar panel to the installation position; and
    driving the first solar panel out of the guide arm to the installation position.

40. The method of claim 39, wherein aligning the guide arm comprises:
    aligning an exit of the guide arm where the first solar panel exits the guide arm with the solar panel mount for the first solar panel; and
    angling the guide arm at an angle substantially corresponding to an installation angle for the first solar panel of the plurality of solar panels at which installation angle the first solar panel mates with a first solar panel mount in which the first solar panel is to be installed.

41. The method of claim 39, further comprising:
    aligning the guide arm with a second solar panel mount for a second solar panel;
    driving the actuator to move the second solar panel of the plurality of solar panels out of the hopper through the exit;
    driving the second solar panel from the exit of the hopper and along the guide arm to guide the second solar panel to the second solar panel mount; and
    driving the second solar panel out of the exit of the guide arm to the second solar panel mount.

42. A method for installing solar panels into a solar panel mount using a solar panel dispensing device, the method comprising:
    supporting a plurality of solar panels in a hopper of the solar panel dispensing device, the hopper comprising a frame defining an interior volume and an exit;
    aligning a first exit of a guide arm of the solar panel dispensing device mounted to the hopper at the exit of the hopper with a first solar panel mount in a position to facilitate dispensing of a lead solar panel into the first solar panel mount from a first installation position of the lead solar panel;

aligning a second exit of the guide arm of the solar panel dispensing device with a second solar panel mount in a position to facilitate dispensing of a lead solar panel into the second solar panel mount from a second installation position of the lead solar panel;

actuating an actuator to displace the lead solar panel of the plurality of solar panels out of the hopper via the exit and onto a support surface of the guide arm;

driving the lead solar panel from the exit of the hopper and along the guide arm to guide the lead solar panel to one of a first exit corresponding to the first solar panel mount or a second exit corresponding to the second solar panel mount; and driving the lead solar panel out of the first exit or the second exit of the guide arm to either the first installation position or the second installation position.

43. A method for configuring a solar panel dispensing device, the method comprising:

configuring the solar panel dispensing device to comprise a hopper comprising a frame defining an interior volume and an exit, the hopper being configured to contain one or more solar panels therein;

configuring the solar panel dispensing device to comprise a guide arm comprising a support surface configured to receive and a lead solar panel, the guide arm being mounted to the hopper such that the support surface is positioned at a position at the exit of the hopper, the guide arm extending away from the exit at a position to guide a lead solar panel from the hopper to an installation position;

configuring the solar panel dispensing device to comprise an actuator comprising a contact interface operable to interface with and displace the lead solar panel of the plurality of contained solar panels through the exit, and to present the lead solar panel to the guide arm.

44. A solar panel dispensing system, comprising:

a plurality of solar panels; and a solar panel dispensing device comprising:

a hopper comprising a frame defining an interior volume and an exit, the hopper containing the plurality of solar panels within the interior volume;

a guide arm comprising a support surface configured to receive a lead solar panel, the support surface being mounted to the hopper at a position at the exit of the hopper, the guide arm extending away from the exit at a position to guide a lead solar panel from the hopper to an installation position; and an actuator comprising a contact interface operable to interface with and displace the lead solar panel of the plurality of contained solar panels through the exit, and to present the lead solar panel to the guide arm.

* * * * *